(12) United States Patent
Totonjian et al.

(10) Patent No.: US 12,061,159 B2
(45) Date of Patent: Aug. 13, 2024

(54) PARTICLE-INDUCED X-RAY EMISSION (PIXE) USING HYDROGEN AND MULTI-SPECIES FOCUSED ION BEAMS

(71) Applicant: FEI COMPANY, Hillsboro, OR (US)

(72) Inventors: Daniel Totonjian, Portland, OR (US); Aurelien Philippe Jean Maclou Botman, Hillsboro, OR (US); Milos Toth, Redfern (AU)

(73) Assignee: FEI Company, Hillsboro, OR (US)

( * ) Notice: Subject to any disclaimer, the term of this patent is extended or adjusted under 35 U.S.C. 154(b) by 333 days.

(21) Appl. No.: 17/728,869

(22) Filed: Apr. 25, 2022

(65) Prior Publication Data

US 2023/0341341 A1 Oct. 26, 2023

(51) Int. Cl.
| | | |
|---|---|---|
| *G01N 23/22* | (2018.01) | |
| *G01N 23/20* | (2018.01) | |
| *G01N 23/203* | (2006.01) | |
| *G01N 23/2206* | (2018.01) | |
| *G01N 23/2252* | (2018.01) | |
| *G01N 23/2257* | (2018.01) | |

(52) U.S. Cl.
CPC ........ *G01N 23/2206* (2013.01); *G01N 23/203* (2013.01); *G01N 23/2252* (2013.01); *G01N 23/2257* (2013.01)

(58) Field of Classification Search
CPC ............. G01N 23/2206; G01N 23/203; G01N 23/2252; G01N 23/2257
See application file for complete search history.

(56) References Cited

U.S. PATENT DOCUMENTS

2009/0084979 A1* 4/2009 DeWalch ............. G01N 21/645
250/458.1
2010/0003770 A1* 1/2010 Shibata ................. H01L 22/12
378/45

FOREIGN PATENT DOCUMENTS

JP 08088098 2/1996

OTHER PUBLICATIONS

Johannsson et al. "Analytical Application of Particle Induced X-ray Emission" Nuclear Instruments and Methods, 1976, vol. 137, pp. 473-516.
Miranda, Javier "Low energy PIXE: advantages, drawbacks, and applications" Nuclear Instruments and Methods in Physics Research B, 1996, vol. 118, pp. 346-351.
Miranda, J. "Low energy PIXE revisited: is it still alive?" Revista Mexicana De Física S, Aug. 11, 2009, vol. 56, No. 1, pp. 81-84.

(Continued)

*Primary Examiner* — Nicole M Ippolito
(74) *Attorney, Agent, or Firm* — Thomas F. Cooney

(57) ABSTRACT

Practical implementation of Particle-Induced X-ray Emission (PIXE) on a focused ion beam apparatus or on a dual-beam apparatus comprising both focused-ion beam and scanning microscopy capabilities is described. Accordingly, an analytical method comprises: directing and focusing a beam of ions comprising a mixture of protons and non-hydrogen ions onto a sample, wherein the kinetic energy of ions of the mixture is not greater than 50 kilo-electron-Volts (keV); and detecting and measuring X-rays that are emitted from the sample in response to the impingement of the protons and non-hydrogen ions onto the sample.

28 Claims, 25 Drawing Sheets

(56) References Cited

OTHER PUBLICATIONS

El-Ghawi et al. "Possibility of Using a Low-Energy Proton Beam for Particle-Induced X-Ray Emission Microanalysis" Radiation Research, Sep. 1992, vol. 131, No. 3, pp. 243-248.

Teesdale et al. "Limits of Detection and Quantitation in PIXE Analysis of Thich Targets" Nuclear Instruments and Methods in Physics Research B35, 1988, pp. 57-66.

Corrêa et al. "A multipurpose set-up using keV ions for nuclear reaction analysis, high-resolution backscattering spectrometry, low-energy PIXE and in-situ irradiation experiments" Nuclear Instruments and Methods in Physics Research. Section B: Beam Interactions With Materials and Atoms, Jun. 5, 2020, vol. 478, pp. 104-110.

Joy et al. "On the Production of X-rays by Low Energy Ion Beams" Scanning, Jan. 2007, vol. 29, No. 1, pp. 1-4.

Reis et al. "CdTe and EDS HR-PIXE Ta L and M spectra induced by duoplamatron generated proton and oxygen ion beams" Nuclear Instruments and Methods in Physics Research. Section B: Beam Interactions With Materials and Atoms, Feb. 1, 2018, vol. 417, No. 1, pp. 32-36.

\* cited by examiner

|←100μm→|

|←100μm→|

|← 25 µm →|

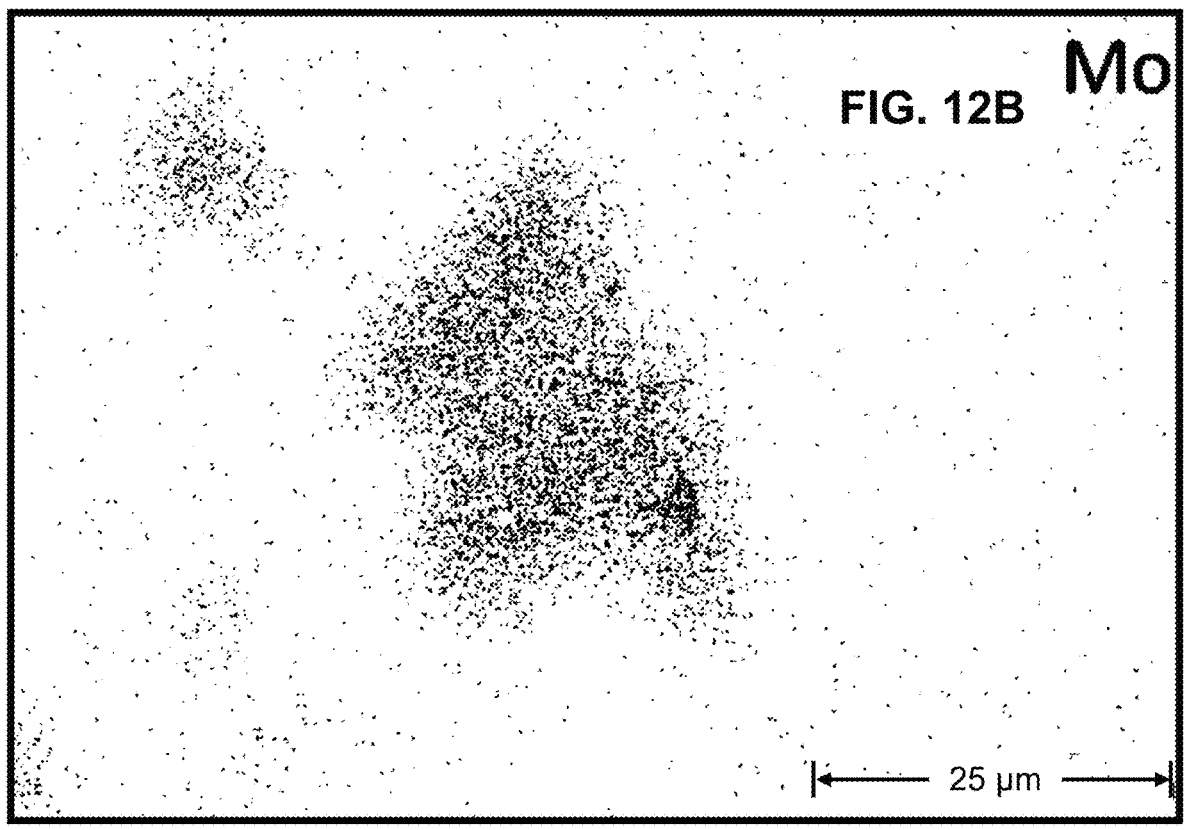

PARTICLE-INDUCED X-RAY EMISSION (PIXE) USING HYDROGEN AND MULTI-SPECIES FOCUSED ION BEAMS

TECHNICAL FIELD

The present invention relates to focused ion beam apparatuses and methods of use of such apparatuses. More particularly, the present invention relates to elemental analyses of samples, using the method of particle-induced X-ray emission, by focused ion beams that comprise a mixture of protons and other ion species and by focused-ion beam apparatuses including both stand-alone focused ion beam apparatuses as well as dual-beam apparatuses that also include scanning electron microscopy capability.

BACKGROUND

Focused Ion Beam (FIB) instruments, are a staple of sample preparation, nanofabrication, and materials analysis. Although stand-alone FIB apparatuses are known, they are typically employed as components of dual-beam or triple-beam microscopes in combination with a scanning electron microscope (SEM) component [1] and more recently, in combination with a femtosecond laser ablation system component. [2] FIB instruments dominate semiconductor fabrication and processing applications in the middle ground between small scale electron beam processing and large-scale bulk processing, where the focused beam allows the mask-free processing of small-size features that are inaccessible to bulk processing such as reactive ion etching (RIE). In such applications, FIB apparatuses provide a throughput that is significantly higher than that offered by processing using an electron beam such as electron beam lithography and focused electron beam induced processing (FEBIP). [3,4] For this reason, FIB instruments typically find use in industrial applications such as semiconductor failure analysis where cross sectioning, tomography or TEM lamella preparation is required on a relatively small scale, and high throughput is fundamental for cost reasons. Focused Ion Beam apparatuses also find a place in research and development, with such applications as the preparation of biological samples for cryo-TEM analysis, preparation of samples for atom probe tomography, or fabrication of optical components such as solid immersion lenses. As such, the FIB instrument is ubiquitous and can be found in a large number of factories and labs across the world. [3,5,6,7]

An FIB apparatus resembles and may be employed in a similar fashion to a scanning electron microscope. In operation of either such apparatus, a tightly focused beam of charged particles is caused to scan or raster across the surface of a sample of interest. The impingement of the energy of the beam onto the surface of the sample induces either backscattering of particles or the emission of secondary charged particles (ions or electrons) from each respective focal point. The backscattered or emitted particles from each respective point may be detected by a particle detector that provides a measure of the relative quantity of particles detected from each point. The number of such particles that can be detected, and thus the signal intensity can depend on sample topography and composition. In this way, a map of sample topography and/or composition may be developed. However, whereas an SEM utilizes a focused electron beam to image samples, an FIB instead utilizes a focused beam of ions. Because of this difference in beam composition, FIB apparatuses generate images of somewhat lower resolution than SEM images and, in contrast to SEM apparatuses, can cause damage to a sample through a process of sputtering. Nonetheless, the sputtering process may be used to advantage in micro-etching or micro-milling applications. Thus, many dual-beam systems comprise both an FIB component or subsystem together with an SEM component or subsystem. In such dual-beam systems, the SEM portion may be used to monitor, through its imaging capability, a micro-etching or micro-milling procedure that is conducted by the FIB portion.

According to an alternative viewpoint, an FIB can be considered to be a small, relatively low energy particle accelerator, given that the primary purpose of both a FIB and a particle accelerator is to generate and accelerate ions for the purpose of imaging, processing and ion beam analysis. With the advent of the ion microprobe, a module that is interfaced to particle accelerator beamlines to produce a focused beam capable of micrometer level resolution, the line between an FIB and a particle accelerator is even further blurred. [8] In comparison to FIB instruments however, particle accelerators are somewhat rarer with only approximately 30,000 accelerators in operation as of 2014, ranging from small tabletop particle accelerators to the large hadron collider, which vary significantly in their intended use and application and the costs of which can approach several billions of dollars. [9,10]

One of the primary functions of many particle accelerator facilities is ion beam analysis (IBA), a suite of techniques which involve the interaction of high energy particles with a sample and the analysis of signals generated as a result of these interactions. These techniques include: [11]

Rutherford backscattering spectroscopy (RBS), the analysis of kinetically scattered primary ions from a sample Ion beam induced charge (IBIC), which involves the production of electron-hole pairs by a primary ion beam and the subsequent analysis of charge transport within the sample Nuclear reaction analysis (NRA), the analysis of charged particles emitted as a result of nuclear reactions following the interaction of a primary ion and the target nucleus Particle induced Gamma ray emission (PIGE), the analysis of Gamma rays emitted following the interaction of a primary ion and the target nucleus Particle induced X-Ray emission (PIXE), the analysis of characteristic X-rays emitted as a result of ionization of the target atom by a primary ion.

Of particular interest to the present disclosure is the technique of particle induced X-Ray emission (PIXE). This technique is ideal for trace-element analysis, where a sample composition can be determined with a sensitivity at or below 1 part per million, [12,13] particularly when compared to similar X-Ray spectroscopic techniques such as energy dispersive spectroscopy performed in a scanning electron microscope (SEM-EDS), with a sensitivity of 100-500 ppm. [14] The PIXE analysis technique is typically performed by detecting emitted X-rays while bombarding a sample surface with a beam of ions. In theory, the beam may comprise ions of any type. However, in practice, very light ions such as protons are employed due to their high velocity under a given acceleration potential, as the X-ray production cross section (XRPCS) is proportional to ion velocity. Although heavier ions could be employed, a very high accelerating potential would be required to match the proton velocity [15] and significant sample damage could be incurred [16].

Typically, the PIXE analysis technique is performed at incident particle energies of several mega electron-volts (MeV) since X-Ray production cross sections are significantly increased at such high energies [17]. The optimal energy range for PIXE has been found to be 3 MeV at which the X-Ray production cross sections are maximized while the background contributions remain sufficiently low. [18] These high primary ion energies, however, have thus far restricted the employment of the PIXE technique to particle accelerator facilities, which, as discussed, above, are limited in terms of availability and cost. The result is that the PIXE technique can, at present, be somewhat inaccessible to general lab users.

Low energy PIXE (LE-PIXE), is carried out at much lower energies, e.g. <1 MeV. Despite the lower required particle energy, the LE-PIXE technique is nonetheless still typically carried out using decelerated accelerator beamlines or modified ion implanters. As such, the general use of LE-PIXE carries many of the same issues as PIXE in terms of cost and availability. [19, 20]. Performing PIXE at lower energies provides a number of advantages. In particular, LE-PIXE offers greater sensitivity to light elements compared to higher energy PIXE. This improved light-element sensitivity is predominantly due to two primary factors: the much lower Bremsstrahlung signal and low secondary fluorescence yield at low energies. [19] Moriya et al. demonstrated a significantly greater sensitivity to lighter elements by excitation with 180 keV protons as compared to 2 MeV protons and described a signal to noise ratio for the P $K_\alpha$ X-ray emission line of 50 for 180 keV protons and 0.9 for 2 MeV protons. Those authors concluded that the sensitivity for all elements with atomic number, Z, with Z≤18, are superior for an excitation energy of 150 keV compared to 2 MeV and attribute this to the lower background radiation for 150 keV protons compared to 2 MeV protons. [21] Light elements which only have a single X-Ray transition at lower energies such as Be, B, C, N, and O are often obscured by background signals such as Bremsstrahlung. Higher energy PIXE also requires thick Mylar windows to block backscattered ions which may possess energies up to the primary beam energy. The transmission of low energy X-Rays through such thick windows is poor due to X-Ray absorption by the window and as such, the measurement of X-Ray signals generated by light elements is impossible. As such, the PIXE technique is often limited to elements with a mass greater than Al. [20,22]

Despite the potential benefits light-element analysis noted above, limited research has been carried out into LE-PIXE and almost none into very-low-energy PIXE (VLE-PIXE) as the disadvantages of LE-PIXE and VLE-PIXE—e.g., significantly reduced X-Ray signal at such low energies, lower sensitivity, and the inability to effectively detect characteristic peaks above 1 keV—frequently outweigh the advantages. [20] As such, alternate characterization methods such as SEM-EDS are typically used, or researchers resort to PIXE at energies above 1 MeV. To date, only a handful of LE-PIXE systems have been developed utilizing decelerated accelerator beamlines or ion implantation systems as mentioned in literature. [22,23,24,25,26] As a result, there is a general lack of experimental data at acceleration energies below approximately 140 keV, thereby making analysis of the ionization mechanisms at such low energies quite difficult. Lapicki called for an expanded experimental data at these energies to help clarify existing models, particularly quoting the use of LE-PIXE as one of the motivating factors for the expansion of these models. [27]

Previous claims of observation of PIXE in a FIB microscope utilizing Ga+ ions [28] have been disproven. The results are an artefact caused by backscattered ions originating from a charging, insulating sample. These ions are accelerated away from a charging sample, and generate secondary electrons upon impact with grounded surfaces (e.g., the pole piece), known as type III secondary electrons. The secondary electrons are then accelerated towards the positively charged sample and generate characteristic X-Rays. The electrostatic potentials generated by such an insulating sample have been shown to be on the order of several tens of kV. [29] Another indication that the signal did not originate from the impact of Ga+ ions upon the sample was the presence of an intense Bremsstrahlung background, which is typical of a SEM-EDS spectrum, but which is known not to be present in PIXE spectra at such low energies. The generation and analysis of X-Rays through the re-acceleration of secondary electrons towards a charged sample is referred to some as charge induced X-rays (CHIX). [30]

The ability to perform PIXE on a focused ion beam instrument would signify a large step in the progression of the PIXE technique, opening the availability of PIXE to a range of additional facilities and providing a complementary technique to SEM-EDS, thereby affording significantly improved sensitivity to trace elements. In this document, the term Very Low Energy PIXE (VLE-PIXE) is introduced which describes PIXE performed in the energy range available to a standard commercial FIB instrument of 50 keV. Performing PIXE at this very low energy range comes at the expense of significantly reduced X-Ray production due to the mechanism responsible for ionization of the target atoms. In fact, PIXE performed at such low energies with protons alone was deemed to be impossible due to the expected extremely low X-Ray production cross section. [29] As a result, essentially no efforts have been taken to develop PIXE at such low energies. Being able to perform VLE-PIXE on a FIB microscope with the sensitivity available to PIXE performed at much higher energies would therefore signify a significant breakthrough in PIXE analysis. Accordingly, there remains a need for development of methods for enhancement of PIXE X-Ray production at very low energies.

SUMMARY

In light of the above background, the inventors have addressed the above need in the art through development of a beam doping mechanism, whereby the addition of a small amount of a heavy ion species such as Ar or Xe to a hydrogen beam produces a drastic enhancement in X-Ray production of the PIXE technique in the energy range 50 keV. The inventors have discovered and conclusively demonstrated that, when even a small percentage of a heavy ion species such as Ar or Xe is added to the hydrogen beam that is used to generate protons that are then focused onto a sample within a focused ion beam (FIB) apparatus, the performance of the PIXE technique exceeds conventional expectations by several orders of magnitude. The PIXE signal increases with the proportion of heavy ions making up the beam, reaching a maximum at approximately 80% heavy ion species. If the PIXE signal is collected during FIB milling, this leads to the possibility of end-point detection and real-time elemental mapping which can be utilized in 3D tomography workflows.

According to a first aspect of the present teachings, an analytical method comprises:

directing and focusing a beam of ions comprising a
    mixture of protons and non-hydrogen ions onto a sample, wherein the kinetic energy of ions of the mixture is not greater than 50 kilo-electron-Volts (keV); and detecting and measuring X-rays that are emitted from the sample in response to the impingement of the protons and non-hydrogen ions onto the sample.

According to a second aspect of the present teachings, a method of milling an area of a sample surface comprises:

directing and focusing a beam of ions comprising a mixture of protons and non-hydrogen ions onto the area, wherein the kinetic energy of ions of the mixture is not greater than 50 kilo-electron-Volts (keV), wherein the beam of ions is raster scanned across the area and wherein the impingement of the non-hydrogen ions causes sputtering of the sample surface within the area; and detecting and measuring X-rays that are emitted from the sample in response to the impingement of the protons and non-hydrogen ions onto the sample.

BRIEF DESCRIPTION OF THE DRAWINGS

The above noted and various other aspects of the present invention will become apparent from the following description which is given by way of example only and with reference to the accompanying drawings, not necessarily drawn to scale, in which:

FIG. 12B is an elemental map of molybdenum within the viewing field of FIG. 12A, as determined by the VLE-PIXE technique as described herein;

FIG. 12C is an elemental map of sulfur within the viewing field of FIG. 12A, as determined by the VLE-PIXE technique as described herein;

DETAILED DESCRIPTION

Figure 1A:
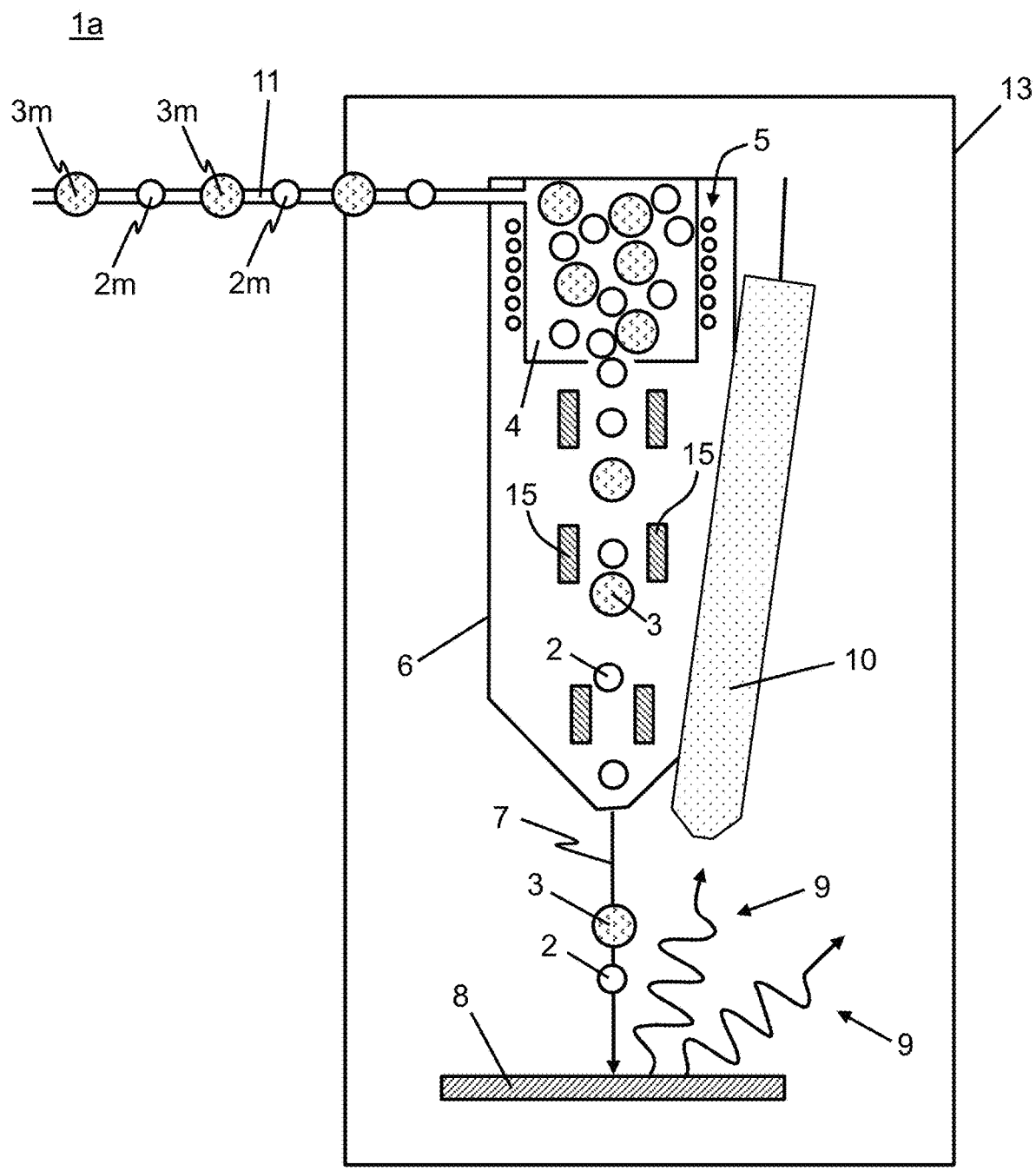
FIG. 1A is a schematic depiction of a first apparatus upon which methods in accordance with the present teachings may be practiced, the apparatus comprising a focused ion beam (FIB) column, a plasma ion source that is adapted to generate ions from a mixture of gases and to provide the ions to the FIB column, and an X-Ray detector.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1A-18 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of candidates or alternatives is merely illustrative, not limiting, unless implicitly or explicitly understood or stated otherwise.

Apparatus Embodiments

Figure 1B:
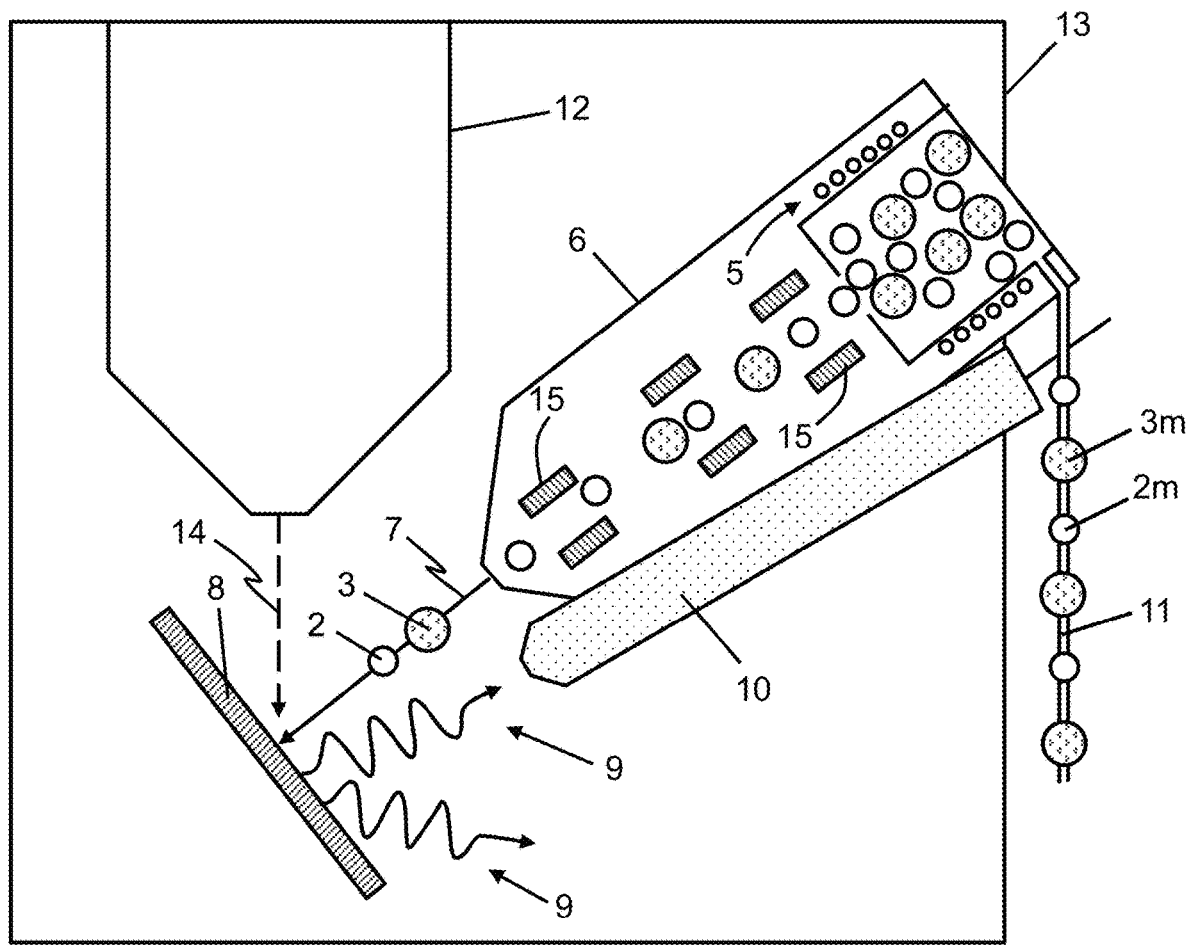
FIG. 1B is a schematic depiction of a dual-beam apparatus upon which methods in accordance with the present teachings may be practiced, the apparatus comprising an FIB column, a scanning-electron microscope column, a plasma ion source that is adapted to generate ions from a mixture of gases and to provide the ions to the FIB column, and an X-ray detector.

FIGS. 1A-1B schematically depict two examples of apparatuses in accordance with the present teachings and upon which methods in accordance with the present teachings may be practiced. In both the apparatus 1a and the apparatus 1b (FIG. 1B), an FIB column 6 that is housed within a vacuum chamber 13 receives a mixture of ions, comprising at least hydrogen ions (i.e., protons) 2 as well as ions 3 that are heavier than protons, from an inductively-coupled plasma ion source 4 that includes a coiled electrode 5 to which, in operation, a radio-frequency (RF) voltage waveform is applied. The ions are generated from a gas that is received from a gas inlet tube 11 and that comprises a mixture of hydrogen, comprising hydrogen molecules 2m and at least one other non-hydrogen gas comprising molecules 3m. The different gases may be provided in purified form and mixed, in appropriate proportions in a gas-mixing manifold (not shown) prior to their introduction into the gas inlet tube 11. Alternatively, the gases may be provided in pre-mixed form, thereby eliminating the need for the gas-mixing manifold as well and any metering valves required for the proportional mixing. Application of an appropriate RF voltage to the coiled electrode 5 causes ignition of a plasma within the ion source 4 in known fashion.

With continued reference to FIGS. 1A-1B, the ions 2, 3 are focused into a beam 7 and are guided along the length of the FIB column 6 towards a beam focal point on the surface of a sample 8 by electric and or magnetic fields applied to a series of ion optics 15 that may comprise ion lenses and ion guides. The ion optics accelerate the ions towards the sample and cause the ions of the ion beam to impact the sample surface with kinetic energy of less than or equal to 50 keV. As described in greater detail below, the impingement of both the protons 2 and the heavier ions 3 onto the same focal point on the sample 8 causes generation of a measurable quantity of X-ray photons 9 that are derived, in known fashion, by ejection of inner-shell electrons of atoms of the sample and filling of the resulting electron hole by electrons from higher-energy electron shells. The resulting X-rays are detected by an energy dispersive X-ray detector 10 and recorded as an energy-dispersive spectrum. In this fashion, the elemental composition of the sample at the beam focal point may be determined. The apparatus 1b further includes a scanning electron microscope (SEM) column 12 within the vacuum chamber that is employed so as to direct and focus a beam of electrons onto either the same focal point or, via rastering of the electron beam, onto an area of the sample that surrounds the focal point of the ion beam 7. Detection of secondary or backscattered electrons be an electron detector (not shown) may be used to create an image of the area of the sample, in known fashion.

Choice of Ion Source

Liquid Metal Ion Source

The primary distinguishing factor between focused ion beam (FIB) microscope types is the source of ions. This underpins the form and function of the microscope and its intended use in processing and analysis. The most common ion source type in focused ion beam microscopes is a liquid metal ion source (LMIS). The most commonly used metal for these applications is Gallium (Ga), primarily due to its low melting point (29.8° C.), and high mass and, therefore, sputter yield. [4] When a large negative potential is then applied between the needle tip and an extraction electrode, the extraction bias is balanced by the surface tension of the Ga liquid, pinching the liquid to a fine point known as a Taylor cone, with a cusp forming at the tip of the Taylor cone a tip radius of approximately 5 nm. [5] In a high vacuum, this potential is sufficient to generate field emission of $Ga^+$ ions from the cusp. [31,32,33] Modern LMIS based FIB instruments have a beam spot size on the order of ~10 nm. [7] Because an LMIS can only be operated with a liquid metal source, the LMIS is incapable of producing light ions such as protons which are required for generating X-rays through the VLE-PIXE technique.

Gaseous Field Ionization Source

The Gaseous Field Ionization Source (GFIS) utilizes a metallic needle with a final tip radius of just 3 atoms. [34] A very low partial pressure of gas is introduced to the needle where the gas molecules will rapidly adsorb to the tip surface. A strong electric field is then applied to the tip, such that field emission will only occur from the three gas atoms adsorbed to the final radius of the tip. [35] While typically operated with Helium gas, these sources are also capable of producing heavier ions such as Neon with a higher sputter yield for faster FIB processing. [35] With regard to lighter ions such as protons, Moritani et. al. and Matsubara et al. demonstrated the production of protons in a GFIS source. However, the generated protons occur only in very small percentages relative to $H_2^+$ and $H_3^+$ ions. [36,37,38]

Whereas a typical FIB operates with a fixed current and alters the size of the apertures to modify the beam current, the current of the GFIS source is altered by changing the pressure of the gas surrounding the tip. A greater pressure allows faster replenishment of the gas atoms on the tip, resulting in a faster extraction rate and a higher current. As the gas pressure increases, however, the potential barrier for field ionization also increases which results in a maximum working current of approximately 100 pA. [39,40] The small number of protons produced by this source, combined with the very small currents available to the GFIS makes this source unsuitable for VLE-PIXE analysis. Additionally, the GFIS is only capable of hosting one source species at a time, making it incapable of being utilized for doped beam VLE-PIXE as is required by the present invention.

Inductively Coupled Plasma Ion Source

A plasma is defined as a fully or partially ionized gas consisting of electrons and ions and has been identified as a readily available source of ions for use in a FIB system. Plasma sources come in one of several types and are named for the technique used to generate the plasma. One major benefit of plasma ion sources is that they are capable of hosting multiple ion species, a requirement for doped beam VLE-PIXE. An inductively coupled plasma (ICP) can be generated by use of an antenna (e.g., coiled electrode 5 of FIGS. 1A-1B) which is external to the plasma chamber. The primary benefit of the construction of an ICP ion source is that the plasma itself does not come into contact with the antenna, significantly increasing the lifetime of the antenna and expanding the range of possible plasmas to those which include oxidizing gases. An ICP is formed by applying an RF wave to the helical or coiled conductive antenna, separated from the gas by use of a dielectric insulator, typically high-quality quartz which has low dielectric losses and good resistance to high coil temperatures.

At relatively low RF power, the RF field from the antenna penetrates through the dielectric providing an electric field which is sufficient to ionize the gas. This is known as "E mode" due to the primary excitation mechanism being the electric field of the RF coil, similar to that of a DC discharge. At higher RF power, the energy is sufficient to accelerate the electrons in the sheath near the edge of the dielectric, also known as the skin layer. This is known as "H mode", as a true inductive coupling is formed between the antenna and the plasma, thereby generating a very high-density plasma. An ideal ICP acts like a transformer with the primary winding being the antenna, and the induction field in the plasma forming a single-turn secondary coil. ICP is used in applications where a very high-density plasma is required, making it suitable for use as a high brightness ion source, and ideal for use as an ion source for VLE-PIXE.

Comparison of Ion Sources

Table 1 shows a selection of measured ion beam source metrics from literature for the most common FIB sources, the LMIS, the GFIS, and the ICP. The underlined species indicate the sources used for the listed metrics. Based on this table, it can be seen that, in general, instruments which are capable of high resolution are limited in terms of deliverable current and vice versa. For VLE-PIXE, due to the low efficiency of the technique at such low energies, the ICP is an essential development due to the very high effective current delivery to the sample due to the ICP ion source. The capability of producing protons by utilizing a hydrogen precursor is also an essential development which is required for VLE-PIXE in a FIB microscope and the ability to host multiple source species simultaneously is critical for doped beam VLE-PIXE experiments.

TABLE 1

Comparison of ion beam metrics for LMIS, GFIS and ICP ion sources.

| Source Type | LMIS | GFIS | ICP |
|---|---|---|---|
| Source Species | Ga, Al, Au, Alloys [41] | He, Ne, Ar, Kr [42] | Xe, Ar, $O_2$, $N_2$, Ne, $H_2$ [43] |
| Virtual Source Size | 30-50 nm [44] | 3 Å [45] | 7.2 μm [46] |
| Min. Spot Size | 5 nm [44] | 0.25 nm [45] | 25 nm [46] |
| Angular Intensity | 20 μA/$cm^2$sr [44] | 2.5 μA/sr [45] | 7.4 mA/sr [46] |
| Source Brightness | 2 × $10^6$ A/$cm^2$sr [41] | 4 × $10^9$ A/$cm^2$sr [45] | 1 × $10^4$ A/$cm^2$sr [46] |
| Max. Current | 20 nA [6] | 100 pA [39] | >1 μA [6] |
| Energy Spread | 4.5 eV [44] | 2 × $10^5$ eV [45] | 7 eV [46] |
| Protons | No | Yes | Yes |
| Mixed Species | No | No | Yes |

Chosen Plasma Source Configuration

Figure 2:
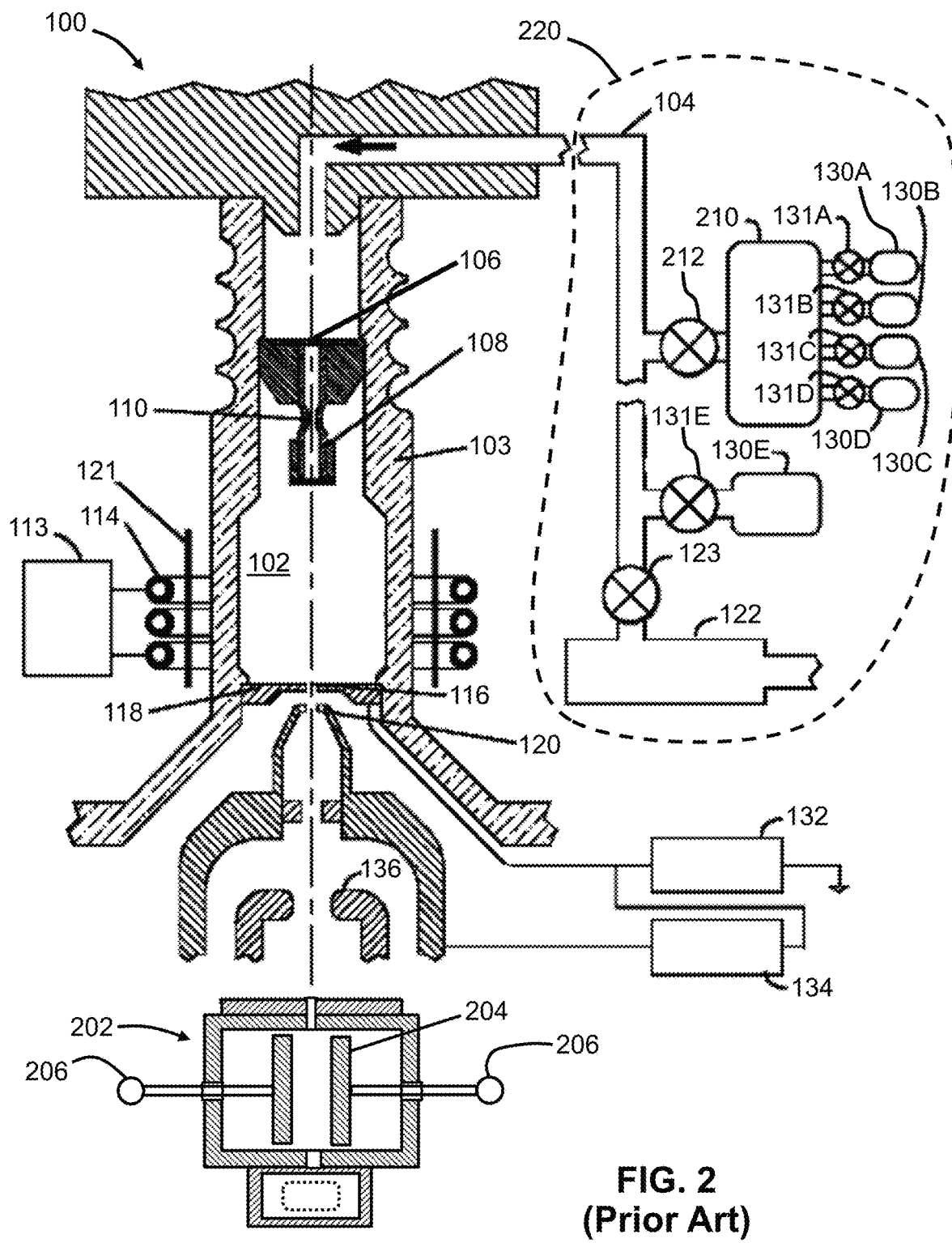
FIG. 2 is a schematic depiction of a known inductively coupled plasma ion source for generating ions and providing the generated ions to an FIB column.

Based on the above comparisons between ion sources, the inventors have recognized that a known FIB apparatus, as described in U.S. Pat. Nos. 8,076,650 and 8,822,913, herein referred to as a PFIB apparatus, that is outfitted with an ICP ion source and a gas mixing apparatus, is optimal for VL-PIXE operation. FIG. 2 is a schematic depiction of ion source 100 as used in such a PFIB apparatus. A predetermined gas mixture is provided by a gas mixing system 220. The gas mixture is provided to a plasma chamber 102 within a source tube 103 from an external gas feed line 104 through a gas filter 106 and then to a capillary tube 108 with a flow restriction 110. Energy is fed into the plasma chamber 102 from RF power supply 113 by antenna coils 114 and ions are extracted through a source electrode aperture 116 in a source electrode 118 by extractor electrode 120. A split Faraday shield 121 reduces the capacitive coupling between the coil 114 and the plasma in chamber 102, in chamber 102 which reduces the energy spread of the extracted ions. Power supply 113 preferably drives the antenna 114 in a "balanced" manner, that is, the electrical phase shift across the antenna is adjusted to reduce modulation of the plasma potential as described in U.S. Pat. No. 7,670,455 which is hereby incorporated herein by reference. The balanced antenna preferably provides a null point in the radio frequency energy field within the plasma, which reduces the energy spread of the ions extracted from plasma chamber 102.

The gas conductance into and out of the plasma chamber 102 is through the flow restriction 110 in the capillary tube (at the top of the source tube 103) and the aperture 116 (typically less than ¼ mm in diameter) in the source electrode 118. Pump 122 connected to gas supply line 104 through valve 123 removes gas from plasma chamber 102 through capillary 108 and gas supply line 104. An ion column pump (not shown) extracts gas from plasma chamber 102 through source electrode aperture 116.

The gas mixing system 220 receives gases from multiple gas sources such as gas storage 130A, gas storage 130B, gas storage 130C and gas storage 130D supply gas into gas supply line 104 through corresponding valves 131A through 131D. Valves 131A to 131D are adjusted to provide the desired gas mixture into gas feed line 104 to provide gas to the plasma chamber 106. Multiple ones of valves 131A to 131D may be open at the same time to provide multiple gas species to the plasma chamber simultaneously. Valves 131A to 131D are preferably metering valves that control the ratio of gases into gas inlet 104.

A beam voltage supply 132 supplies a high voltage to the plasma in chamber 102 and an extraction voltage supply 134 supplies a voltage to extraction electrode 120. Extracted ions or electrons are focused by focusing electrode 136. Additional details of the focusing column and sample chamber are not shown.

To remove a gas from the interior of the plasma chamber, the gas feed line 104 is pumped as shown to remove gas in the source tube above the flow restriction 110 in the capillary tube 108. The volume of the FIB system below the source electrode 118 may also be adequately pumped using the main chamber vacuum pump(s) (not shown).

Because both the source electrode aperture 116 and the flow restrictor 110 have small diameters and correspondingly very low gas conductance, it is impossible to rapidly pump out the interior of the source tube 103. This is a disadvantage, particularly for a production FIB system where it is sometimes desirable to perform sequential process steps with different ion species. First, it may take a much longer time to pump out a first process gas from the source tube 103 before the base pressure is low enough to introduce a second process gas. Insufficient purging of the gas can lead to contamination of the plasma through ionization. U.S. Pat. No. 8,633,452, which is incorporated herein by reference, describes plasma chamber designs that provide for rapidly changing gas in a plasma source by providing an alternate path for gas to enter or leave the vacuum chamber.

A mass filter 202 is included below the ion source. The mass filter 202 is preferably an E×B filter, although other types of mass filter can be used. Mass filter 202 includes electrode 204 that provides an electric field and magnets (not shown) positioned above and below the plane of the paper to provide a crossing magnetic field. Connectors 206 provide electrical connections to electrodes 204 and provide a mechanical connection to adjust the position of the electrode 204. The fields are adjustable to select the mass of ions that pass through the filter undeflected and pass through an aperture in the beam path; ions having masses other than the selected mass will be deflected and will not pass through the aperture. While mass filter 202 is shown schematically, it could comprise a more complex mass filter or a compound filter having more than one region of E×B fields, separated along the beam axis.

Gas Delivery System

The advent of the combined plasma ion source 100 and gas mixing system 220, as shown in FIG. 2, has allowed the application of up to four parallel source species. Typically, Xe, Ar, $O_2$ and $N_2$ are provided from gas storage units 130-130D employed in conventional FIB operation. The gases Xe and Ar are generally chosen for their high masses, making them ideal for rapid sample processing (e.g., etching, milling) due to their high sputter yields, and nonreactive nature, thereby resulting in reduced influence over the chemical and electronic properties of the sample. The gases $O_2$ and $N_2$ are generally chosen due to their availability and the possibility of interesting applications due to the chemically active nature of these species. While the sputter yields of these species are much lower than Xe and Ar, they are still non-negligible and can be used for the processing and preparation of materials through FIB milling. One example is the use of the $O_2$ beam for the processing of organic materials, as the chemical nature of the oxygen species allows volatilization of sputtered species, preventing redeposition of carbon-based materials. [47]

The VLE-PIXE techniques that are taught in this document rely on the production of light ion species, such as protons, in a beam that also includes heavier ion species. The combined plasma ion source 100 shown in FIG. 2 provides the capability of generating such a combined ion beam. Traditionally, hydrogen, with its very light mass and therefore very low sputter yield, is not suitable for the preparation and processing of materials under conventional FIB operation. However, the present inventors have realized that the true potential for a hydrogen-bearing ion beam lies, instead, in the analysis of materials, with a number of possible applications such as VLE-PIXE. Some prior attempts have been previously made to introduce $H^+$ ions into a FIB using a gaseous field ionization source (GFIS). [36,37,38,39,40] However, the very low currents available, particularly of protons, make materials analysis with such instruments difficult.

To conduct VLE-PIXE as described herein, a significant electric current from protons is desirable, as the low XRPCS at such low energies can be compensated to some degree by increasing the number of protons incident on the same in a given time frame. For conducting doped beam VLE-PIXE, the capability of supporting multiple ion species simultaneously, as provided by the combined plasma ion source 100 and gas mixing system 220, is advantageous for success.

But, as noted above, hydrogen, with its very light mass and very low sputter yield, is not suitable for the preparation and processing of materials under conventional FIB operation. Because the presently-described methods require hydrogen, the standard supplied oxygen bottle was simply replaced with a bottle of high purity hydrogen. The removal of the oxygen bottle was for the purpose of safety as well, with the combination of oxygen and hydrogen on the same system creating the potential for an explosion.

According to an apparatus in accordance with the present teachings, the hydrogen gas required for VLE-PIXE analysis is transferred into the inlet of the plasma chamber via a metered orifice that ultimately controls the pressure within the plasma chamber. The hydrogen gas and another heavier gas are transferred, via a series of shut-off valves, to a gas delivery manifold that supplies the resulting gas mixture to the metered orifice. The back-pressure upon this orifice, provided by the gas delivery system, dictates the flow rate through the orifice and, for the inventors' specific apparatus, was found to be optimal in the $2\text{-}4\times10^3$ mbar range as measured directly before the orifice, on the Positive Pressure Gauge (a piezo-based gauge). The evacuation rate of the plasma chamber is fixed by the pumping speed of a turbo molecular pump (not shown), thereby resulting in a drop of pressure between the metered orifice and the exit aperture of the plasma chamber. Although the precise pressure in the plasma chamber is not known, a measured pressure of $6\text{-}7\times10^{-6}$ mbar on the cold cathode gauge, after the plasma chamber, was demonstrated to be optimal for hydrogen plasma ignition using the inventors' specific apparatus.

Plasma Source Operation

Once a stable pressure of gas in the plasma chamber has been established, the plasma is then ignited. This ignition process is typically performed automatically following gas species switching. The following are typical RF plasma operating parameters, as determined using the inventors' apparatus, and are not intended to be limiting in any way:
  RF impedance matching capacitors are set to pre-ignition values;
  RF generator provides an RF wave at a desired power and frequency;
  Plasma igniter is discharged which ignites the plasma in the chamber;
  Plasma detection logic is applied which relies on an increase in the reflected RF power upon plasma ignition;
  RF impedance matching capacitors move to post-ignition values and automatically tune to minimize reflected power.

Once ignited, the plasma is allowed to stabilize for a period of between 15-30 minutes before use to achieve the most stable beam. Operation of the plasma source during beam doping typically involved extinguishing the plasma, establishing the new precursor gas mixture and re-ignition of the plasma source. Some amount of manual RF capacitor tuning was also required as the optimum tuning values for the plasma system are established for a single gaseous species.

It was observed throughout the beam doping experiments that the addition of dopant species to the source plasma could have unexpected effects on the plasma composition and therefore the beam composition. As described further below (e.g., see FIG. 10), the changing partial pressure of Ar in the plasma source results in the proportion of the hydrogen molecular species in the beam differing somewhat from what was expected based on a pure hydrogen beam. This is fairly typical of multi-gas plasmas, as Bai et al. described that the plasma parameters can change significantly with the mixing ratio in inductively coupled plasmas. [48]

Ion Beam Characterization

Understanding the molecular and isotopic composition of a focused ion beam is fundamental to verifying the successful implementation of the VLE-PIXE technique and to understanding the interactions of the beam with the sample and the resulting physical processes. In particular, for the doped beam VLE-PIXE experiments, the plasma will generate $H^+$ ions (i.e., protons), as well as $H_2^+$ and $H_3^+$ ions, as well as some proportion of dopant species, the ratio of which is dependent on a number of factors such as plasma power, pressure, and partial pressure of the gaseous precursors. Characterization of the beam as it is incident upon the sample is the best way to determine the experimental conditions. This section teaches techniques used to characterize the beam composition.

Beam Chemistry

There are several reaction pathways that occur in the plasma that lead to the formation of various primary hydrogen ions. [49] The ratios of these species are highly dependent on the plasma conditions such as pressure, power, electron density, chamber size, and electron temperature. Fukumasa et al. demonstrated that changing the source pressure from $1\times10^{-4}$ mbar to $1\times10^{-3}$ mbar can drastically shift the molecular ratios of $H^+$, $H_2^+$ and $H_3^+$ from 70%/15%/15% to 10%/30%/60% with all other parameters remaining constant. [49] For this reason, determination of the ratio of hydrogen molecular species should be carried out by accurate characterization of the currents of each individual hydrogen species at the sample. To carry out such a procedure, a single ion beam composed of the above species should be separated into individual beamlets and the ion beam current of each beamlet should be characterized. Methods for doing so are described in the following subsections.

Splitting of Ion Beam into "Beamlets"

Figure 3:
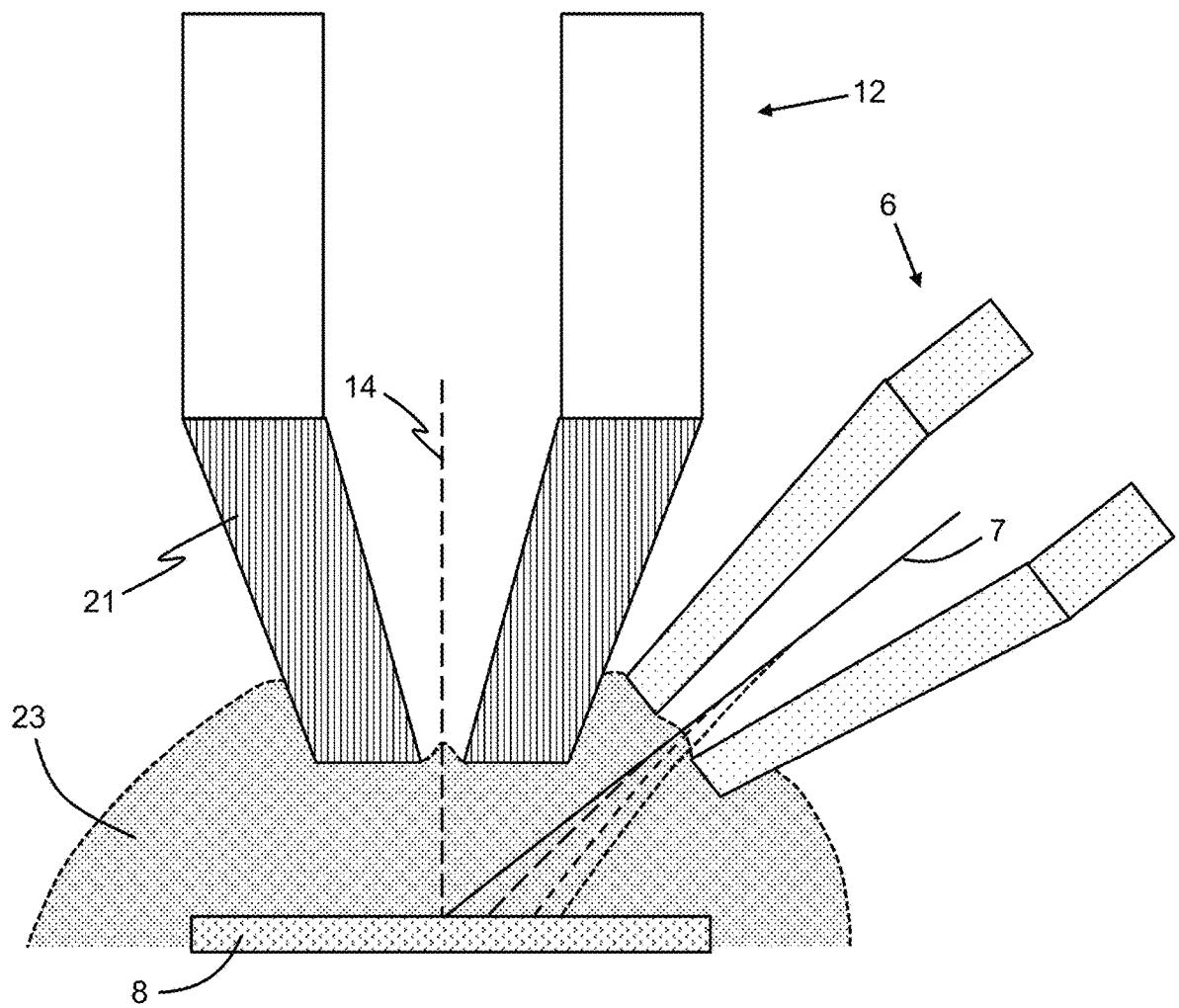
FIG. 3 is a schematic depiction of the sample-facing ends of an SEM column and an FIB column of a dual-beam scanning microscope and/or milling apparatus showing the separation of an ion beam having multiple ion species into a plurality of beamlets, each beamlet comprising a subset of the ion species, through interaction of the ions with a magnetic immersion field.

The magnetic immersion lens (MIL) of the electron column (e.g., SEM column 12, FIG. 3) utilizes a strong magnetic field to both act as the final lens for the electron beam and to help guide electrons to be collected by detectors located in the column. [50, 51] This magnetic field is known, as is schematically depicted in FIG. 3, to cause deflection of ions as they travel from the FIB column to the sample as a result of the Lorentz force applied to the positively charged ions. Importantly, this Lorentz force is dependent on the mass to charge ratio of the ion, with a greater force applied to lighter ions than heavy ions.

The strength of the magnetic field generated by the MIL can be adjusted by increasing or decreasing the current travelling through the MIL and can be applied with both a positive and negative polarity. This procedure is typically used to adjust the focal point of the electron beam upon the sample. The magnetic immersion lens however contains a ferromagnetic core which serves to enhance the magnetic field generated by the coil. As a result, when the current applied to the lens coil is removed, a remanant magnetic field is still present. As such, a current must be applied to the lens coil which acts to compensate for the remanant magnetic field, resulting in an effective field free condition. This is typically applied during FIB operation of a conventional dual-beam apparatus, such as apparatus 1b of FIG. 1B, such that the ion beam is free to travel to the sample without deflection.

Changing the current of the MIL, however, creates the possibility of intentionally inducing a deflection to the ions in the beam. The magnetic field is aligned such that the deflection is only in the X-direction relative to the beam scanning field of view. This results in the separation of the ion beam components by mass/charge ratio with the heaviest component falling closest to the beam axis and the lightest components falling some distance away. FIG. 3 is a schematic depiction of the magnetic immersion lens 21 and the resulting magnetic immersion field 23 in the vicinity of the sample-adjacent ends of an SEM column 12 and an FIB column 6 showing the separation of an ion beam 7 into multiple deflected beamlets. The degree of deflection can be described using the Lorentz equations and can therefore be used to identify the various separated species from the positions of the burn marks that they create on the surface of the sample 8.

Figure 4:
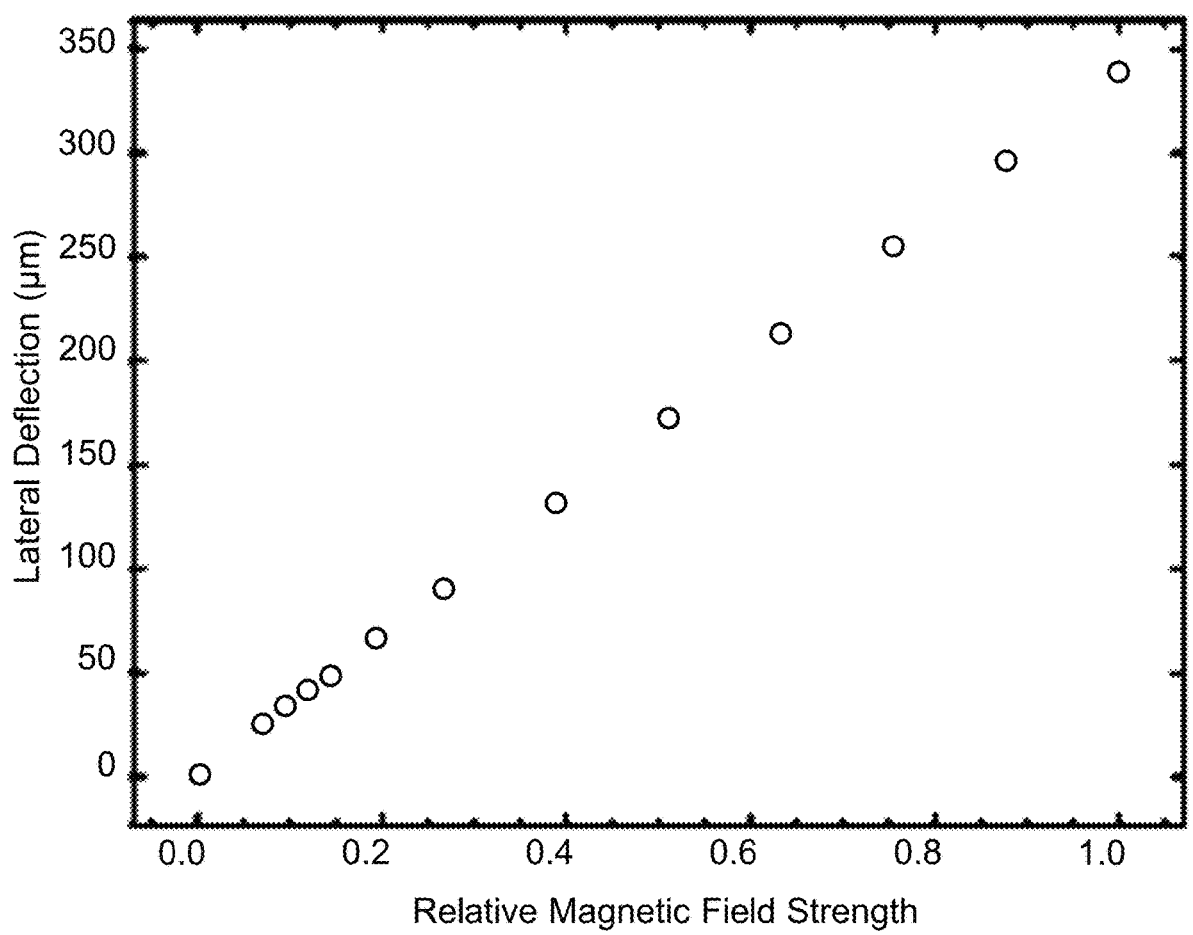
FIG. 4 is a plot of the measured lateral deviation of the $H_3^+$ ion component of a Hydrogen beam as a function of the relative magnetic field strength of a magnetic immersion field through which the ions are caused to pass after exiting an FIB column.

The measured lateral deflection of the $H_3^+$ ion from its field-free location is shown in FIG. 4. From these values, the strength of the magnetic field can be determined by solving the Lorentz equation. Using this information, the lateral deflection of some common mass components may then be predicted for a specific relative magnetic field strength. The calculated deflections were found to be very accurate when compared to spot-burn images of separated beams. Inversely, the mass of the species can be calculated based on their lateral deflection, identified using a spot-burn image of a separated beam.

Following the mass calculations, several considerations must be taken in order to isolate the most likely molecular or isotopic candidates. One such consideration is whether the vast majority of ions generated in the plasma from the source gases are singly ionized. This determination is important as the mass identification is based on the mass to charge ratio (m/z), not simply the ion mass. Thus, doubly charged ions could be misidentified as an ion with half its actual mass. Previously reported performance of an early version of the Helios Hydra PFIB source demonstrated a doubly-ionised percentage of just 0.75% for the ICP source operating with Xe at an RF power of 300 W. [46] This power is significantly higher than the 37 W typically used with Xe on the commercial version of this ICP source and therefore the percentage of doubly ionized Xe would be expected to be even lower than 0.75%. Doubly-charged Xe, with an average m/z of 66 thomsons based on its most abundant isotope could also be clearly distinguished from any other likely beam species given that the other candidate species would be transition metals such singly-charged copper, zinc or gallium, which should not be present in the beam.

It was shown that Ar could produce doubly ionized species at the typical operating power of 200 W. The $Ar^{2+}$ spot at an m/z of 20 Th could also be attributed to $Ne^+$ however given that no Ne is utilized in the PFIB system, this peak can be clearly identified as $Ar^{2+}$. Studies on a nitrogen ICP source at powers of up to 400 W have demonstrated that the production of $N_2^{2+}$ species is undetectable, with the dissociated $N^+$ species being far more likely. [52] The nitrogen species $N_2^{2+}$ would also overlap with the $N^+$ and distinction would be impossible. Studies on Oxygen ICP sources at powers of up to 300 W have also been unable to detect doubly ionized $O_2^{2+}$, once again demonstrating the dissociation to O and $O^+$ species to be far more likely. [53] It is impossible to doubly ionize an $H_2$ molecule as there would be no electrons remaining to facilitate bonding, and this would be the equivalent of two free $H^+$ ions.

Another process that must be considered is the possibility of chemical reactions occurring in the plasma source. Gaseous Ar, while typically considered to be a non-reactive noble gas, is capable of forming molecules with various other species in the plasma. These molecules are referred to as polyatomic interferences and are particularly prevalent in ICP mass spectrometry where the Ar carrier gas can form molecules with analyte species. These interference molecules can lead to incorrect identification of species such as, $^{40}Ar^{12}C$, $^{40}Ar^{16}O$, $^{40}Ar^{35}Cl$, and $^{40}Ar^{40}Ar$, mistakenly identified as $^{52}Cr$, $^{56}Fe$, $^{75}As$, and $^{80}Se$. [54] These polyatoms fall between the primary m/z peaks of Ar at 40 Th and Xe at 132 Th. With no other ions being expected between these two masses, this makes identification of Ar polyatomics simple.

Measurement of Beam Component Currents

Once the beam components have been identified, quantification of each beamlet species can be carried out. For these measurements, a standard Faraday cup design will not work as all charged particles hitting the top surface of the cup will register a current and only the total beam current will be measured. A special Faraday cup must be used such that any particles striking the top surface of the cup are rejected and only those which enter through the aperture will be measured. Accordingly, a special Faraday cup, dubbed an "isolating" Faraday cup was designed for this purpose.

Figure 18:
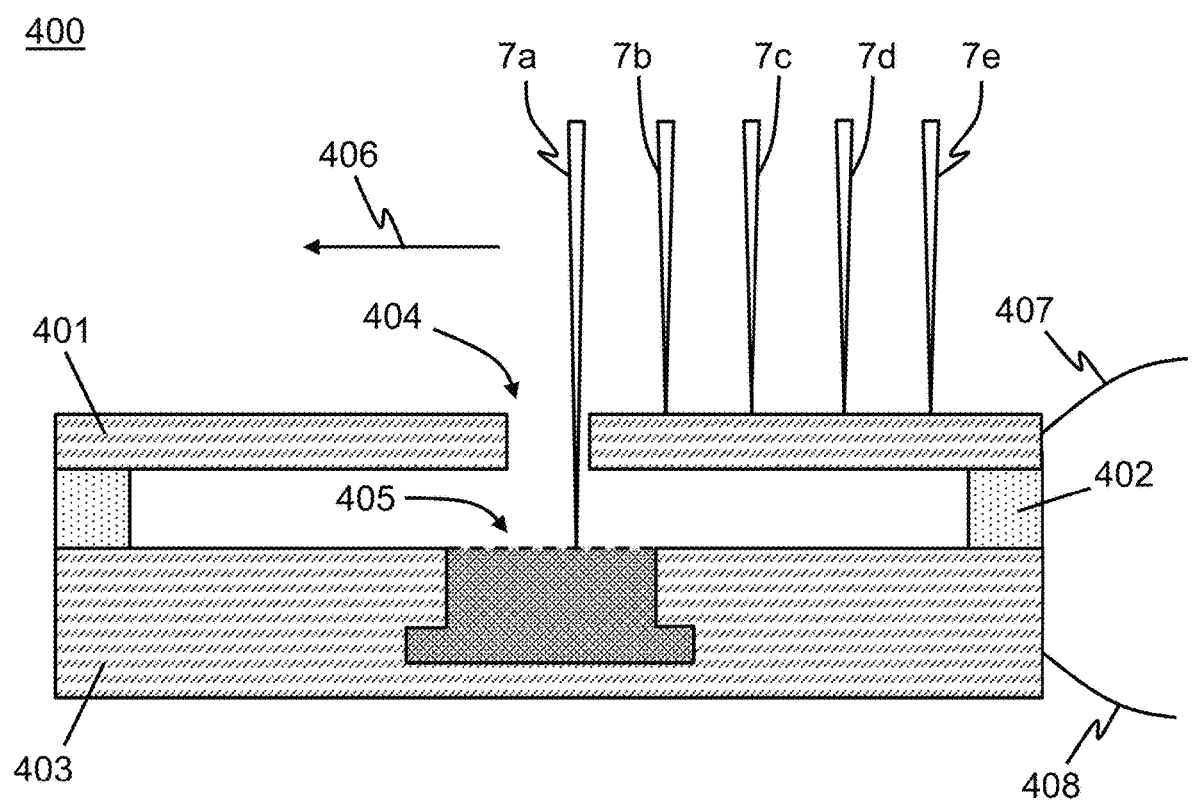
FIG. 18 is a schematic diagram of the basic design and working principle of an isolating Faraday cup current detector apparatus for employment in methods and apparatus in accordance with the present teachings.

FIG. 18 is a schematic cross-sectional view of an isolating Faraday cup 400 in accordance with the present teachings and illustrates the working principal of the apparatus. The Faraday cup 400 comprises a first electrode 401 and a second electrode 403 that is spaced apart from the first electrode 401 and that is separated from the first electrode by one or more electrically insulating spacers 402. For example, the apparatus may be generally cylindrical in shape (or of some other shape), in which case the apparatus may comprise a single ring-shaped spacer 402 and the first electrode may be in the form of a circular plate. The first electrode comprises an aperture having a diameter that is smaller than the spacing between individual separated beam components (i.e., beamlets), five of which—7a, 7b, 7c, 7d and 7e, are illustrated. Accordingly, the ions of only one such beamlet (e.g., beamlet 7a) may pass through the aperture at any one time. The ions of the other beamlets are caused to impact upon the surface of the first electrode 401. Because the first electrode 401 is grounded via electrical conductor 407, any electric current derived from ions of beam components that hit the first electrode will flow directly to ground. Only the charge of the beam component (e.g., an individual beamlet) which enters the aperture 404 will be collected by the isolating Faraday cup 400 and will enter charge collector cavity 405. The electric current that passes into the cavity via the single beam component that passes through the aperture 404 may be measured by an electrometer, such as a pico-ammeter (not shown) that is electrically coupled to the second electrode 403 by means of electrical conductor 408. Similar designs have been previously implemented for the measurement of the shape of ion beams. [76]

The charge collector cavity 405 of the second electrode 403 need not be provided in the particular shape that is shown in FIG. 18. More generally, the cavity may be of a shape the is designed to enhance the collection efficiency and accuracy of the device by directing ions and/or secondary electrons towards the internal walls of the cavity rather than up towards the cavity opening. Thus, the cavity may include additional cavity segments and additional cavity walls that are not necessarily parallel to any of the cavity walls shown in FIG. 18.

In order to measure the current associated with each individual component of an ion beam, the separated beamlets may be scanned across the face of the isolating Faraday cup 400 and across the aperture 404. Arrow 406 schematically depicts the relative movement between the set of beamlets and the isolating Faraday cup 400. The scanning process may be achieved by using the built-in scanning pattern generator of a commercial FIB or SEM microscope apparatus. Alternatively, the isolating Faraday cup may be programmatically moved in small steps by a moveable stage assembly while the ion beamlets remain stationary.

Figure 5:
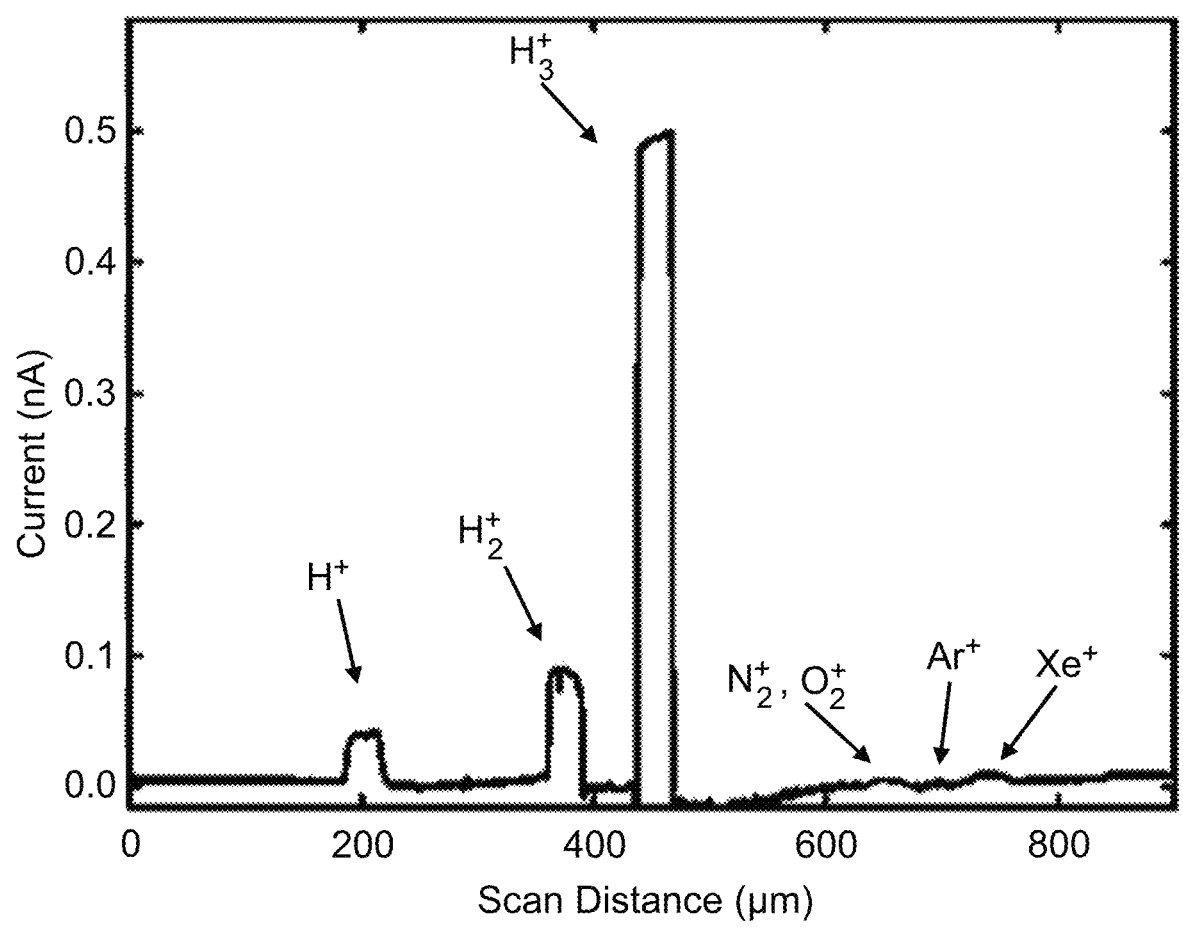
FIG. 5 is a plot of measured electric currents of separated beamlets generated from a 650 pA, hydrogen beam generated from a 200 W inductively-plasma ion source.

FIG. 5 shows the beamlet current measurements for a 200 W hydrogen plasma where the current of each beamlet can be converted to a percentage of the total beam composition. In this scan, the species $H^+$, $H_2^+$, and $H_3^+$ can be identified as well as contributions from the $N_2^+$, $O_2^+$, $Ar^+$ and the $Xe^+$ species. The percentage composition of this beam is shown in Table 2.

Figure 6A:
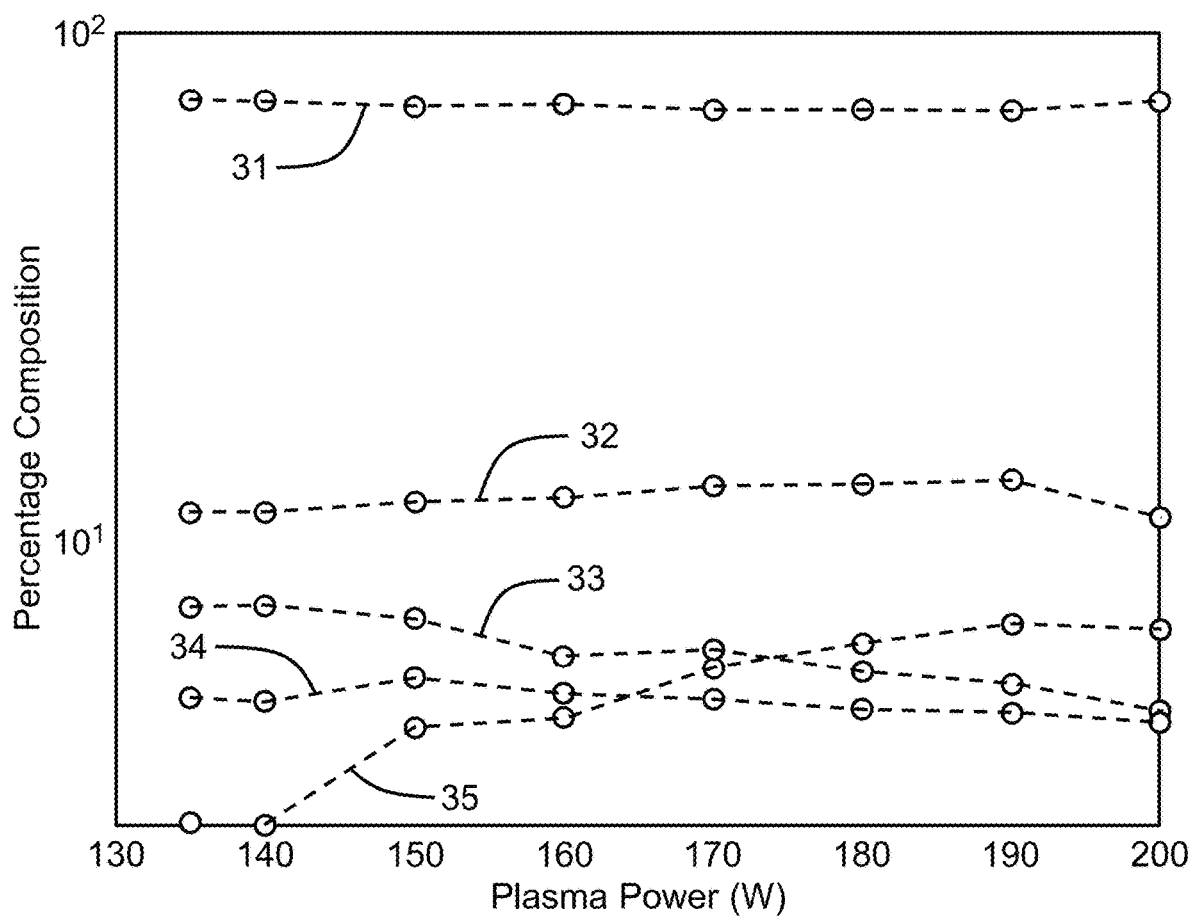
FIG. 6A is a plot of the percentage change of measured current intensities of various separated beamlets as a function of radio-frequency (RF) power applied to an inductively coupled plasma ion source.

It is known that the RF power used to generate a source plasma can alter the composition of the hydrogen ion beam due to changes in plasma density and electron temperature affecting reaction pathways in the source plasma. [49] Accordingly, the beam composition was measured as a function of plasma source RF power to establish the optimum RF power for proton production, as shown in FIG. 6A. Traces 31, 32, 33, 34 and 35 in FIG. 6A pertain, respectively, to measured percentages of the species

TABLE 2

Percentage composition of species of a
650 pA, $H_2$ beam from a 200 W plasma.

| Species | Percentage Composition |
| --- | --- |
| $H^+$ | 6% |
| $H_2^+$ | 14% |
| $H_3^+$ | 78% |
| $N_2^+$, $O_2^+$ | <1% |
| $Ar^+$ | <1% |
| $Xe^+$ | <1% |

Figure 6B:
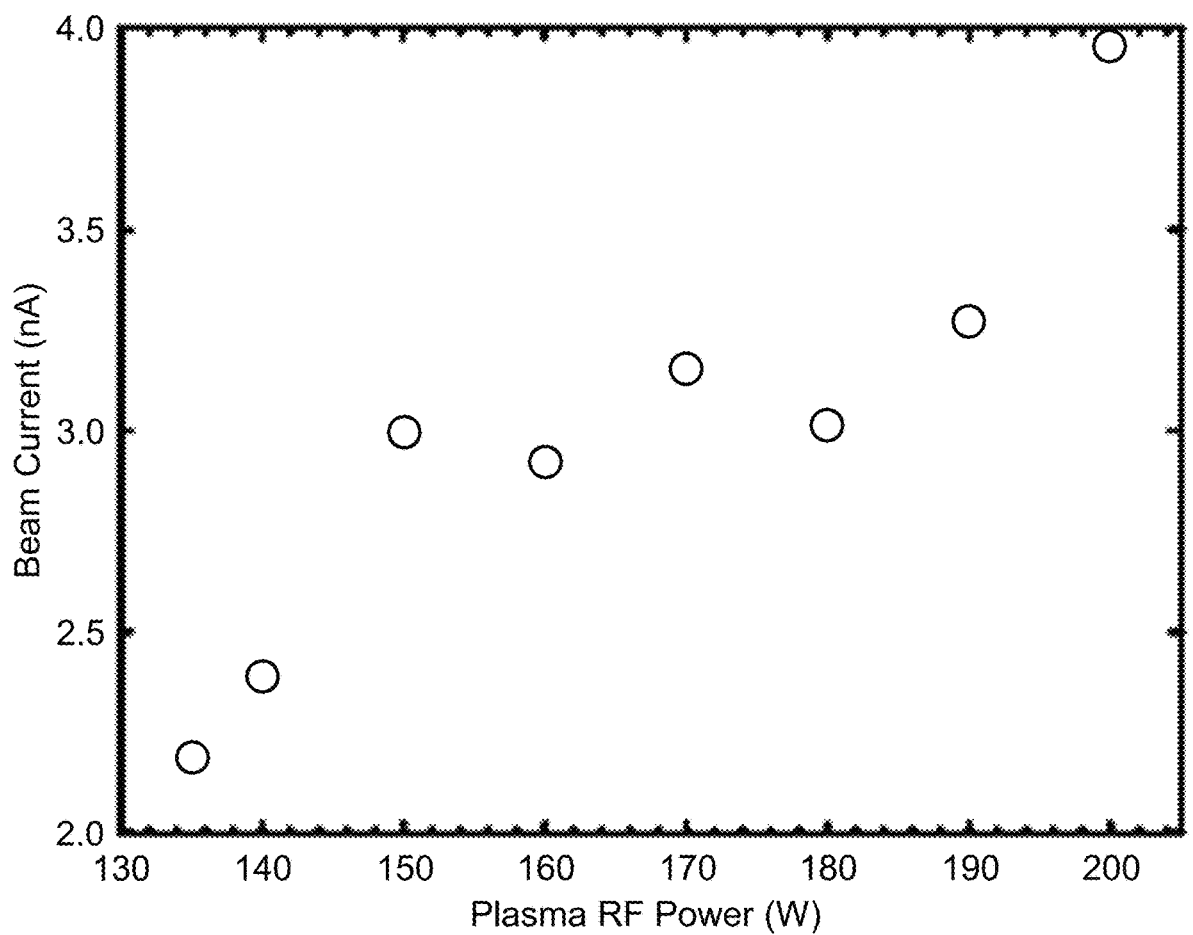
FIG. 6B is a plot of the integrated measured current of all beamlets, as plotted in FIG. 6A, as a function of the RF power applied to an inductively coupled plasma ion source.

$H_3^+$, $H_2^+$, $N_2^+$ plus $O_2^+$, $Xe^+$ and $H^+$. It is observed that increasing the plasma RF power results in an increase in the percentage of $H^+$ ions in the beam as well as a corresponding increase in the total beam current as shown in FIG. 6B. Operating the plasma source at the highest possible RF power will therefore achieve both the greatest beam current and the highest proportion of protons in the hydrogen beam. Increasing plasma power however also leads to an increase in the temperature of the plasma chamber which may result in permanent damage to the plasma source. For this reason, a power of 200 W was deemed to be the maximum safe working RF power.

Figure 6C:
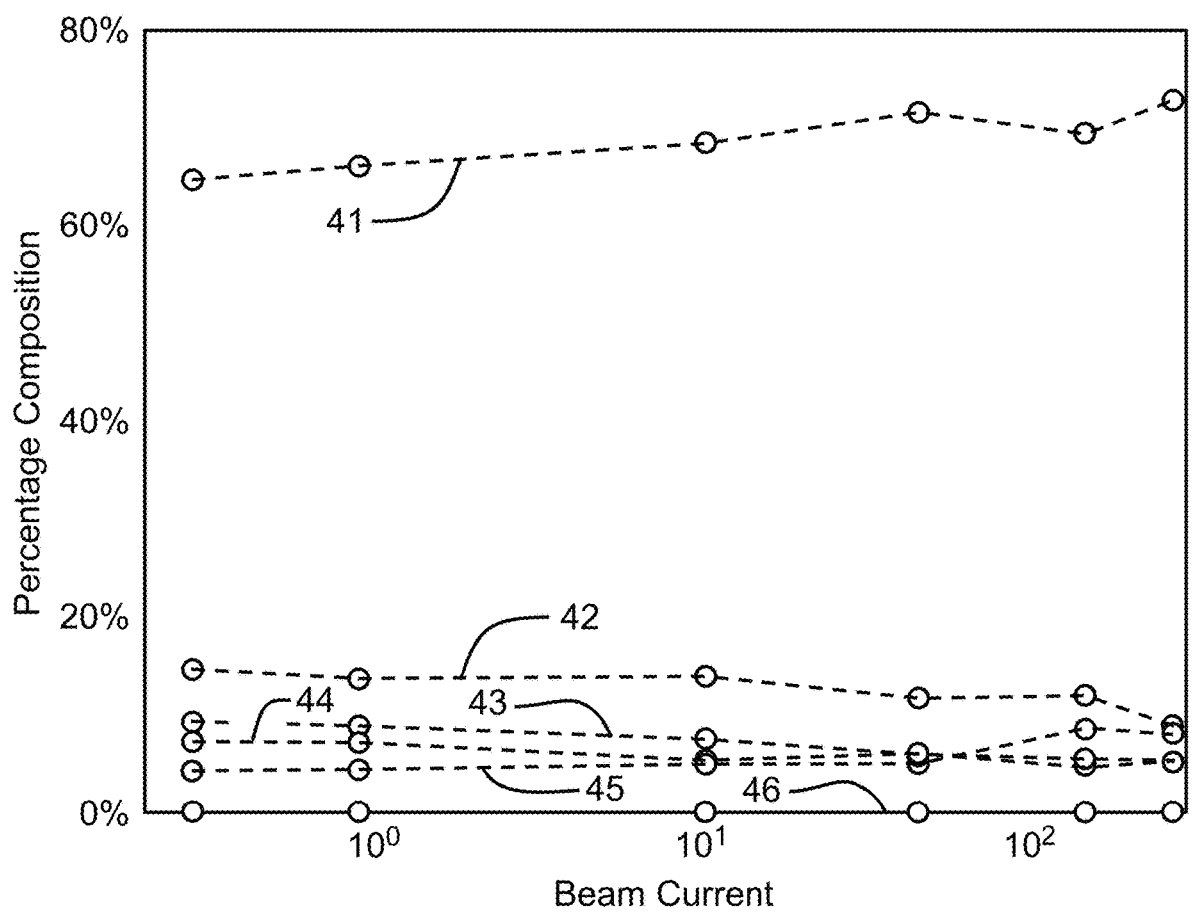
FIG. 6C is a plot of the variation of the percentage of each of a plurality of ion species composing a multi-species ion beam as a function of total beam current.

Due to the relatively low percentage of $H^+$ ions (protons) within the beam, high currents must be used to generate a sufficient X-ray signal for analysis during VLE-PIXE measurements. Compositional current measurements were therefore carried out to determine whether increasing the beam current would have any influence on the proportion of species in the beam. The results of the measurements are shown in FIG. 6C. Traces 41, 42, 43, 44, 45 and 46 in FIG. 6C pertain, respectively, to measured percentages of the species $H_3^+$, $H_2^+$, $H^+$, $N_2^+$ plus $O_2^+$, $Xe^+$ and $Ar^+$. These measurements demonstrate that only a small change in beam composition occurs over several orders of magnitude change in beam current. For this reason, beamlet characterization can be effectively performed at lower currents where the beam spot size is smaller, giving better separation between beamlets, as well as reduced damage to the isolating Faraday cup, particularly when characterizing doped beams with a greater sputter yield due to the presence of heavy ion species.

Control of Beam Purity

Due to the residual contamination remaining in the FIB source during source species switching, achieving a high purity hydrogen beam posed a significant challenge. Several contaminant species were commonly observed in the beam such as $N_2^+$, and $O_2^+$ likely from atmospheric contamination, and $Ar^+$ and $Xe^+$ which are due to residual contamination from previous ion source species and previous beam doping experiments.

While the gas delivery system and the plasma source are pumped using the PFIB vacuum system during gas source switching, the effectiveness of this pumping in reducing contamination is dependent on the pumping time prior to introducing the next gaseous source species. The pumping speed in this situation is limited not by the pump but by the gas flow rate, dictated by the conductance of the system. [55] Several factors such as the long, thin tubing used in the gas delivery lines, the metered orifice at the entrance of the plasma chamber, and apertures separating the differential pumping zones in the FIB column limit the conductance of the vacuum system and result in contaminant gas molecules remaining in the system if a sufficiently long pump cycle is not used. In applications where a high purity hydrogen beam was required, the gas delivery system and plasma source chamber were evacuated by vacuum pumping for an extended period of time, typically overnight. It was found that overnight vacuum pumping cycle reduces the Ar value to less than 1% of the beam composition.

To reduce the contaminant species even further, additional efforts are required such as multiple purge cycles, where the desired gas species is introduced and pumped out several times to enable scrubbing of residual gases from the system. Multiple purge cycles however waste a significant amount of high purity source gas which can be costly and require frequent changing of the source gas bottle. To perform critical experiments where no influence of other beam species is desired, the technique of splitting an ion beam into separate beamlets may be employed to direct different beam components (i.e., different ion species) towards different regions on a sample. This technique was used to advantage, for example, to isolate the X-ray signals generated upon a sample region by specific ion species.

Utilizing a shorter vacuum pump cycle allows a small amount of Ar to remain in the beam, which is typically undesirable when a high purity hydrogen beam is required. However, a short vacuum pumping cycle was found to provide a simple way to achieve a lightly doped hydrogen beam without requiring additional gas mixing in the source gas delivery system. A lightly doped (<10%) beam could be simply achieved by starting with a source comprised of the desired dopant species and switching to the hydrogen beam, by shutting off delivery of Ar gas and changing to delivery of hydrogen gas, using a modified pumping cycle (for example, as suggested in the following section) such that a significant proportion of the dopant species remained in the plasma source and gas delivery lines. While this method did not give a significant amount of control over the proportion of dopant species, post-characterization of the beam composition was typically performed, and the measured beam composition could be accounted for in any experimental data. Achieving a more heavily doped beam required gas mixing in the plasma chamber.

Optimized Beam Chemistry Control Parameters

The following are presented as typical operating parameters, as determined using the inventors' apparatus, and are not intended to be limiting in any way.

Source Plasma

Gas supply regulator should be adjusted to achieve 2-4× $10^{-3}$ mbar. The plasma chamber outlet pressure should be in the range of 6-7×$10^{-3}$ mbar. Plasma power should be set at 200 W or greater if there is no risk of damage.

Beam Splitting

Beam splitting should be used for isolation of individual components. For beam splitting, the immersion lens coil of an adjoining SEM column current should be adjusted to modify the strength of the magnetic immersion field. A coil current of approximately 2.04 amp-turns corresponds to a converged beam and a coil current of zero amp-turns for 30 keV at eucentric corresponds to a separation between the lightest ($H^+$) and heaviest ($Xe^+$) species of approximately 550 μm.

High Purity Hydrogen Beam

Focused Ion Beam gas delivery lines and plasma chamber should be vacuum pumped ideally overnight to remove residual gas species. For very pure beams, the desired gas should be introduced into the system, then pumped out for an extended period of time, and then reintroduced for plasma ignition.

Lightly Doped Hydrogen Beam

Starting with a source of the desired dopant species, the beam should be switched to hydrogen with a modified pumping cycle. A primary vacuum pump delay of ten seconds and a turbo-molecular pump delay of 10 seconds will result in approximately 10% of the dopant species with a balance of hydrogen.

Minimization of Beam Scattering

The chamber of the focused ion beam apparatus should be pumped for a minimum of 2 hours following attainment of a target vacuum pressure before commencing experiments. The pressure in the lower FIB column, generally maintained by an ion getter pump, should be monitored and allowed to equilibrate before commencement of experiments to avoid change in beam current or composition during experiments.

Verification of VLE-PIXE Signal Generation

As outlined below, experiments were performed to verify that detected X-ray signal are indeed generated as a result of proton impact on the sample. Additionally, the role of spurious signals generated by the microscope and associated equipment such as stray electrons, neutralized ions, and backscattered ions were analyzed as well as other spectral artefacts, such as those originating from the EDS detector itself. Optimized operating parameters are described for reducing the impact of these spurious signals on the VLE-PIXE measurements.

Proton Contribution to Signal

It is well known that, for a given acceleration energy, the X-ray production cross section (XRPCS) is greatest for protons, relative to heavier ions, as a result of their low mass and consequently high velocity. It is established that XRPCS decreases rapidly with increasing ion mass, such that even $He^+$ ions with a mass of 2 amu are incapable of generating sufficient X-rays for analysis. [56] For this reason, the greatest contribution to the VLE-PIXE signal is expected to be generated by protons. However, a doped beam originating from an inductively-coupled plasma ion source, as described above, comprises a variety of ion species. It is necessary to experimentally verify that the proton component of the beam is responsible for the generation of most or all of the intensity of an observed X-ray spectrum when such a beam is directed onto a sample.

As described previously herein, a magnetic immersion field produced by a magnetic immersion lens that is in proximity to the ion beam can cause the ion beam to be spatially separated into its individual mass components. The separated ion components of the beam may then be individually directed towards a sample while measuring the resulting X-ray emissions. In particular, experiments were conducted in which the separated beam components were directed towards a binary sample comprising a 1 μm aluminum layer sputter coated over one-half of a single crystal Cu (100) substrate. By moving the separated beamlets over an interface between the different materials on the binary sample, the X-ray signal contributions from each beam species could be determined.

Prior to the aforementioned experiment, a 2 nA preset, 30 keV hydrogen beam was measured prior to the experiment and whereby the beam was shown to be composed of: 10.84% $H^+$, 11.94% $H_2^+$, 53.14% $H_3^+$, 5.69% $O_2^+$ and $N_2^+$, and 18.37% $Xe^+$ with no detectable Ar signal. The beam was aligned such that only the $H^+$ component fell upon the Al film and the remainder of the beam fell upon the Cu substrate. An X-ray spectrum was captured for 20 minutes. The stage upon which the sample was mounted was then moved such that now both the $H^+$ and $H_2^+$ components fell upon the Al film. The stage movement was repeated for the remaining beam components and the spectra for each condition were compared. The spectrum from each successive irradiation was subtracted from the prior so that the contribution from each species could be isolated. The highest intensity Al peak, the Al L $\ell$ line was used for identification of the signal from the Al film. Due to proximity of the Al L $\ell$ line to the noise peak of the detector, the noise peak was subtracted from these spectra.

Figure 7:
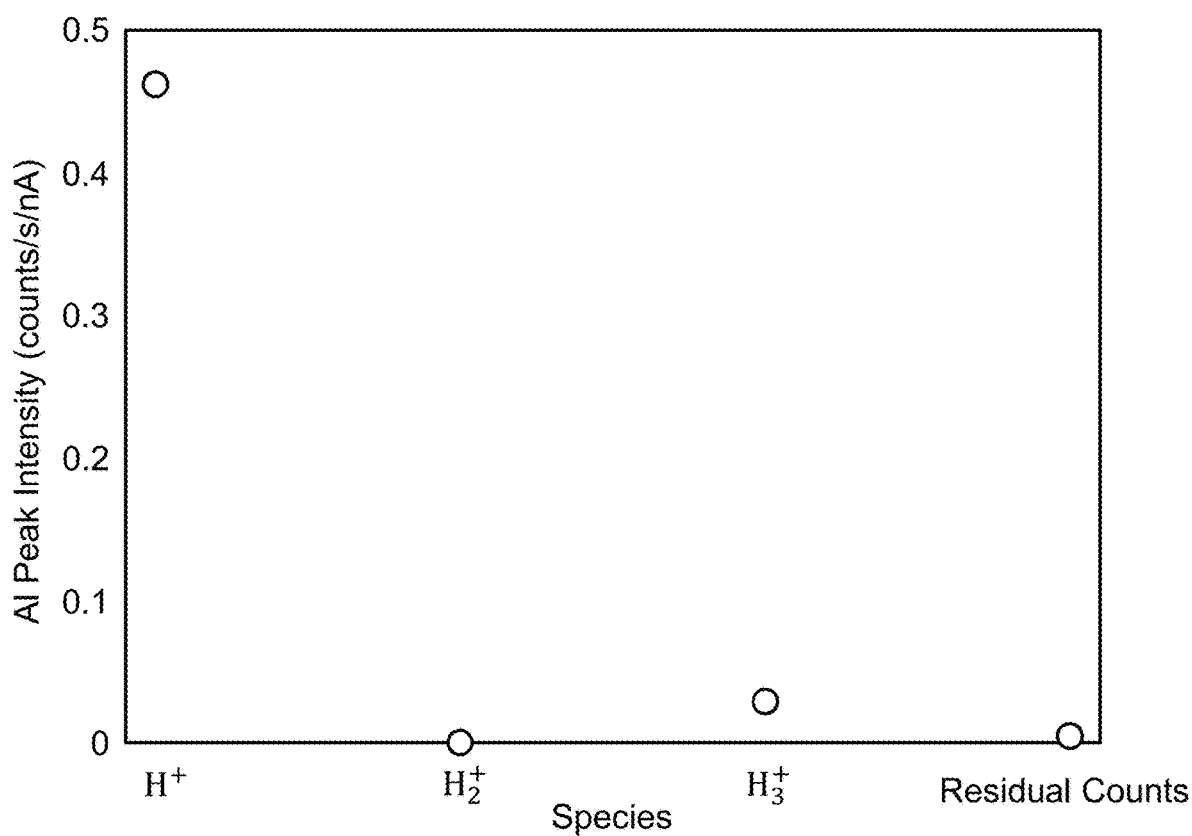
FIG. 7 is a graphical depiction of the measured spectral contribution, of each of several ion beam components, to the Al L$\ell$ X-ray peak of a 1 μm aluminum sputter demonstrating the predominant X-ray signal that originates from H$^+$ ions as compared to other ion species within a single ion beam.

As shown in FIG. 7, the majority of the X-ray signal of Al originates from the impact of $H^+$ ions (i.e., protons) upon the sample. It is also observed that, despite being higher in proportion than the $H^+$ ion, the contributions of the $H_2^+$ and $H_3^+$ molecules to the signal are negligible. Use of the magnetic immersion lens for beam separation in this experiment also has the added benefit that any stray electrons generated as a result of ion collisions with residual gas molecules would be deflected away from the sample.

The signal generated by protons alone, while being the dominant contribution to the spectra, is still much weaker than the signal generated when the hydrogen beam is doped with a heavier ion species. This can be determined by the total absence of the Al $K_\alpha$ line at 1.486 keV in the X-ray spectra generated by protons alone, compared to a prominent Al $K_\alpha$ line in the doped-beam spectrum of a sample of a NIST standard reference material in (e.g., FIG. 14A), despite the concentration of Al in in the latter sample being significantly lower (e.g., see Table 4). The presence of the Al $K_\alpha$ line in the NIST sample, with a much lower XRPCS than the Al $L^\ell$ line, demonstrates that beam doping, and in particular the overlapping of the doped beam components is essential in producing a large quantity of X-rays during VLE-PIXE measurements, and is important for the identification of minor and trace elements in a sample.

Interference from Backscattered Ions

At accelerating voltages greater than 24 keV a broad, intense background signal was found to appear at low X-ray energies and extending up to an energy of 3-4 keV. While initially believed to be Bremsstrahlung radiation as a result of primary ion impact on the sample surface, proton impact at such low energies is not expected to generate any appreciable Bremsstrahlung. Additionally, the background was shown to scale significantly in intensity with increasing target mass: Mg (Z=12), Cu (Z=29) and Au (Z=79), a phenomenon which is not typically observed to such a degree with Bremsstrahlung radiation.

To confirm the nature of this background, two spectra were collected on the same single crystal Cu sample with a windowed EDS detector and a windowless EDS detector at 8.1 key; below the threshold for this background. It was found that the background was present when the spectrum was captured with the windowless detector, yet was not when the windowed detector was used. This result demonstrates that the window is responsible for blocking the background signal.

It was concluded that this broad background signal was attributable to ions backscattering from the sample and impacting the EDS detector surface, thereby generating the signal. When the windowed detector is used, this signal does not appear until an energy of 24 keV due to the transmission threshold of the backscattered ions through the window. However, when the windowless detector is used, the backscattered ions are free to strike the detector surface. The fact that the thin detector window is capable of blocking all backscattered ions up to an energy of 24 keV while still allowing transmission of very low energy X-rays is a significant advantage of VLE-PIXE over LE-PIXE and PIXE techniques. VLE-PIXE spectra were typically performed at energies <24 keV to avoid the influence of backscattered ion background. However, spectra may be taken above 30 keV, up to at least 50 keV, if there is no risk of interference between the backscattered ion background and the analyte peaks.

Dependence of Signal on Overlap of Combined Proton/Heavy-Ion Beam

Figure 8A:
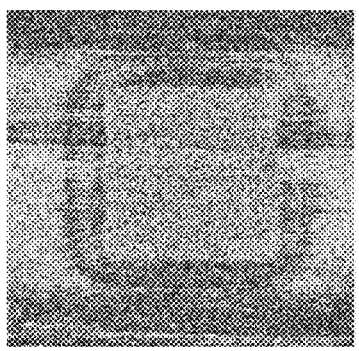
FIG. 8A is an electron micrograph of overlapping burn marks on a sample caused by exposure to multiple ion species focused into a single ion beam.
Figure 8B:
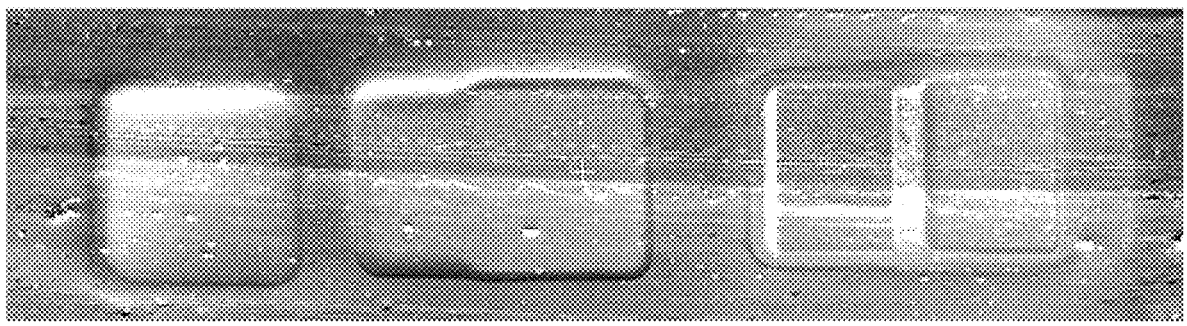
FIG. 8B is an electron micrograph of separated burn marks on a sample caused by adjusting the magnitude of a magnetic immersion field so as to separate a single beam composed of multiple ion species into separate "beamlets", each beamlet comprising a subset of the ion species.
Figure 8C:
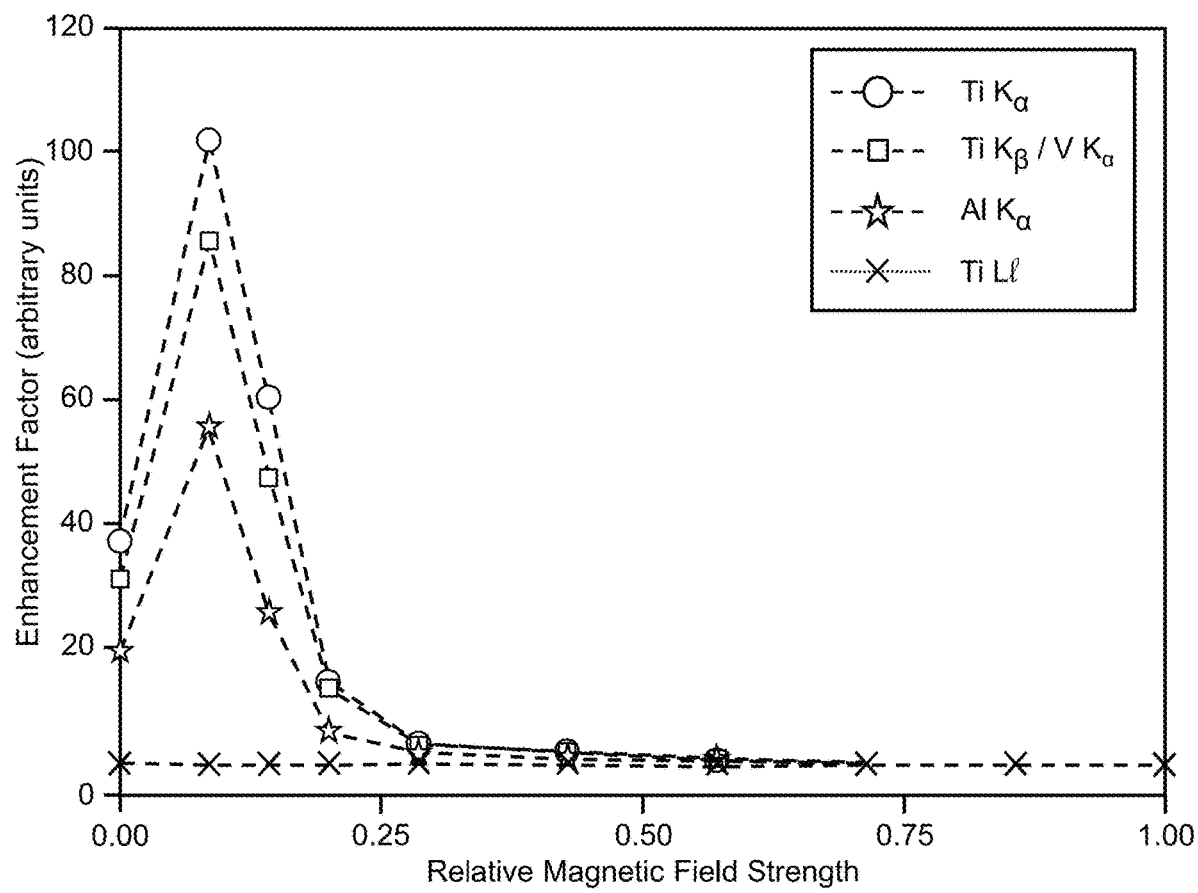
FIG. 8C is a plot of the measured intensities of some prominent X-ray peaks generated by exposure of a sample of NIST Standard Reference Material SRM 654b to a heavy-ion-doped proton beam, the measured intensities plotted against the relative magnetic field strength of a magnetic immersion field that causes separation of the beam into multiple beamlets.

As noted above herein, the trajectories of ions may be differentially deflected in accordance with their mass-to-charge values by causing the ions to pass through a magnetic immersion field as they travel from the FIB column to the sample. As a result, the beam can be separated into its individual mass components, as illustrated in FIGS. 8A-8B. The magnetic field strength can be adjusted so that the beam components fully overlap (FIG. 8A), or else separated from one another when the magnetic field strength increases (FIG. 8B). In the case of VLE-PIXE, the inventors' initial expectation was that the spatial separation of the proton and dopant species (e.g., FIG. 8B) would not have any significant impact on the VLE-PIXE signal strength. What was actually observed is that, as the proton and heavy-ion species become progressively separated, the X-ray signal rapidly decreases. This is shown in FIG. 8C where VLE-PIXE spectra of the NIST standard reference material SRM 654b (discussed further below in the Trace Element Analysis sub-section of this document, see Table 4) are shown as a function of relative magnetic field strength (correlative with beam separation). Specifically, FIG. 8C depicts the changing intensity of some prominent X-ray peaks, as the magnetic field strength is increases. The particular peaks that are illustrated in this plot were chosen as they remain present in all spectra. These results demonstrate that the impact of protons and heavy ion dopant species upon the same location on the sample results in an X-ray signal greater than the sum of the hydrogen and heavy ion dopant signals independently. Scanning electron microscope images of the burn marks of the irradiated spots shown in FIGS. 8A-8B demonstrate the changing overlap of the beam components with increasing magnetic field strength.

Additionally, the data of FIG. 8C indicate that the decrease in VLE-PIXE signal is not equal across the entire X-ray spectrum. Instead, this decrease is predominantly observed for the portion of the spectra comprising peaks having X-ray energy of greater than ~1 keV. The intensities of peaks in this lower energy region are relatively invariant to the magnetic field strength. For example, as may be seen in FIG. 8C, the Ti $L^\ell$ line does not change with respect to magnetic field strength. An important observation is that the peaks above 1 keV are predominantly K shell X-ray peaks whereas the peaks below 1 keV are predominantly L shell peaks. This evidence leads to the conclusion that the peaks observed below an energy of ~1 keV are likely due to the impact of protons alone, as these peaks are observed even when the beam components are separated.

It may also be noted, from the data plotted in FIG. 8C, that the maximum X-ray intensity with magnetic field strength is offset from the zero relative magnetic field position by ~20%. It is believed that this offset is due to an offset in setting the magnetic field strength required to counteract the remnant magnetic field of the magnetic immersion lens coil, which when adjusted becomes the reference point for the zero relative magnetic field strength. The zero relative magnetic field strength position is set by manually changing the magnetic immersion lens coil strength until all the beam component secondary electron images visually converge. The very weak intensity of the $H^+$ beam relative to the more intense $H_2^+$ and $H_3^+$ species, makes it very difficult to visually align the image generated by the $H^+$ ions. As such, visually aligning the beam images may not result in a complete overlap of the $H^+$ species with the remaining beam components at the zero relative magnetic field strength point.

In order to confidently conclude that the peak intensity behavior with depicted in FIG. 8C (specifically the decrease, with increasing beamlet separation, in X-ray intensity of X-ray peaks associated with energy levels above ~1 keV) is correctly explained in terms of complex interactions of both protons and dopant ions with the sample, it was necessary for the inventors to rule out possible non-sample-related alternative explanations. Such alternative explanations include: (a) changing total beam current with increase in the strength of the magnetic field that is used to separate the ion beam into beamlets and (b) effects of stray electrons generated from gas scattering within the vacuum chamber and FIB column.

To test the effect of the magnetic field strength on the total beam current, this current was measured at several values of relative magnetic field strength by integrating the individual current measurements of all component beamlets. From these experiments, it was observed that, although the total beam current fluctuates with changing magnetic field strength, the fluctuations are opposite to the behavior observed in FIG. 8C with respect to the change in X-ray intensity with magnetic field strength.

To further determine the influence of such a change in beam current on the VLE-PIXE spectra, several VLE-PIXE spectra of the SRM 654b were taken as a function of beam current spanning greater than an order of magnitude. Based on these experiments and taking into consideration the reduction in total X-Ray counts between the most intense spectrum and the spectrum at the maximum magnetic field strength in FIG. 8C, it was determined that a decrease of >90% in total beam current would be required to observe the measured change in VLE-PIXE signal (FIG. 8C). Since a change of no greater than 20% in total current was observed over the full range of magnetic field strengths during collection of the series of SRM 654b spectra, a change in current with magnetic field cannot be responsible for the observed effect. Further, the change in VLE-PIXE signal observed with respect to total ion current during collection of the series of SRM 654b spectra, was found to affect the entire spectrum equally. This result is in contrast to the general observation change in magnetic field strength generated by the magnetic immersion lens affects only the spectral region above 1 keV. This provides additional evidence that a change in beam current cannot be responsible for the decrease in VLE-PIXE signal with changing magnetic field.

Finally, the alternative hypothesis that the X-ray intensity behavior that is observed in FIG. 8C is related to the acceleration of stray electrons onto the sample was ruled out by virtue of the inventors' general observation that, although electrons may cause enhancement of the VLE-PIXE signal, they do so at the expense of increased Bremsstrahlung background. Such increased Bremsstrahlung background is not observed in the VLE-PIXE spectra. It is thus concluded that the VLE-PIXE signal enhancement induced by beam doping therefore cannot originate from the increased production of electrons in the lower column due, for example, to the enhanced scattering from gas molecules by the dopant heavy ion species.

Influence of Heavy Ion Species Identity on VLE-PIXE Performance

As established above, the effect of the proton and heavy ion dopant species on the same region of the sample is essential for generating an enhanced X-ray signal. To establish the influence of the dopant ion species on X-ray production, beams were prepared with >99% hydrogen, and with hydrogen doped with N, Ar, and Xe. The effects of increasing the magnetic immersion field generated by the magnetic immersion lens were investigated for each beam composition. To establish the >99% hydrogen beam, the FIB column was evacuated overnight to remove residual gaseous species. To establish the lightly doped beam, the gas mixing procedure described above was used. The composition of these beams before and after the measurements are shown in Table 3 below.

The intensity with respect to increasing magnetic field strength for all spectra once again follows a trend similar to that shown in FIG. 8C, first increasing, then decreasing. However, the response of the undoped (>99% hydrogen) VLE-PIXE spectrum to increasing magnetic field strength exhibits only a moderate decrease of peak intensities in the portion of the EDS spectrum greater than 1 keV. This response shows that some residual contamination is still present despite the best efforts to establish a very clean beam and also demonstrates that even a trace amount of contamination is sufficient to enhance the production of X-rays. The undoped and nitrogen spectra are quite similar with the exception of a significantly enhanced peak at ~0.392 keV which can be attributed to emission from the nitrogen projectile. The similar change with respect to magnetic field for both these spectra suggests that the nitrogen has a negligible effect on the enhancement of the VLE-PIXE spectra and that any enhancement relative to the separated beam may be due to residual Ar or Xe contaminants. The Ar-doped and Xe-doped spectra exhibit a significant peak enhancement relative to the fully separated beam across the entire spectrum greater than 1 keV. When compared to the Xe-doped spectra, an intense peak at an X-ray energy of ~0.22 keV is observed in the Ar-doped spectra and is attributed to emission from the Ar projectile. The Xe-doped spectrum however does not show any additional peaks and as such, is determined to be the favorable species for analysis of low energy peaks in the region where the influence of Ar or N may obscure sample characteristic peaks.

TABLE 3

Quantified beam component currents before and after experimental exposures of sample to various ion beam compositions. N/D denotes that this species was not detected by the measurement technique.

| Species | Percentage Before | Percentage After |
| --- | --- | --- |
| >99% hydrogen Beam | | |
| $H^+$ | 6.19 | 6.24 |
| $H_2^+$ | 13.81 | 13.86 |
| $H_3^+$ | 77.65 | 77.67 |
| $O_2^+$, $N_2^+$, etc. | 1.15 | 0.75 |
| $Ar^+$ | N/D | N/D |
| $Xe^+$ | 1.19 | 1.45 |
| Nitrogen-doped hydrogen beam | | |
| $H^+$ | 7.57 | 10.11 |
| $H_2^+$ | 12.92 | 14.62 |
| $H_3^+$ | 72.04 | 66.69 |
| $O_2^+$, $N_2^+$, etc. | 6.28 | 5.47 |
| $Ar^+$ | N/D | N/D |
| $Xe^+$ | 1.20 | 3.12 |
| Argon-doped hydrogen beam | | |
| $H^+$ | 10.80 | 10.31 |
| $H_2^+$ | 12.70 | 12.83 |
| $H_3^+$ | 64.84 | 65.96 |
| $O_2^+$, $N_2^+$, etc. | 3.93 | 3.63 |
| $Ar^+$ | 7.72 | 6.26 |
| $Xe^+$ | N/D | 0.99 |

TABLE 3-continued

Quantified beam component currents before and after experimental exposures of sample to various ion beam compositions. N/D denotes that this species was not detected by the measurement technique.

| Species | Percentage Before | Percentage After |
|---|---|---|
| Xenon-doped hydrogen beam | | |
| $H^+$ | 8.62 | 5.12 |
| $H_2^+$ | 11.91 | 12.42 |
| $H_3^+$ | 57.75 | 68.84 |
| $O_2^+$, $N_2^+$, etc. | 6.35 | 4.41 |
| $Ar^+$ | N/D | N/D |
| $Xe^+$ | 15.36 | 9.22 |

Figure 9:
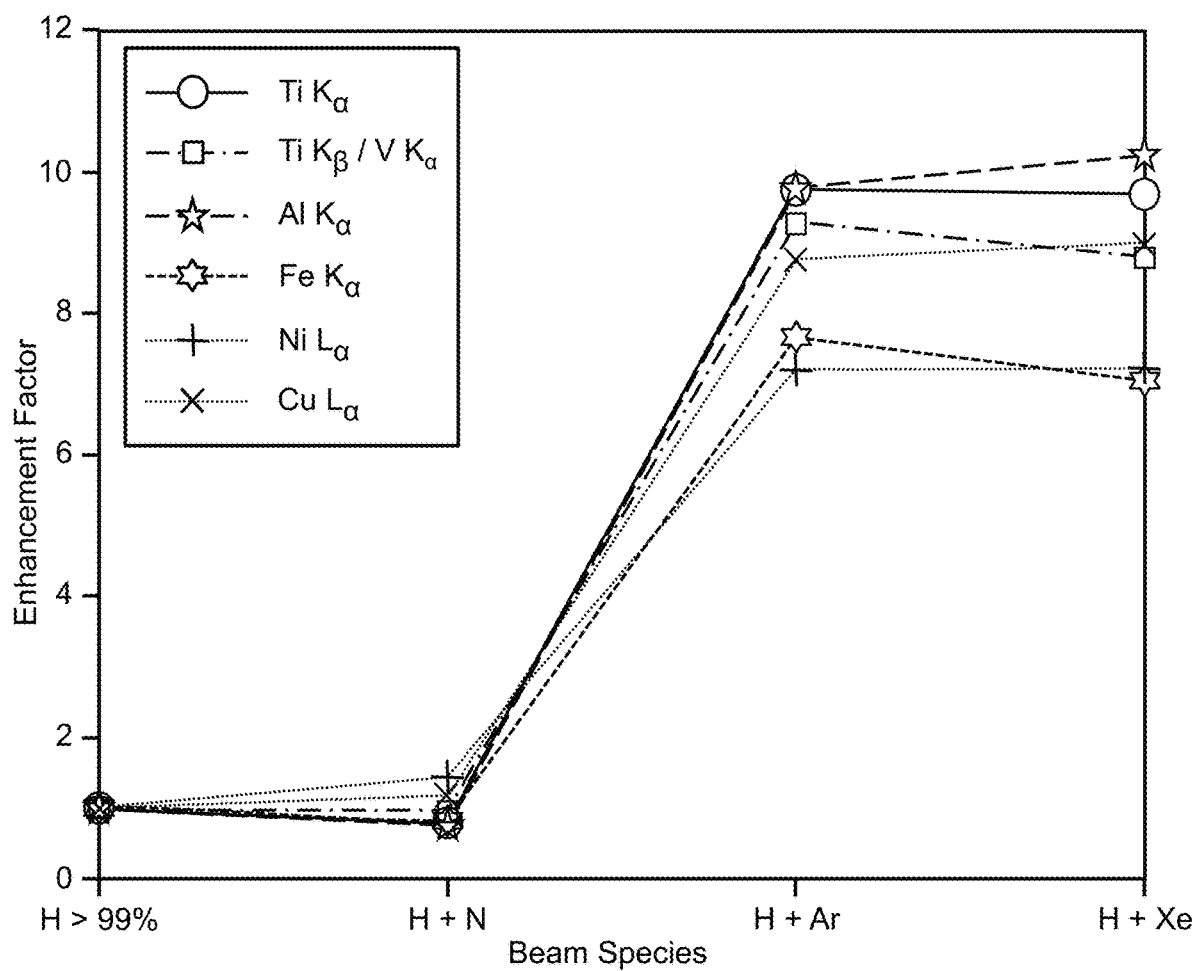
FIG. 9 is a graphical representation of X-ray signal enhancement factors, relative to an ion beam composed of >99% hydrogen, of several X-ray peaks of NIST Standard Reference Material SRM 654b, as observed for light doping of the beam with nitrogen, argon and xenon dopants.

Enhancement factors relative to the undoped hydrogen beam are shown in FIG. 9 for each dopant species. As shown in that figure, a significant increase in X-ray production is demonstrated with the introduction of the Ar and Xe species, however the effect of the N species was negligible. The low spectral enhancement of nitrogen may be due to the simple nature of the N electronic structure compared to Ar and Xe, resulting in a less significant change in the electronic structure of the target atoms due to the formation of quasi-molecules. The higher velocity of the N species, as well as the smaller atomic radius may also result in a shorter-lived quasi-molecule compared to Ar or Xe. The inventors have calculated that the collision time for N will be approximately 0.58 times that of Ar and 0.37 times that of Xe, which also reduces the probability of coincident interaction with the sample. All these factors will result in a reduction in performance for N compared to Ar and Xe as reflected in FIG. 9.

The increase in performance between the Ar and Xe dopant species was small. This effect may be due to the much larger distance of closest approach for Xe compared to Ar, defined as the smallest internuclear distance achieved during a collision. This metric, calculated as $5.76 \times 10^{-11}$ m and $5.18 \times 10^{-10}$ m for Ar and Xe respectively, influences the shift in energy levels associated with the formation of a quasi molecule, with a smaller distance of closest approach resulting in a greater shift in projectile and target energy levels. In the case of N, despite the much smaller distance of closest approach compared to Ar and Xe at $8.71 \times 10^{-12}$ m, the simple nature of the N electronic structure and the short-lived quasi-molecule will negate the influence of the smaller distance of closest approach.

Influence of Proportion of Dopant Species on VLE-PIXE Performance

Figure 10:
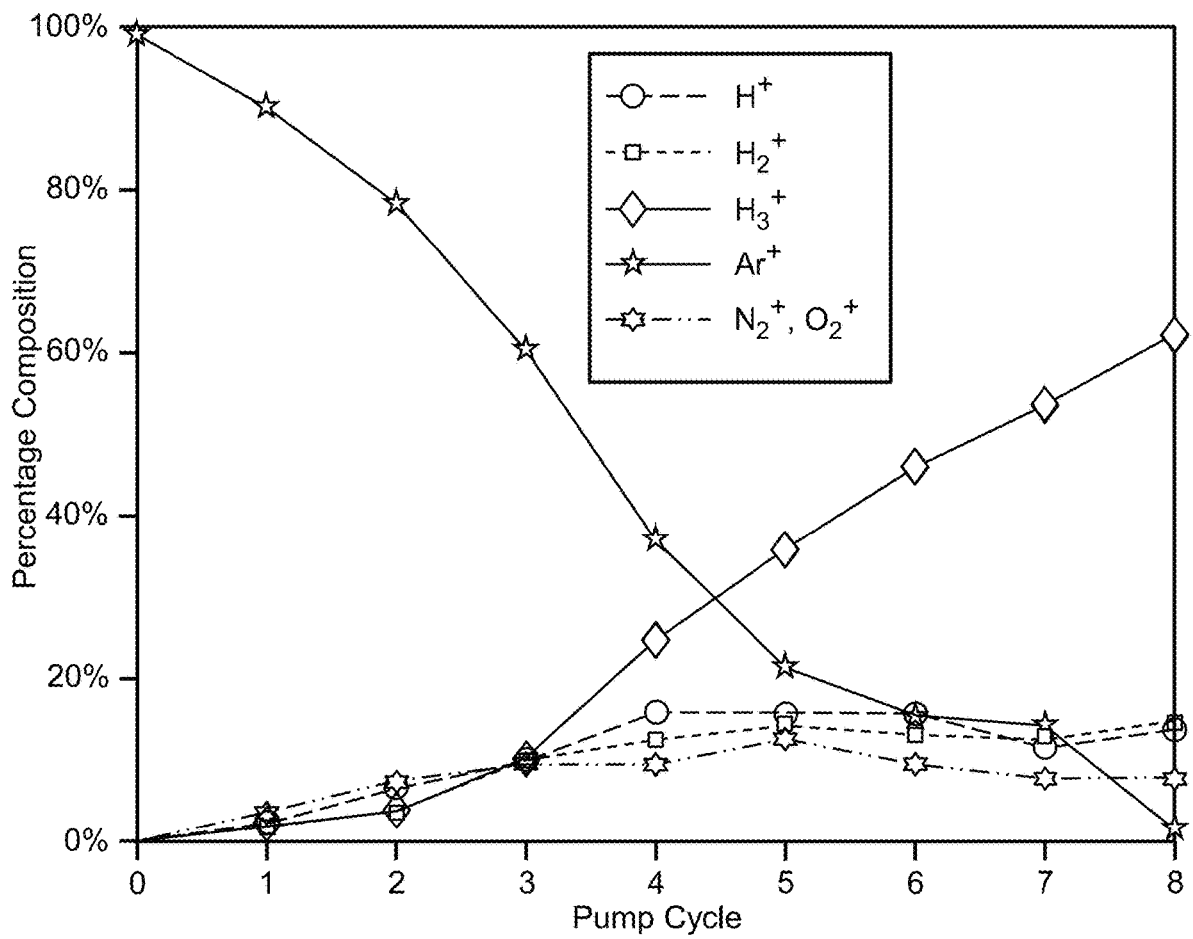
FIG. 10 is a plot of the percentages of various ion species within an ion beam plotted against the number of plasma source evacuation cycles employed to progressively reduce the concentration of residual argon in the source and column of an FIB apparatus.

An experiment was carried out to determine the influence of the proportion of dopant species on VLE-PIXE performance. This experiment was performed using Ar as a dopant as opposed to Xe, despite Xe being preferable due to the absence of additional peaks that are found in the Ar-doped spectra. Xenon was not used due to a limitation of the Xe source plasma. However, it is expected that Xe will give similar results to Ar as demonstrated by the performance increase relative to the >99% hydrogen beam as shown in FIG. 9. In a first part of the experiment, a VLE-PIXE spectrum was taken on NIST standard reference material SRM 654b (Table 4) with a >99% Ar beam. Contamination from previous source species meant that some amount of hydrogen was still present which could result in the generation of some amount of X-rays. With the gas supply lines for the plasma source filled completely with Ar, the hydrogen beam was switched on, introducing a small amount of hydrogen gas. The beam composition was measured and a VLE-PIXE spectrum was captured. The source plasma was then switched off and a small section of the gas supply lines was evacuated using the plasma source vacuum system. The plasma source was once again ignited, resulting in a dilution of the initial Ar content with a balance of hydrogen. This was performed several times, resulting in a number of VLE-PIXE spectra vs. the partial pressure of argon in hydrogen. The percentage composition of the beam with each vacuum pumping cycle is shown in FIG. 10 where the Ar content is shown to decrease from 99% to 1.7% over the course of the measurements.

It should be noted that using the experimental method described in the above paragraph will generally result in significant contamination to the gas delivery lines up to the hydrogen gas source bottle. Thorough flushing and pumping of the lines is recommended following this measurement. For commercial applications where a desired proportion of hydrogen to dopant species is required, ideally a pre-mixed gas source will be used such that the beam composition remains fixed over the course of the experiments and the beam composition can be reproduced in a more predictable manner. For more flexible beam mixing, mass flow controllers (MFC) may be used to precisely determine the mixing ratio of each beam species.

Figure 11:
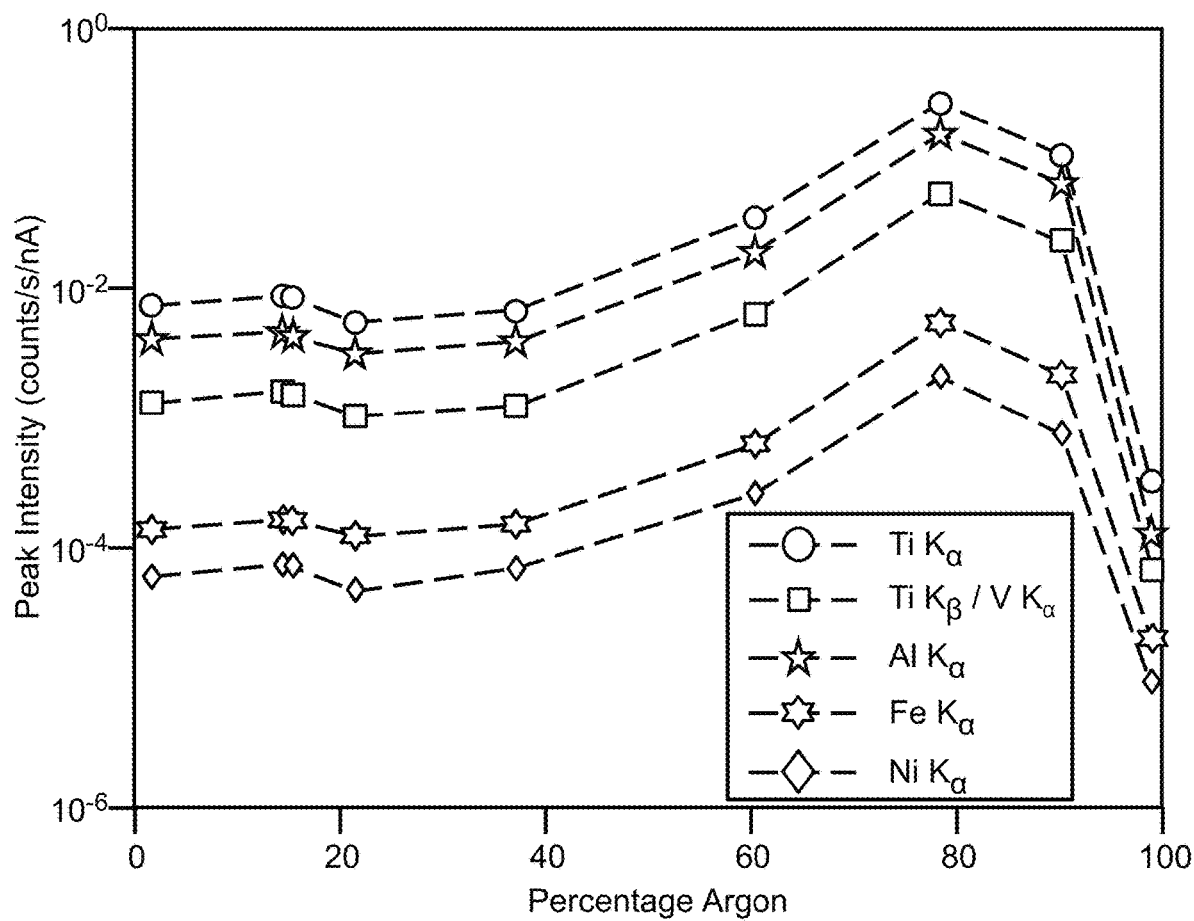
FIG. 11 is a plot of the measured intensities of some prominent X-ray peaks generated by repeated exposure of a sample of NIST Standard Reference Material SRM 654b to hydrogen ion beams having progressively decreasing percentages of Ar dopant, the Ar percentages controlled by repeated plasma source evacuation cycles such that beam compositions are as shown in FIG. 10.

An increase in the total signal intensity is demonstrated as the Ar percentage increases from 1% to ~80% as shown in FIG. 11. This is followed by a rapid decrease in the VLE-PIXE signal as the Ar content approaches 99%, and the hydrogen content in the beam approaches zero. This result demonstrates that some proportion of hydrogen is required to generate the VLE-PIXE signal. The addition of even a small percentage of a heavy ion species to a hydrogen beam results in a significant enhancement of the VLE-PIXE signal. Conversely, adding a small percentage of hydrogen to a heavy ion species beam can result in a heavy ion beam which is also capable of producing a characteristic X-ray signal. This opens up the possibility for techniques such as an endpointing method, where the X-ray signal can be analyzed during FIB milling with a heavy ion beam, allowing precise control over sample delayering. Also, this could provide an alternative to serial tomography, where both the milling and characterization steps can be combined into one, potentially reducing the experimental time taken to perform this technique.

Determination of Spectral Intensity Contributions of Isolated Heavy-Ions

Since X-ray signal intensity is observed to increase with the additions of small proportions of dopant heavy ions to an ion beam composed primarily of hydrogen, it is important to determine to what degree the increased signal intensity is attributable to just the dopant. Therefore, to determine the influence on X-ray production of the heavy ion species alone, VLE-PIXE spectra were taken with beams where the vast majority of the beam was comprised of the dopant species N, Ar, and Xe. In a first experiment, a high purity (>99%) nitrogen beam was established by vacuum pumping the FIB plasma chamber overnight. The beam composition prior to the experiment was measured by the methods described above. These measurements determined that the vast majority of species in the beam may be attributed to the $N_2^+$ ion and the $N^+$ ions. Trace amounts of other beam species such as hydrogen species may have been present but were below the detection threshold for the measurements.

The measurements of X-rays emitted from the sample indicate that a significant quantity of X-rays are produced when the sample is bombarded with an ion beam that is composed almost entirely of nitrogen. The X-ray spectrum of the sample includes peaks attributable to Titanium (Ti L$\ell$, Ti K$_\alpha$, Ti K$_\beta$), Vanadium (V L$\ell$, V K$_\alpha$), Aluminum (Al K$_\alpha$) and Silicon (Si K$_\alpha$). However, given that these X-rays are being produced at an energy where the Coulomb X-ray production cross section for nitrogen ions is expected to be diminishingly small, it is quite likely that these X-rays are being produced through quasi-molecular interactions or as a result of the trace amounts of hydrogen remaining in the beam. As Brandt and Laubert explained, due to quasi-molecular interactions between the projectile and the target atom, the cross sections for heavy ion X-ray production will be significantly higher than for protons at such low energies [57] Additionally, the appearance of a broad, intense peak at an energy of 0.39 keV is likely attributed to molecular orbital emission originating from vacancy transfer from the N projectile ion to the target atom. This molecular orbital emission was first observed by Saris and Macdonald [58,59].

A similar experiment was performed using an Ar beam where once again, a relatively high purity beam was established. The same Ti, V, Al and Si peaks that were observed in the high-purity nitrogen-beam experiment are also observed in the X-ray spectrum induced by high-purity argon beam experiment. Additionally, an intense X-ray peak is observed at an energy of ~0.22 keV which is located close to the Ar Ln peak at 0.2217 eV and the Ar L$\ell$ peak at 0.2201 eV. This peak is once again likely attributed to molecular orbital emission from the interaction between the projectile and the target atom as discussed for the case of the nitrogen VLE-PIXE spectrum. Some weak characteristic peaks are also observed which may be due to vacancy transfer.

Finally, a similar experiment was performed using a high purity Xe beam. It should be noted that the RF power of the Xe plasma at 37 W is significantly lower than the 200 W used for the other species. Due to the much higher ionization potential for the other beam species, it is likely that this Xe beam is comprised almost exclusively of Xe and this hypothesis is borne out by analysis of the beam composition prior to analysis in which only the Xe$^+$ species was detected. Weak X-ray peaks attributable to Ti Al, Si and V are observed. The X-ray spectrum also indicates that Xe performs well as a dopant to a hydrogen beam and be considered to be the optimal dopant species, as compared to N or Ar, as the result of a greatly reduced spectral background. However, it should be noted that the use of Xe can result in greater sample damage due to high sputter yield. Additionally, limitations on RF power which can be applied to the Xe plasma will limit the use of Xe as a dopant at high partial pressures of either hydrogen or Xe where higher RF powers are required for efficient ionization of the hydrogen molecules and the formation of protons.

To determine whether the signal intensity of the spectrum observed under bombardment by a doped hydrogen beam is indeed greater than the sum of spectra produced by bombardment by each component separately, the most intense spectrum from the high purity hydrogen beam experiment and the most intense spectrum from the high purity Xe beam were added in proportion to generate an artificially generated Xe-doped hydrogen spectrum. The results show that, when the individual pure H and pure Xe spectra are added together, adjusted to the proportion of each species in the beam, the resulting intensity is significantly lower than the VLE-PIXE spectrum achieved when doping a hydrogen beam with a small percentage of Xe, thereby confirming the hypotheses that, to obtain high quality VLE-PIXE spectra, the separate proton and heavy ion beams must overlap and that any detailed theory of the mechanism of X-ray emission must account for the interactions of both species with the sample.

Optimised Doped Beam VLE-PIXE Parameters

The following are typical apparatus operating parameters, as determined using the inventors' apparatus and are not intended to be limiting in any way:

Beam Configuration

Magnetic immersion field of SEM column, if present can be adjusted to achieve highest X-ray signal, which may be offset by ~20 percent relative to the lens setting that gives rise to converged beams.

Dopant Species

Xe will ideally be used as a dopant species due to lack of additional molecular orbital peaks generated by this species.
Ar may be used in situations where high RF powers are needed as high RF power Xe plasma may cause permanent damage to plasma source.

Heavy-Species-Doped Hydrogen Beam

Evacuate plasma chamber and FIB column overnight.
Switch ion source input to desired dopant species for a period of no less than 30 minutes.
Modify vacuum pumping cycle for a PVP delay of 10 seconds and a TMP delay of 10 seconds.
Switch ion source input to hydrogen. This will result in ~10% dopant species with a balance of hydrogen, which is optimal for trace element analysis.

Hydrogen-Doped Heavy Species Beam

Ideally, a pre-mixed gas source is used such that a beam composition of 80% heavy ion species with a balance of hydrogen species is achieved.
Alternatively, the plasma source gas delivery lines can be filled with a low pressure of hydrogen, and the heavy ion species plasma is turned on to introduce a balance of heavy ion species.
For more flexible gas mixing, a micro-flow controller can be used to control the proportion of gaseous precursor species.

Applications of VLE-PIXE

EDS Mapping

An important capability of micro and nanoscale analytical techniques such as SEM-EDS, and micro-PIXE is the ability to spatially resolve elemental components in a sample. This offers a significant advantage over bulk analytical techniques in that the distribution of elements within a sample can be established with a resolution limited by the instrumentation being used.

Figure 12A:
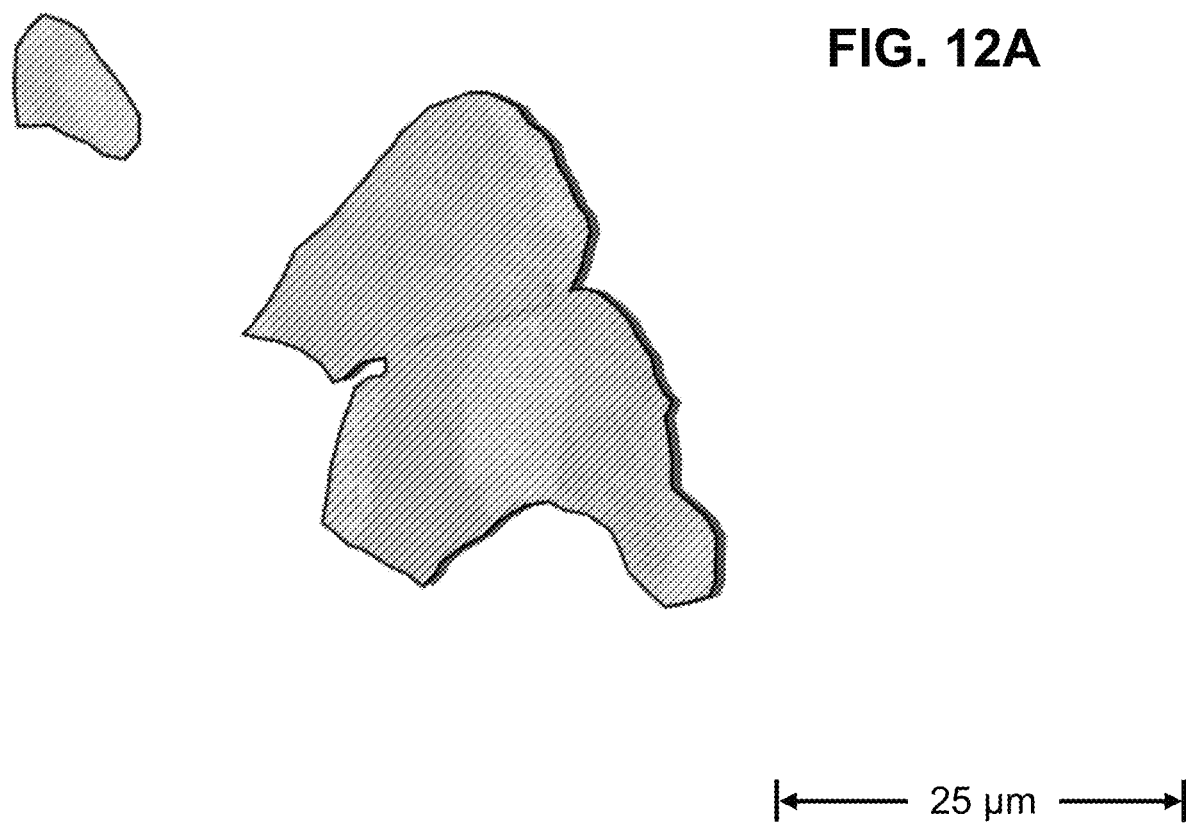
FIG. 12A is a re-drawn version of thin MoS$_2$ flakes exfoliated on a Si(100) wafer that were observed using FIB secondary electron (SE) contrast imaging.

Examples of VLE-PIXE elemental maps, collected with a ~50 nA Xe doped hydrogen beam (~6% Xe with a balance of hydrogen) are shown in FIGS. 12B-12C. FIG. 12A is a re-drawn version of a thin $MoS_2$ flake exfoliated on a Si(100) wafer that was observed using FIB secondary electron (SE) contrast imaging. Some smaller flakes above the main flake could not be initially identified using only the contrast image. However, the elemental maps of Mo and S, which are shown in FIGS. 12B-12C, identify the presence and identities of multiple flakes and correlate well with the SE image. These maps were captured in an automated fashion using the supplied Oxford Instruments AZtec™ software package and corresponding external scan generator, which were installed as standard on the FIB microscope. Accordingly, such experiments may be performed with essentially no modification to the instrument.

There are some challenges involved with the VLE-PIXE mapping capability that will need to be overcome. In particular, the high currents required for the VLE-PIXE measurements result in significantly reduced resolution compared to optimal imaging conditions for the FIB. Generational advancements in the PFIB instrument will however improve high current resolution. Also, due to the relatively low signal generated even by the doped hydrogen beam, map capture times are quite significant, reaching on the order of 1 hour for the maps shown in FIGS. 12B-12C. Improvements in detector sensitivity will help reduce map capture times. Additionally, increasing the proportion of dopant species can increase the generated X-ray signal as discussed above. However, the improvement in signal strength will be achieved at the expense of increased sample damage due to sputtering.

The presence of the dopant species in an ion beam used for VLE-PIXE mapping will inevitably result in the sputtering of the underlying sample, meaning that the sample will be continuously modified during map capture. While this phenomenon must be taken into account during doped-beam VLE-PIXE mapping, it may nonetheless be beneficial in certain situations—for example, where each map can originate from a subsequent layer of the sample. If these maps are then stacked together, a 3-dimensional elemental map can be established, a technique known as tomography. Current tomography workflows are typically performed in a serial fashion, by first removing a layer of material, followed by sample analysis. The use of doped beam VLE-PIXE mapping may however replace serial tomography procedures with a single-step method of simultaneous layer removal and analysis.

The VLE-PIXE mapping may also be used in conjunction with an endpointing procedure, whereby the X-ray signal is analyzed during milling. This procedure will allow milling to be stopped precisely at the interface of two layers due to the appearance of a new characteristic X-ray peak corresponding to the start of the next layer and can also be performed in real-time as opposed to other methods which may require serial delayering and analysis.

Trace Element Analysis

Energy dispersive spectroscopy performed with a scanning electron microscope (SEM-EDS) is an analogous technique to PIXE, where both rely on the impact of particles for inner-shell ionization, resulting in the emission of X-rays characteristic to the element being analyzed. Whereas PIXE uses ions, typically protons for ionization, SEM-EDS utilizes electrons for the same purpose. [60]

The X-ray production cross section for electrons is an order of magnitude greater than for protons at the energy ranges used in VLE-PIXE (i.e., 50 keV). The generation of X-rays by electrons is therefore expected to be far more efficient. [61,62] However, SEM-EDS also possesses a significant disadvantage—namely, the appearance of intense Bremsstrahlung radiation which can obscure low-intensity X-ray peaks. The Bremsstrahlung background effectively reduces the sensitivity of SEM-EDS to a Lower Limit of Detection (LOD) of approximately 100-500 parts per million (ppm), [14] compared to the LOD of PIXE in the MeV range, which is near or below 1 ppm. [13] The LOD for VLE-PIXE is expected to be several orders of magnitude higher than for PIXE due to the diminishing XRPCS for protons in the VLE-PIXE energy range. [63]

Direct comparison between PIXE and SEM-EDS is often difficult due to the significant differences in instrumentation between the two techniques. However, implementation of VLE-PIXE on a dual-beam PFIB/SEM microscope allows both techniques to be performed consecutively using the same detector, X-ray window, software, and vacuum conditions, thereby allowing more direct comparison. In order to compare the two techniques, analyses were conducted of two standard reference materials (SRM) provided by the National Institute of Standards and Technology (NIST). Both of these materials possess a well defined, certified composition with a range of major, minor, and trace elements. In the following, the VLE-PIXE results are directly compared to SEM-EDS, an analogous technique which is routinely performed for elemental analysis in an SEM, and the relative sensitivities of the two techniques are assessed, as discussed below.

The first sample that was measured was NIST SRM 654b, which is a Ti base alloy with a range of bulk and trace elements. The certified composition is shown in Table 4, with the balance of the composition being Ti (not listed). Concentrations in Table 4 are expressed as mass fractions, in percentages, unless marked with an asterisk (*) in which case the concentration is given in mg/kg. Values shown in parentheses are for information purposes only.

Figure 13:
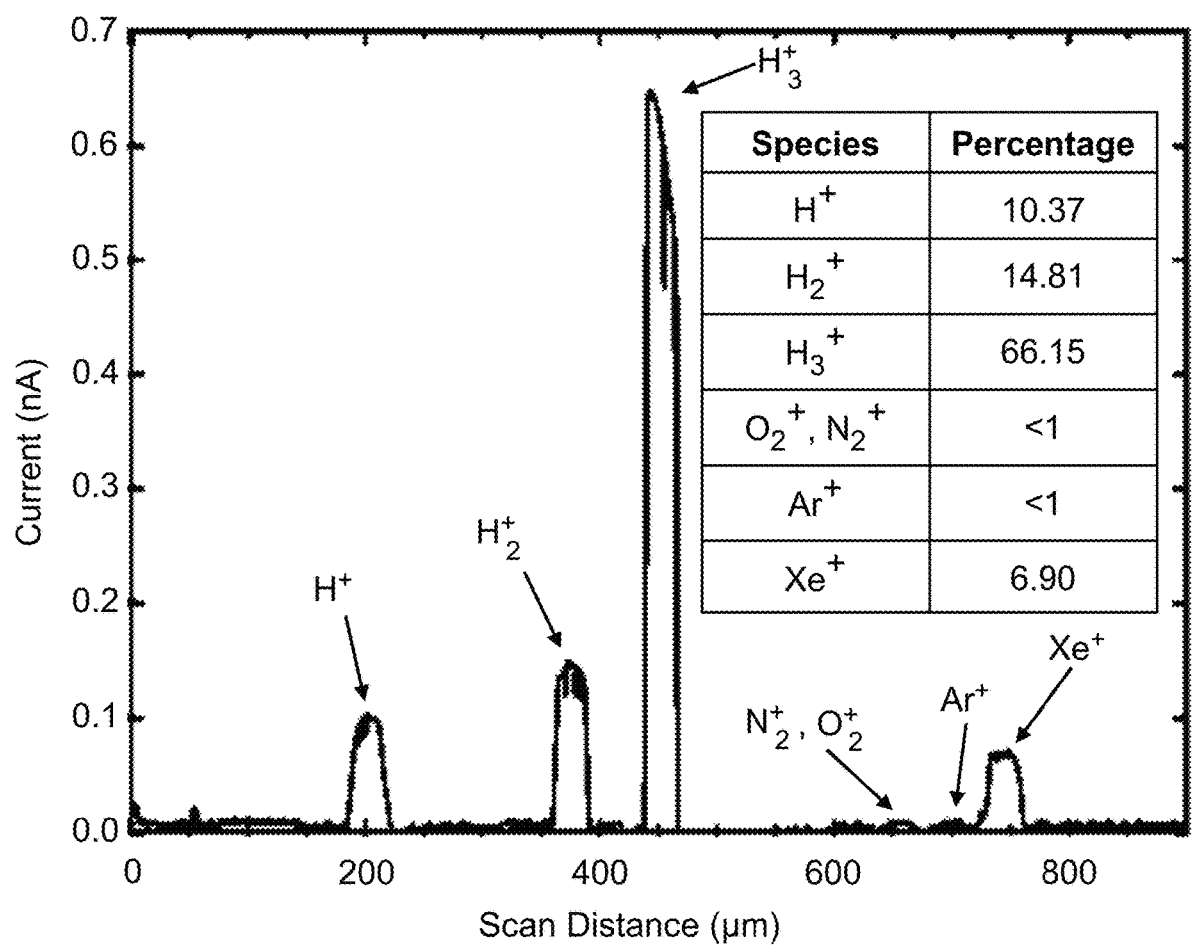
FIG. 13 is a graphical and tabular representation of the percentages of ion species within a Xe-doped hydrogen beam prior to exposure of a sample of NIST Standard Reference Material SRM 654b to the beam, the percentages determined from ion currents measured for each of several separated beamlets, each beamlet comprising a subset of the full set of ion species.

The beam composition measurement prior to analysis is graphically shown in FIG. 13 as a function of beamlet separation and is expressed as a percentage of the total beam current in the table embedded within FIG. 13. This measurement established

TABLE 4

NIST SRM 654b certified concentration values.

| Element | Value | Error (±Value) |
|---|---|---|
| Chromium | 0.025 | 0.006 |
| Copper | 80* | 30 |
| Molybdenum | 0.013 | 0.003 |
| Iron | 0.23 | 0.03 |
| Aluminum | 6.34 | 0.06 |
| Vanadium | 4.31 | 0.06 |
| Nickel | 0.028 | 0.006 |
| Tin | 230* | 60 |
| Silicon | 0.045 | 0.003 |
| Zirconium | 0.008 | 0.003 |
| Hydrogen | (0.002) | 0.002 |
| Sulfur | (0.001) | 0.001 |
| Oxygen | (0.17) | 0.17 |
| Boron | 1.12* | 0.13 | the presence of a hydrogen beam doped with approximately 6.9% Xe. As noted previously herein, a greater proportion of dopant species will result in enhanced X-ray signal production but will do so at the expense of increased sample damage due to sputtering by the heavier ion species. As such, a small percentage of dopant species was chosen for these experiments to maintain the integrity of the sample. To account for the relatively lower X-ray production with a smaller percentage of dopant species, the capture times for SEM-EDS and doped beam VLE-PIXE of 20 minutes and 4 hours respectively were chosen such that both spectra were acquired with a similar number of total X-ray counts (~10 M counts).

Figure 14A:
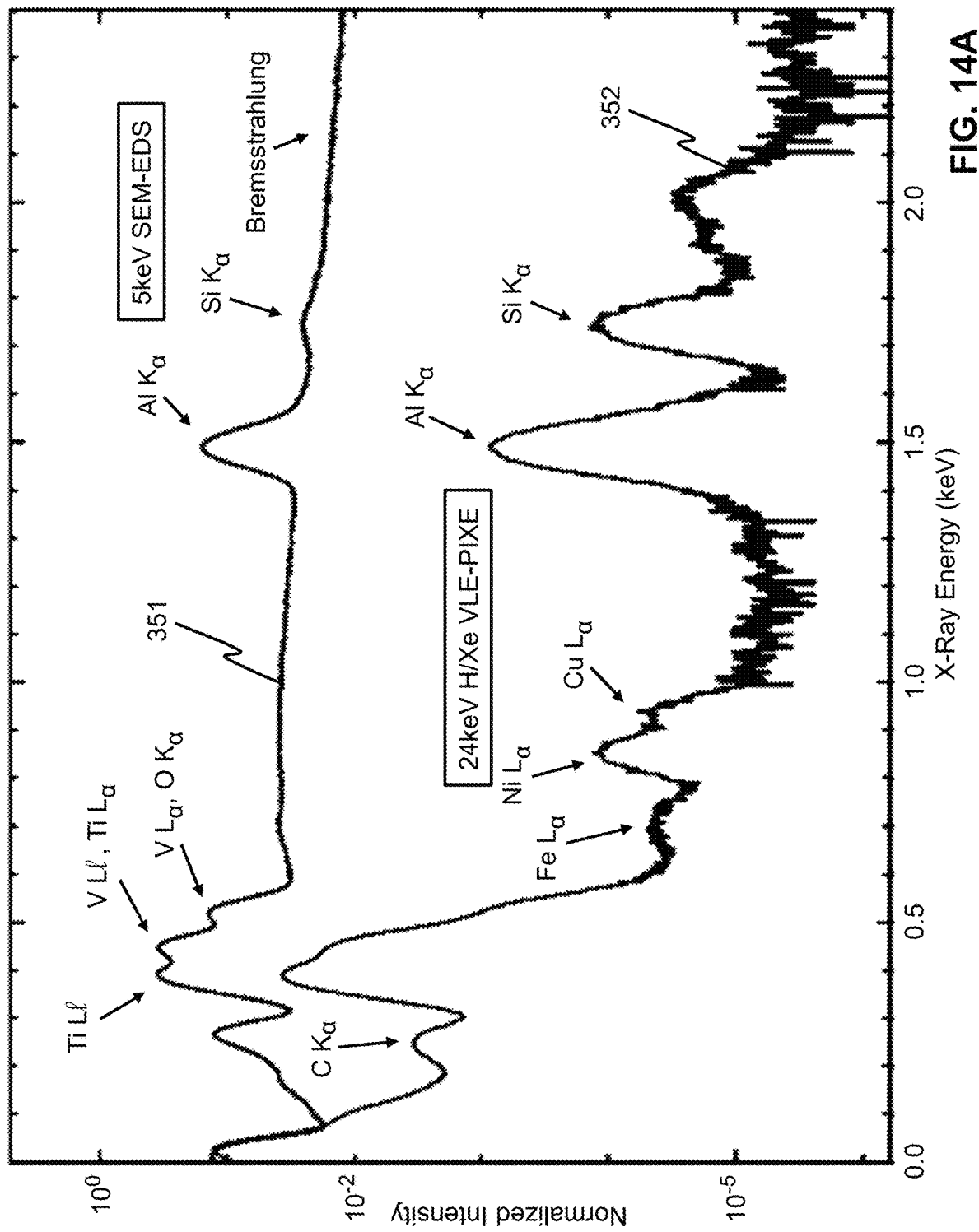
FIG. 14A is a comparison between a 24 keV VLE-PIXE spectrum of NIST Standard Reference Material SRM 654b, as obtained using analysis methods taught herein, and a 5 keV SEM-EDS spectrum of the same sample.
Figure 14B:
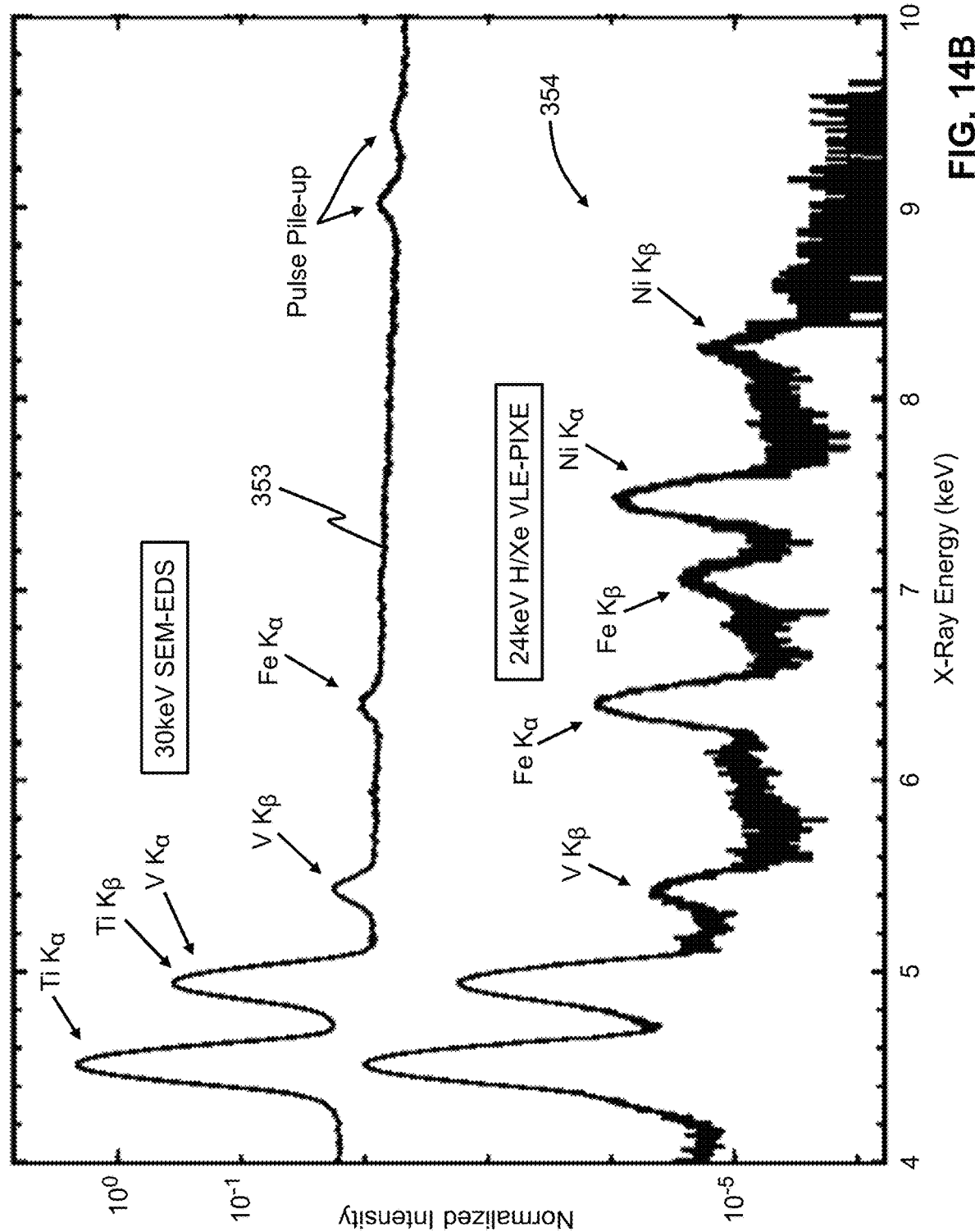
FIG. 14B is a comparison between a 24 keV VLE-PIXE spectrum of NIST Standard Reference Material SRM 654b, as obtained using analysis methods taught herein, and a 30 keV SEM-EDS spectrum of the same sample.

The Xe doped VLE-PIXE spectrum at an accelerating voltage of 24 keV is shown in comparison to an SEM-EDS spectrum at an accelerating voltage of 5 keV in FIG. 14A. A 24 keV ion beam was used to minimize the transmission of backscattered ions through the X-ray detector window and a 5 keV electron beam was chosen for increased sensitivity to the peaks in the X-ray energy range <2.5 keV, an effect known as the overvoltage ratio. [64] An equivalent comparison in the X-ray energy range, 4-10 keV is shown in FIG. 14B, where a 30 keV electron beam is used for increased sensitivity to the X-ray peaks in this range. The SEM-EDS spectrum continues up to a value of 30 keV however only Bremsstrahlung background is observed in the SEM-EDS spectra at an energy greater than 10 keV; therefore, the spectra are truncated for clarity.

Qualitatively, the VLE-PIXE spectra can be characterized by the almost complete absence of Bremsstrahlung background, in contrast to the broad, intense Bremsstrahlung background typical of the SEM-EDS spectra. An example of this Bremsstrahlung background is labelled in FIG. 14A. As a result, several peaks are present in the VLE-PIXE spectrum which cannot be identified in the SEM-EDS spectrum, leading to the identification of two additional minor components; Ni and Cu. Ni can be identified in the VLE-PIXE spectrum based on the presence of the Ni $L\alpha$ peak, and the Ni $K_\alpha$ and $K_\beta$ peaks. Cu can be identified in the VLE-PIXE spectrum based on the Cu $L_\alpha$ peak.

The identification of additional peaks, Fe $L_\alpha$ and Fe $K_\beta$, can be used to confirm the presence of Fe in the sample, an important feature in the case of overlapping peaks. Peaks corresponding to elements not outlined in the Certificate of Analysis such as the P $K_\alpha$ peak at 2.013 keV were also observed. However, the lack of certification makes identification of this element speculative. At an X-ray energy of 3 keV, several spectral features are present which are believed to be a detector artefact as they do not match any known X-ray characteristic peaks. For this reason, this section of the spectra has been removed for clarity.

To assess the validity of the doped beam VLE-PIXE technique, a sample of a second NIST standard reference material, SRM 1242, was measured utilizing the same procedure as above. This sample was chosen such that the primary component of the SRM 654b, titanium, was not present in the SRM 1242 and such that the primary components of the SRM 1242, cobalt and tungsten, were not present in the SRM 654b. This choice of additional sample also helped eliminate the possibility of the X-ray spectra being due to some artefact of the system, as both samples would likely produce identical X-ray spectra in such a situation. The full composition of the SRM 1242 is shown in Table 5. Concentrations in Table 5 are expressed as mass fractions, in percentages. Values shown in parentheses are for information purposes only.

Figure 15:
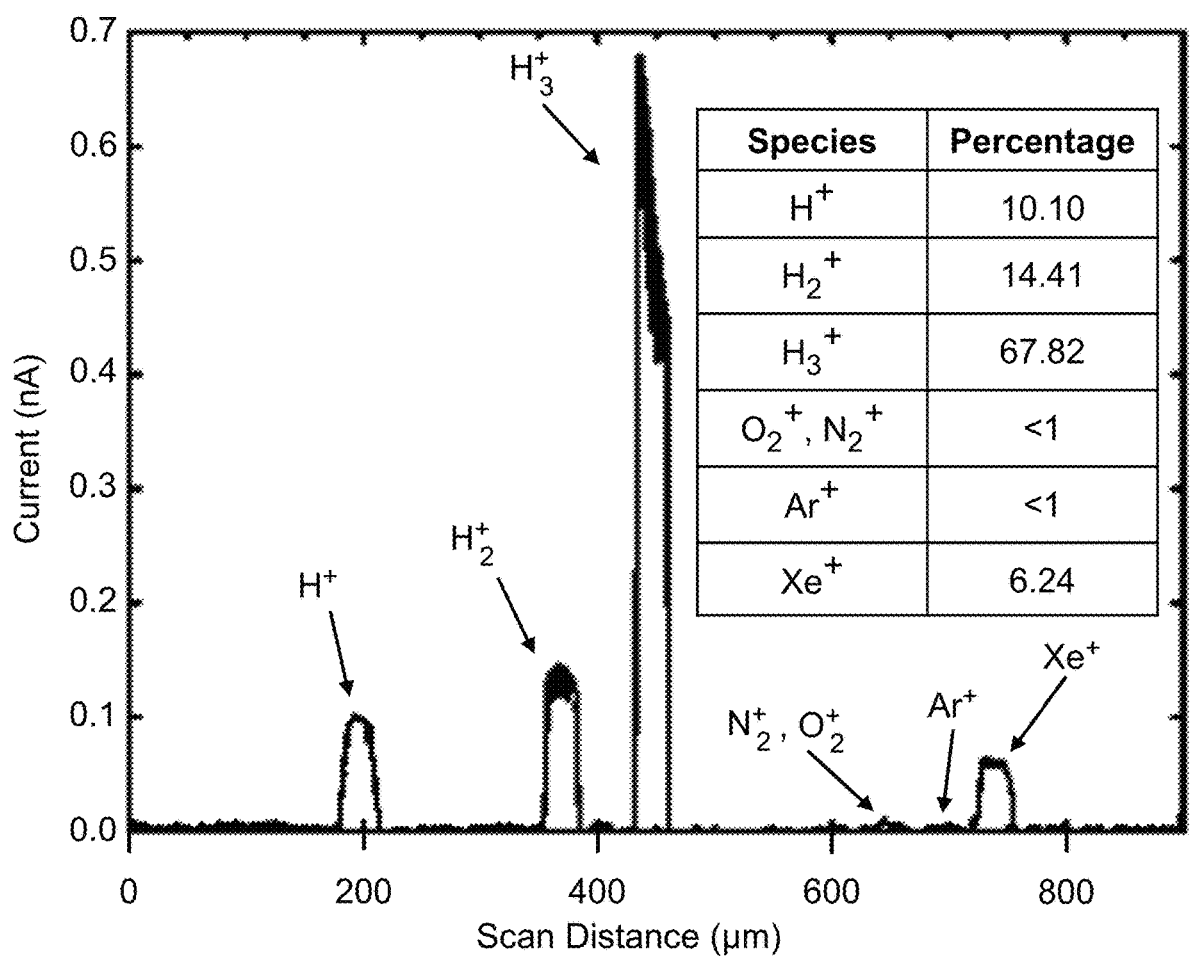
FIG. 15 is a graphical and tabular representation of the percentages of ion species within a Xe-doped hydrogen beam prior to exposure of a sample of NIST Standard Reference Material SRM 1242 to the beam, the percentages determined from ion currents measured for each of several separated beamlets, each beamlet comprising a subset of the full set of ion species.
Figure 16A:
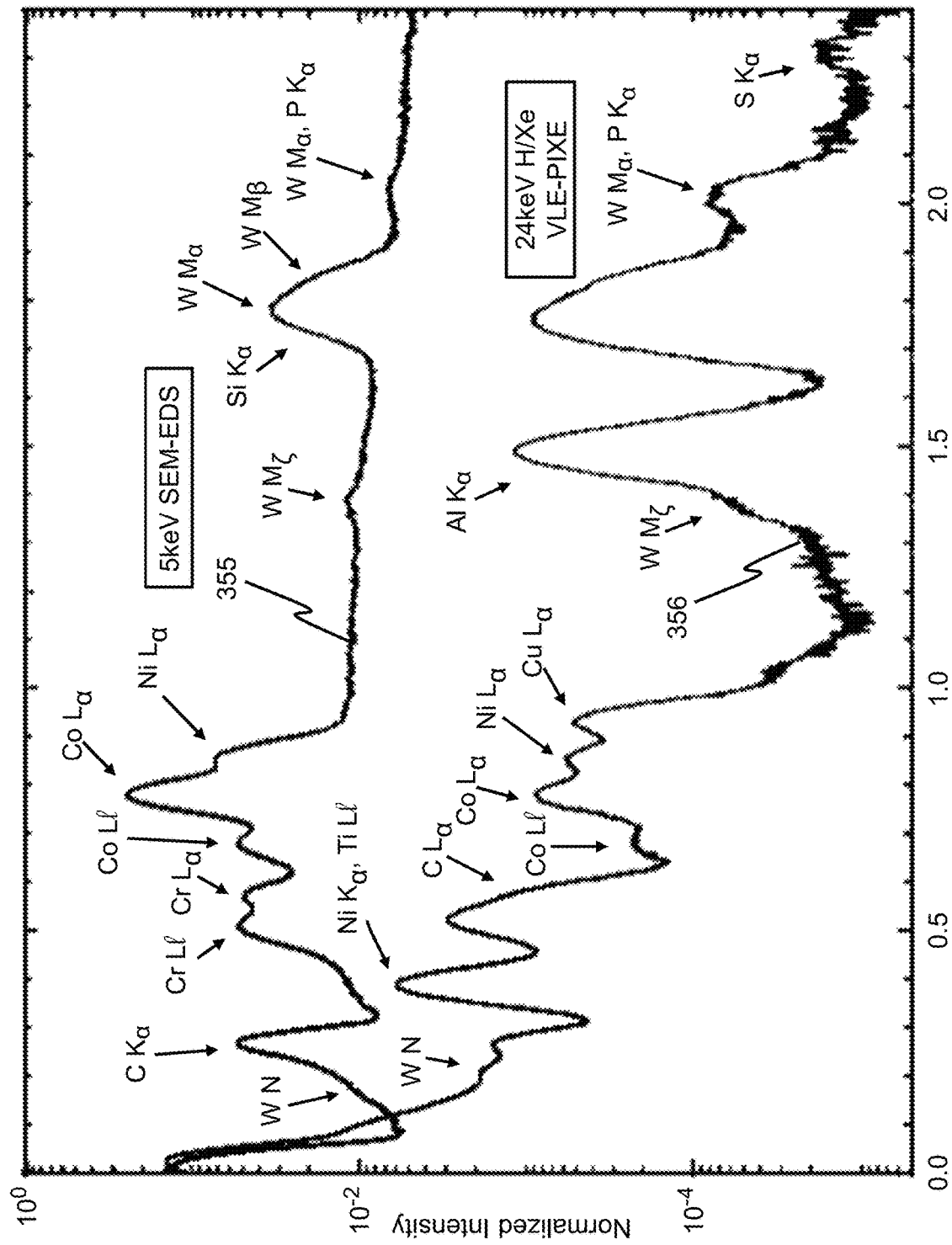
FIG. 16A is a comparison between a 24 keV VLE-PIXE spectrum of NIST Standard Reference Material SRM 1242, as obtained using analysis methods taught herein, and a 5 keV SEM-EDS spectrum of the same sample.
Figure 16B:
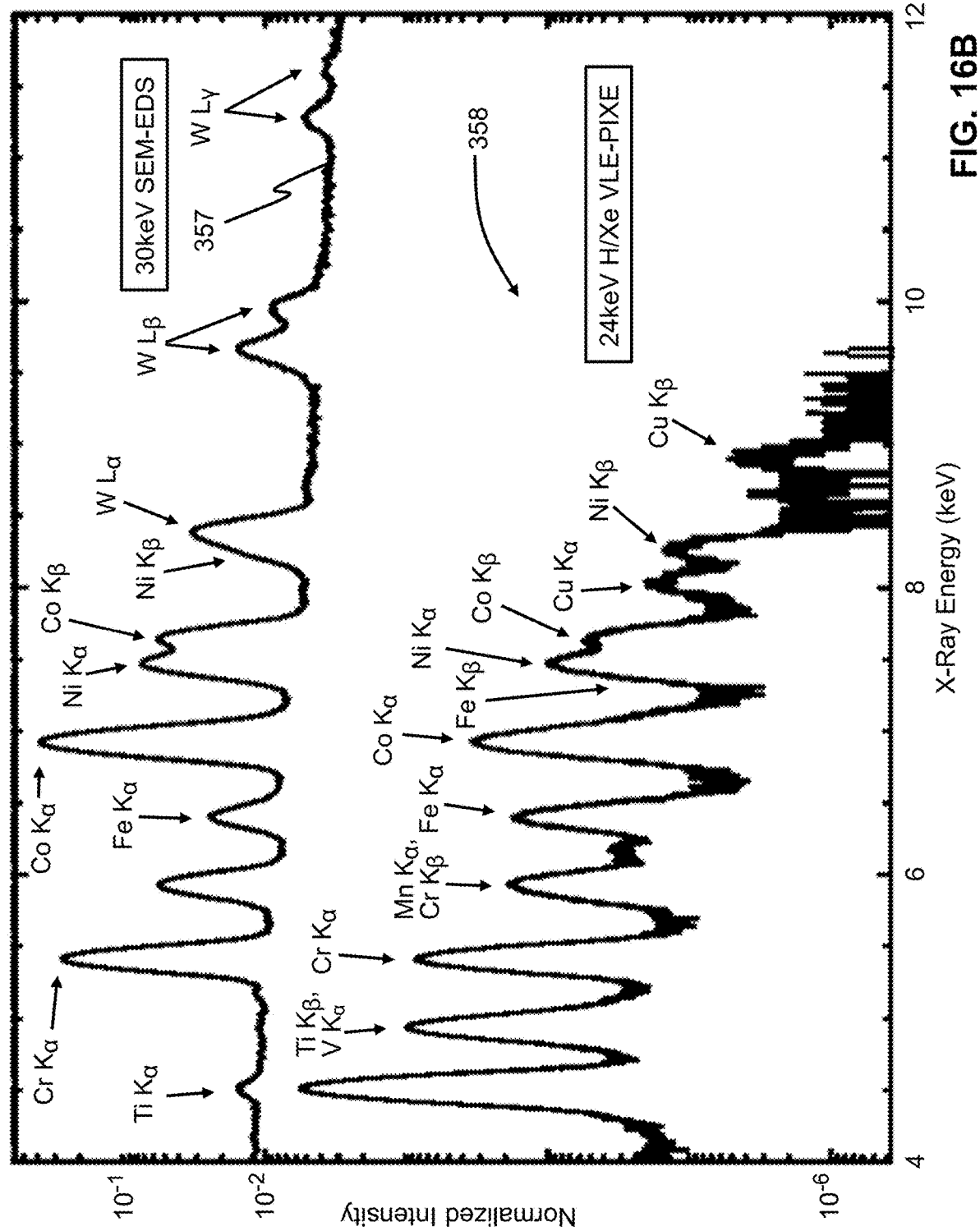
FIG. 16B is a comparison between a 24 keV VLE-PIXE spectrum of NIST Standard Reference Material SRM 1242, as obtained using analysis methods taught herein, and a 30 keV SEM-EDS spectrum of the same sample.
Figure 17:
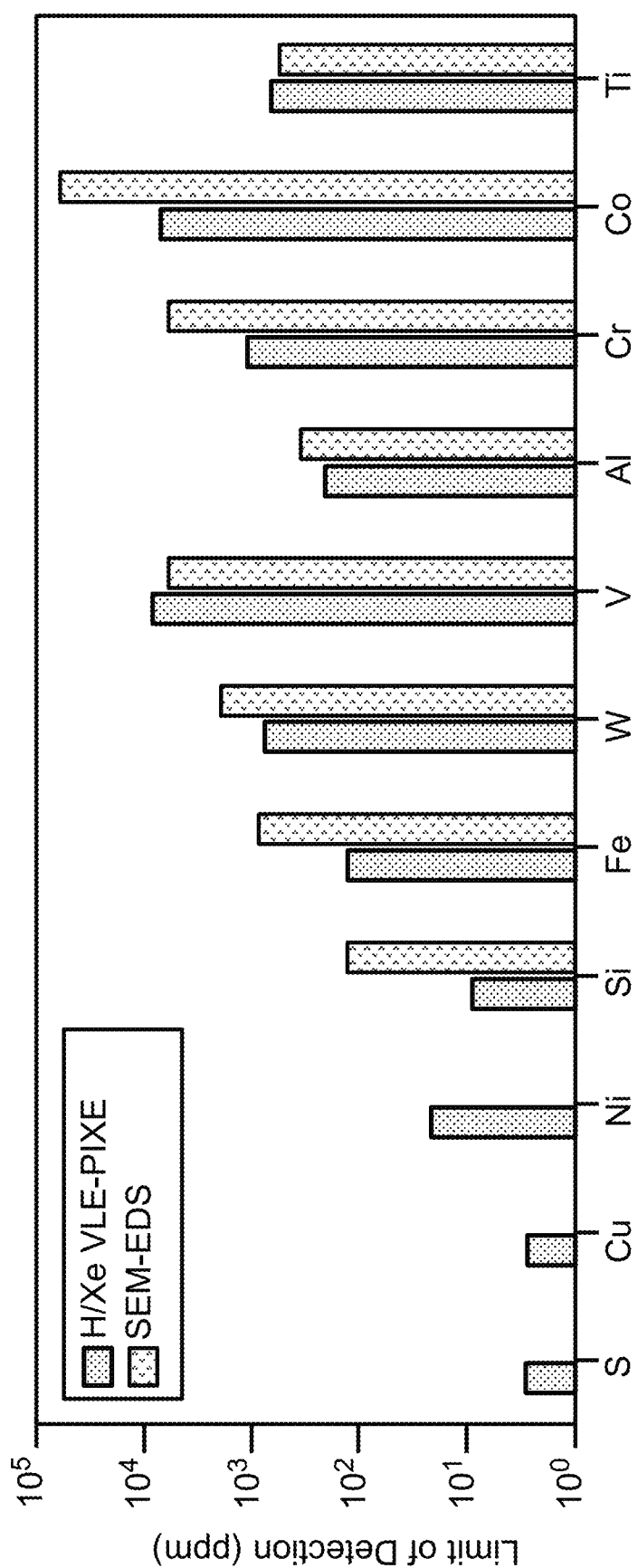
FIG. 17 is histogram that compares lower limits of detection of several elements in NIST Standard Reference Material SRM 654b, as determined by SEM-EDS to the lower limits of detection of the same elements as determined by Xe-doped hydrogen ion VLE PIXE, the latter measurements obtained using with the beam composition shown in FIG. 13.

The beam composition measurement prior to analysis is shown as a function of beamlet separation in FIG. 15 and is expressed as a percentage of the total beam current in the table that is embedded in that figure. Similar to the NIST 654b sample, a hydrogen beam was established with a dopant proportion of 6.2% Xe. Comparisons of the SEM-EDS and VLE-PIXE spectra for the second NIST sample are shown in FIGS. 16A-16B, again utilizing the 5 keV electron beam for peak comparison in the low energy region and a 30 keV electron beam in the high energy region.

TABLE 5

NIST SRM 1242 certified concentration values.

| Element | Value | Error (±Value) |
|---|---|---|
| Carbon | 0.126 | 0.00. |
| Manganese | 1.58 | 0.05 |
| Phosphorus | 0.002 | 0.001 |
| Sulfur | 0.0007 | 0.0002 |
| Silicon | 0.016 | 0.003 |
| Copper | 0.0010 | 0.0004 |
| Nickel | 9.78 | 0.08 |
| Chromium | 20.0 | 0.1 |
| Vanadium | 0.005 | 0.0002 |
| Iron | 1.80 | 0.04 |
| Tungsten | 15.1 | 0.1 |
| Cobalt | 51.5 | 0.3 |
| Nitrogen | 0.026 | 0.001 |
| Aluminum | (<0.01) | N/A |
| Tantalum | (<0.01) | N/A |
| Niobium | (<0.005) | N/A |
| Boron | (<0.0001) | N/A |

When the VLE-PIXE spectra of the SRM 1242 are compared to the VLE-PIXE spectra of the SRM 654b, several peaks can be seen which are unique to each specific sample and have been identified as both major and minor components of their respective samples. In the spectra of the SRM 1242 sample, the tungsten M series of peaks as well as the Co K and L series of peaks can be clearly identified, neither of which were present in the spectra of SRM 654b. The intensity of the Cr $K_\alpha$ peak has also increased significantly relative to its intensity in the first NIST sample, reflective of its higher concentration of Cr in this second sample. The heavy element tungsten is of particular interest due to the presence of the outer shell M and N transitions, demonstrating the full range of K, L, M and N X-ray transitions present in one sample.

The appearance of the new peaks corresponding to W and Co demonstrates the validity of this technique and eliminates the possibility of the X-ray signals originating as the result of an artefact of the instrumentation. The same unidentified spectral features at ~3 keV were still present, however, and are once again cropped out in FIGS. 16A-16B in order to better identify the spectral lines in the low energy region.

Several peaks appeared in the characterization of the SRM 1242 which should not be present, specifically the Ti and Al $K_\alpha$ peaks. As discussed previously herein, the Ti peak may result from particles striking the X-ray detector window support grid or striking re-sputtered material coating the X-ray detector window. The fact that this Ti peak is present in both the VLE-PIXE and SEM-EDS spectra suggests that this is the case and that this peak should be ignored. The presence of these apparent artifact peaks suggests that, as the electron energy increases, some backscattered electrons may bypass the electron trap and begin to generate a Ti $K_\alpha$ signal.

The signal to noise ratio (SNR) and Lower Limit of detection (LOD) were calculated for the elements identified in the spectra shown FIGS. 14A-14B and FIGS. 16A-16B using a standard threshold of 3σ[65]. The full set of values are listed in Table 6 for the SRM 654b sample and in Table 7 for the SRM 1242, with the better of the two techniques indicated by underlining. These results are also summarized in FIG. 17, in which the minimum LODs for each element measured using doped beam VLE-PIXE and SEM-EDS are compared.

TABLE 6

SRM 654b calculated signal to noise ratios and limits of detection for the representative doped beam VLE-PIXE and SEM-EDS spectra.

| Element | Peak | COA Conc. (ppm) | SNR, SEM-EDS | LOD, SEM-EDS | SNR, VLE-PIXE | LOD, VLE-PIXE |
|---|---|---|---|---|---|---|
| Ti | $K_\alpha$ | 880000 | 4694.9 | 562.32 | 3966.0 | 665.65 |
| Al | $K_\alpha$ | 63400 | 531.11 | 358.11 | 908.52 | 209.35 |
| V | $K_\beta$ | 43100 | 21.45 | 6029.2 | 15.11 | 8557.2 |
| Fe | $K_\alpha$ | 2300 | 7.81 | 883.33 | 53.01 | 130.18 |
| Si | $K_\alpha$ | 450 | 10.16 | 132.86 | 148.94 | 9.06 |
| Ni | $K_\alpha$ | 280 | N/D | N/D | 37.66 | 22.30 |
| Cu | $L_\alpha$ | 80 | N/D | N/D | 20.64 | 11.64 |

It can be seen that, for the majority of elements, the LOD is lower for doped beam VLE-PIXE compared to SEM-EDS, demonstrating a greater sensitivity for doped beam VLE-PIXE. This result is predominantly due to the lack of Bremsstrahlung background generated during the impact of ions compared to electrons. The reduced background allows the identification of elemental peaks at a lower concentration than would be possible if the background were present. Additional minor and trace components were identified. However, because of peak overlap, determination of the SNR and LOD of these minor and trace components could not be carried out. An example is the overlap of the phosphorus $K_\alpha$ peak with the tungsten $M_\gamma$ peak.

The maximum improvement in LOD for doped beam VLE-PIXE compared to SEM-EDS is 14.66× for Si, and the average improvement is 4.30× for elements detected by both techniques (n=10). The minimum LOD for Xe doped VLE-PIXE was 2.78 ppm for Cu on the SRM 1242 sample, compared to the minimum LOD for EDS at 132.86 ppm for Si on the SRM 654b sample. These LOD values are in line with the expected literature

TABLE 7

SRM 1242 calculated signal to noise ratios and limits of detection for the representative doped beam VLE-PIXE and SEM-EDS spectra.

| Element | Peak | COA Conc. (ppm) | SNR, SEM-EDS | LOD, SEM-EDS | SNR, VLE-PIXE | LOD, VLE-PIXE |
|---|---|---|---|---|---|---|
| Cu | $K_\alpha$ | 515000 | 25.30 | 61052 | 216.82 | 7125 |
| Cr | $K_\alpha$ | 200000 | 99.15 | 6051.66 | 532.45 | 1126.86 |
| W | $M_\alpha$ | 150000 | 230.51 | 1952.1 | 578.98 | 777.23 |
| Ni | $K_\alpha$ | 97800 | 59.59 | 4923.98 | 62.60 | 4686.98 |
| Fe | $K_\alpha$ | 18000 | 142.93 | 377.81 | 106.73 | 505.95 |
| Cu | $L_\alpha$ | 10 | N/D | N/D | 10.79 | 2.78 |
| S | $K_\alpha$ | 7 | N/D | N/D | 7.2 | 2.92 | values of 100-500 ppm for EDS, [14] and near or below 1 ppm for PIXE, however this value is quoted for PIXE performed at MeV energies. [13] These results demonstrate that the addition of a small amount (~6%) of Xe to a hydrogen beam is capable of increasing the sensitivity of the VLE-PIXE to levels approaching PIXE performed at MeV energies. El Ghawi et al. described that the LOD for 250 keV protons should be several orders of magnitude higher than for 2 MeV protons, [63] with the LOD for 30 keV expected to be even higher still.

Although VLE-PIXE is shown, by the inventors, to be more sensitive than SEM-EDS, there are nonetheless several disadvantages to doped beam VLE-PIXE which must be considered when choosing between the two techniques:

The greater XRPCS for electrons compared to protons at this energy results in significantly reduced experimental time for SEM-EDS compared to doped beam VLE-PIXE.

The spatial resolution of SEM-EDS is significantly better than doped beam VLE-PIXE due to the much smaller electron probe size.

The ions used in doped beam VLE-PIXE will result in sample damage due to implantation by protons and heavy ions, and sputtering due to heavy ions. Doped beam VLE-PIXE and SEM-EDS can therefore be considered complementary techniques, with SEM-EDS being beneficial in situations where rapid identification of bulk and minor components, or high spatial resolution is required, and VLE-PIXE finding application where identification of trace elements is required at the expense of experimental time.

While LE and PIXE data was unavailable for the specific SRM samples measured in these experiments, Table 8 lists a collection of some literature conventional PIXE LOD values for comparison with doped-beam VLE-PIXE. This list is not exhaustive and is only to provide comparison for the VLE-PIXE technique. The LOD values listed are the optimum LOD values for the given experimental conditions.

Typical LODs of between 1 and 10 ppm are consistently given for PIXE performed at energies of MeV. There is, however, very limited information regarding the LODs achieved by LE-PIXE. Nouli et al. demonstrated an LOD for P of 850 ppm for LE-PIXE at 600 keV. [71] Zahraman et al. demonstrated that their measured SNR increased with decreasing energy down to 750 keV which resulted in a decrease in the LOD. [72] They attributed this to the reduced background signal with decreasing energy which served to better identify the underlying PIXE signal. Overall, this table of literature results demonstrates that best LOD for doped beam VLE-PIXE as calculated above at 2.78 ppm demonstrates a performance similar to PIXE performed at much higher energies.

The inventors' experimental results demonstrate that the sensitivity of VLE-PIXE performed with a lightly doped Xe beam is comparable to PIXE performed at much higher energies. When compared to SEM-EDS, the sensitivity of doped beam VLE-PIXE was found to be superior in almost all cases. However, this sensitivity was achieved at the expense of significantly increased experimental time due to the very low X-ray production. Doped beam VLE-PIXE can therefore be considered a complimentary technique to SEM-EDS which can be utilized for the identification of elements which are obscured by the Bremsstrahlung background typical of SEM-EDS spectra.

TABLE 8

Comparison of various PIXE and LE-PIXE LOD values from literature.

| Z Range | Energy | Best LOD | Notes | Ref. |
|---|---|---|---|---|
| 20-50 | 3 MeV | ~1 ppm | Low mass matrix elements | [66] |
| 20-50 | 3 MeV | 10-50 ppm | Medium mass matrix elements | [66] |

TABLE 8-continued

Comparison of various PIXE and LE-PIXE LOD values from literature.

| Z Range | Energy | Best LOD | Notes | Ref. |
|---|---|---|---|---|
| 20-50 | 3 MeV | 10 ppm | High mass matrix elements | [66] |
| 20-46 | 2.61 MeV | ~1 ppm | Organic matrices | [67] |
| 20-46 | 4.22 MeV | ~1 ppm | Organic Matrices | [67] |
| 28-57 | 3 MeV | 5-10 ppm | Micro-PIXE | [68] |
| 25~90 | ?MeV | 1.5-10 ppm | Micro-PIXE | [69] |
| 39 | 2 MeV | 2.2 ppm | Micro-PIXE with WDS | [70] |
| 15 | 600 keV | 850 ppm | LE-PIXE | [71] |
| 24 | 750 keV | <0.003 nm | LE-PIXE layer detection | [72] |

Endpointing and Real-Time Tomography

A potential commercial application of the doped beam VLE-PIXE technique could be a real-time elemental mapping process or an endpointing method. It has been shown above that a small amount of hydrogen may be added to a heavy-ion-species beam, such as Ar or Xe, to generate a strong VLE-PIXE signal. If this VLE-PIXE signal is monitored during the milling process on a layered sample, analysis of the change in characteristic peaks during milling could establish where one layer of a sample ends and the next begins. Such an "endpointing" technique could have significant applications in the semiconductor industry. [73] In addition, potential chemical effects induced by the mixture of the hydrogen and heavy ion species beam could provide some control over sample delayering, another critical process in semiconductor processing and failure analysis. [74] This method may be extended by providing an ion beam comprising a mixture of more than two ion species, such as a Xe beam to induce rapid sputtering, a nitrogen beam to induce chemical effects, and a hydrogen beam to generate an analytical X-ray signal.

Real-time elemental mapping would be a more advanced version of the endpointing technique where an X-ray elemental map would be collected during sample milling. X-ray elemental mapping allows localization of the elemental composition across a sample. As the beam scans across the sample during collection of an X-ray map, the proportion of the heavy ion species with a greater sputtering yield than $H^+$, $H_2^+$ and $H_3^+$ would remove some material, such that each subsequent X-ray map would originate from a different layer of the sample. Each map would form a "slice" of the material which when combined would establish a 3-dimensional map of the elemental composition of a material.

Typically, such three-dimensional mapping is performed sequentially, where a layer of material is removed from the sample and the exposed layer is then analyzed by an alternate means such as electron backscatter diffraction or EDS. This technique is known as serial sectioning tomography and is notoriously slow due to the need to repeatedly switch between FIB milling and sample analysis methods. [7] Utilizing the VLE-PIXE method with a mixed hydrogen and heavy ion species beam, the milling and analysis steps could be combined into a single operation and the mapping result could be captured in real-time. This has the potential to significantly increase the throughput of tomography workflows.

CONCLUSIONS

The inventors' experimental investigations have demonstrated the implementation and application of the doped-beam VLE-PIXE technique on a commercial focused ion beam microscope. This technique offers trace element analysis with performance comparable to PIXE performed at much higher energies and the possibility of simultaneous FIB milling and sample analysis. The new methods taught herein advantageously expand the availability of the PIXE technique from the conventional and relatively inaccessible particle accelerator facility to a FIB microscope which can be located in a standard laboratory facility.

The new VLE-PIXE technique described herein is made possible through the use of a multi-gas-inlet inductively-coupled plasma ion source in order to implement proton beams and mixed proton/heavy ion beams on a FIB microscope. Characterization of the beam composition demonstrates the generation of a high current of protons by the plasma FIB system, a result critical to the performance of the PIXE technique and unique to the plasma FIB as compared to previous hydrogen FIB manifestations such as the GFIS.

The role of various spurious signal sources such as stray electrons, backscattered ions and neutralized particles were investigated, and methods to eliminate such signals, such as manipulating the SEM magnetic immersion field and FIB column lens biases, have been developed. Reducing the FIB accelerating voltage to 24 keV also allows the influence of backscattered ions on the X-ray spectrum to be limited. Ensuring a sufficient vacuum is established in the FIB column and microscope chamber prior to experiments was found to advantageously reduce the impact of secondary particles generated as a result of ion-gas collisions in the FIB column and chamber.

Trace element analysis of standard reference materials performed using a lightly Xe doped hydrogen beam allowed the validation of the performance of this technique utilizing such metrics as signal-to-noise ratios and limits of detection. A direct comparison between an analogous technique, SEM-EDS, was performed and established that the sensitivity of doped VLE-PIXE was superior to EDS for almost all elements analyzed due to the absence of the broad Bremsstrahlung background typical of electron X-ray spectra. The absence of the Bremsstrahlung background also allowed the identification of several peaks using VLE-PIXE which could not be identified using SEM-EDS demonstrating a significantly increased sensitivity. These observations opens up the possibility of generating enhanced elemental composition analysis of a sample using a dual-beam apparatus by employing SEM-EDS to quantify some elements and VLE-PIXE to quantify other elements, where the quantification technique for each element uses the method that provides superior results for that element. The compositional mapping capabilities of the VLE-PIXE technique were explored and were determined to be useful in some circumstances. It was established that the performance of the doped beam VLE-PIXE technique was comparable to PIXE performed at much higher energies as shown by the significantly increased X-ray production cross sections relative to a proton only beam.

Investigation of the beam doping method demonstrated that the signal produced when both protons and heavy ions are incident upon the same location on the sample was greater than the sum of the individual components. Xe was determined to be the optimum dopant species due to its relatively high performance and the absence of additional X-ray peaks generated by the Xe projectile. The proportion of dopant species was shown to significantly increase the generation of X-rays from the sample, reaching a maximum at ~80% Ar species with a balance of hydrogen. This created the possibility for both a heavy species doped hydrogen beam as well as a hydrogen doped heavy species beam, each with unique potential applications. Theoretical models relating to the mechanisms behind the signal enhancement effects of heavy ions will be explored in future works.

The discussion included in this application is intended to serve as a basic description. The present invention is not intended to be limited in scope by the specific embodiments described herein, which are intended as single illustrations of individual aspects of the invention. Functionally equivalent methods and components are within the scope of the invention. Various other modifications of the invention, in addition to those shown and described herein will become apparent to those skilled in the art from the foregoing description and accompanying drawings. Specific numerical values of apparatus operating parameters presented herein are provided as typical operating parameters, as determined for specific apparatus, and are not intended to be limiting in any way.

BIBLIOGRAPHY

[1] Young, Richard J., and Mary V. Moore. Dual-beam (FIB-SEM) systems. *Introduction to focused ion beams*. Springer, Boston, MA, 2005.247-268.

[2] McLean P Echlin, Marcus Straw, Steven Randolph, Jorge Filevich, and Tresa M Pollock. The TriBeam system: Femtosecond laser ablation in situ SEM. *Materials Characterization*, 100: 1-12, 2015.

[3] Yongqi Fu and Kok Ann Bryan Ngoi. Focused ion beam direct fabrication of micro-optical elements: features compared with laser beam and electron beam direct writing, 2004.

[4] Lucille A Giannuzzi et al. *Introduction to focused ion beams: instrumentation, theory, techniques and practice*. Springer Science & Business Media, 2004.

[5] Lucille A Giannuzzi and Frederick A Stevie. A review of focused ion beam milling techniques for TEM specimen preparation. *Micron*, 30(3): 197-204, 1999.

[6] Richard Young, C Rue, S Randolph, C Chandler, G Franz, R Schampers, A Klumpp, and L Kwakman. A comparison of xenon plasma FIB technology with conventional gallium LMIS FIB: imaging, milling, and gas-assisted applications. *Microscopy and Microanalysis*, 17(S2): 652-653,2011.

[7] T L Burnett, R Kelley, B Winiarski, L Contreras, M Daly, A Gholinia, M G Burke, and P J Withers. Large volume serial section tomography by Xe Plasma FIB dual beam microscopy. *Ultramicroscopy*, 161: 119-129, 2016.

[8] Naohiro Shimizu and S R Hart. Applications of the ion microprobe to geochemistry and cosmochemistry. *Annual Review of Earth and Planetary Sciences*, 10(1): 483-526, 1982.

[9] Sarah Witman. Ten things you might not know about particle accelerators. *Symmetry Magazine (Department of Energy)*, 2014.

[10] Waldemar Scharf. *Particle accelerators and their uses*. CRC Press, 1986.

[11] R Curtis Bird and James Stanislaus Williams. *Ion beams for materials analysis*. Elsevier, 1990.

[12] Sven A E Johansson and Thomas B Johansson. Analytical application of particle induced X-ray emission. *Nuclear Instruments and Methods*, 137(3): 473-516, 1976.

[13] C G Ryan. Quantitative trace element imaging using PIXE and the nuclear microprobe. *International Journal of Imaging Systems and Technology*, 11(4): 219-230, 2000.

[14] Dale Newbury, Nicholas Ritchie, Michael Mengason, and Keana Scott. SEM/EDS Trace Analysis: Limits Imposed by Fluorescence of the Detector. *Microscopy and Microanalysis*, 23(S1): 1026-1027, 2017.

[15] Rainer Siegele, David D Cohen, and Nick Dytlewski. The ANSTO high energy heavy ion microprobe. *Nuclear Instruments and Methods in Physics Research Section B: Beam Interactions with Materials and Atoms*, 158(14): 31-38, 1999.

[16] A Denker, J Opitz Coutureau, M Griesser, R Denk, and H Winter. Nondestructive analysis of coins using high-energy PIXE. *Nuclear Instruments and Methods in Physics Research Section B: Beam Interactions with Materials and Atoms*, 226(1-2): 163-171, 2004.

[17] K Ishii and S Morita. Theoretical estimation of PIXE detection limits. *Nuclear Instruments and Methods in Physics Research Section B: Beam Interactions with Materials and Atoms*, 34(2): 209-216,1988.

[18] Keizo Ishii and Susumu Morita. Continuous backgrounds in PIXE. *International Journal of PIXE*, 1(01): 1-29, 1990.

[19] Javier Miranda. Low energy PIXE: advantages, drawbacks, and applications. Nuclear Instruments and Methods in *Physics Research Section B: Beam Interactions with Materials and Atoms*, 118(1-4): 346-351, 1996.

[20] J Miranda. Low energy PIXE revisited: is it still alive? *Revista Mexicana de Fisica*, 56(1): 82-84, 2010.

[21] Yoshiko Moriya, Yasuro Ato, and Sohji Miyagawa. Sensitivity in light element analysis by 2 MeV and 150 keV proton and photon induced X-rays. *Nuclear Instruments and Methods*, 150(3): 523-528, 1978.

[22] S A Corrêa, E Pitthan, M V Moro, and D Primetzhofer. A multipurpose set-up using keV ions for nuclear reaction analysis, high-resolution backscattering spectrometry, low-energy PIXE and in-situ irradiation experiments. *Nuclear Instruments and Methods in Physics Research Section B: Beam Interactions with Materials and Atoms*, 478: 104-110, 2020.

[23] Wataru Kada, Atsuya Kishi, Masato Sueyasu, Fuminobu Sato, Yushi Kato, and Toshiyuki Iida. Development of a low-energy PIXE analysis system based on an ion implanter. *Nuclear Instruments and Methods in Physics Research Section B: Beam Interactions with Materials and Atoms*, 318: 51-54, 2014.

[24] Milo Boirot. Implementation of low-energy PIXE at the new scattering chamber of the 350 kV implanter, 2019.

[25] M Soueidan, M Roumié, and B Nsouli. PIXE detection limit for aluminium thin film deposited on Si-based matrix. *Nuclear Instruments and Methods in Physics Research Section B: Beam Interactions with Materials and Atoms*, 406: 71-74, 2017.

[26] S J C do Carmo, F I G M Borges, A M F Trindade, and C A N Conde. K X-ray production cross sections in aluminium for 15, 20 and 25 keV protons. *Nuclear Instruments and Methods in Physics Research Section B: Beam Interactions with Materials and Atoms*, 293: 16-20, 2012.

[27] Gregory Lapicki. The status of theoretical K-shell ionization cross sections by protons. *X-Ray Spectrometry: An International Journal*, 34(4): 269-278, 2005.

[28] Lucille A Giannuzzi. Particle-induced x-ray analysis using focused ion beams. *Scanning*, 27(4): 165-169, 2005.

[29] David C Joy, Harry M Meyer, Mehdi Bolorizadeh, Yinghong Lin, and Dale Newbury. On the Production of X-rays by Low Energy Ion Beams. *Scanning: The Journal of Scanning Microscopies*, 29(1): 1-4, 2007.

[30] A Pillay and M Peisach. Production of charge-induced X-rays during PIXE studies using light and heavy ion-beams. *Journal of radioanalytical and nuclear chemistry*, 200(1): 53-74, 1995.

[31] Jürgen H Gross. *Mass spectrometry: a textbook*. Springer Science & Business Media, 2006.

[32] P D Prewett and D K Jefferies. Characteristics of a gallium liquid metal field emission ion source. *Journal of Physics D: Applied Physics*, 13(9): 1747, 1980.

[33] R G Forbest. Understanding how the liquid-metal ion source works. *Vacuum*, 48(1): 85-97, 1997.

[34] John Morgan, John Notte, Raymond Hill, and Bill Ward. An introduction to the helium ion microscope. *Microscopy today*, 14(4): 24-31, 2006.

[35] Gregor Hlawacek, Vasilisa Veligura, Raoul van Gastel, and Bene Poelsema. Helium ion microscopy. *Journal of Vacuum Science & Technology B, Nanotechnology and Microelectronics: Materials, Processing, Measurement, and Phenomena*, 32(2): 020801, 2014.

[36] Hironori Moritani, Radovan Urban, Mark Salomons, Robert Wolkow, and Jason Pitters. Hydrogen Ion Beams from Nanostructured Gas Field Ion Sources. *Microscopy and Microanalysis*, 22(S3): 612-613, 2016.

[37] Hironori Moritani, Radovan Urban, Kyle Nova, Mark Salomons, Robert Wolkow, and Jason Pitters. Selective production of hydrogen ion species at atomically designed nanotips. *Ultramicroscopy*, 186: 42-48, 2018.

[38] Shinichi Matsubara, Hiroyasu Shichi, Yoshimi Kawanami, and Tomihiro Hashizume. Novel Scanning Ion Microscope with $H_3^+$ Gas Field Ionization Source. *Microscopy and Microanalysis*, 22(S3): 614-615, 2016.

[39] John A Notte, Lou Farkas, Raymond Hill, and Bill Ward. An Introduction to Helium Ion Microscopy and its Nanotechnology Applications. *NanoScience and Technology Institute*, 2006.

[40] R Hill and F H M Faridur Rahman. Advances in helium ion microscopy. *Nuclear Instruments and Methods in Physics Research Section A: Accelerators, Spectrometers, Detectors and Associated Equipment*, 645(1): 96-101, 2011.

[41] Jacques Gierak, Paul Mazarov, Lars Bruchhaus, RalfJede, and Lothar Bischoff. Review of electrohydrodynamical ion sources and their applications to focused ion beam technology. *Journal of Vacuum Science & Technology B, Nanotechnology and Microelectronics: Materials, Processing, Measurement, and Phenomena*, 36(6): 06J101, 2018.

[42] Hiroyasu Shichi, Shinichi Matsubara, and Tomihiro Hashizume. Comparison of Characteristics of Neon, Argon, and Krypton Ion Emissions from Gas Field Ionization Source with Single Atom Tip. *Microscopy and Microanalysis*, 23(S1): 274-275, 2017.

[43] Anthony Graupera and Charles Otis. Inductively-coupled plasma ion source for use with a focused ion beam column with selectable ions, Sep. 2, 2014. U.S. Pat. No. 8,822,913.

[44] Jacques Gierak. Focused ion beam technology and ultimate applications. *Semiconductor science and technology*, 24(4): 043001, 2009.

[45] B W Ward, John A Notte, and N P Economou. Helium ion microscope: A new tool for nanoscale microscopy and metrology. Journal of Vacuum Science & Technology B: *Microelectronics and Nanometer Structures Processing, Measurement, and Phenomena*, 24(6): 2871-2874, 2006.

[46] N S Smith, W P Skoczylas, S M Kellogg, D E Kinion, P P Tesch, O Sutherland, Ane Aanesland, and R W Boswell. High brightness inductively coupled plasma source for high current focused ion beam applications. Journal of Vacuum Science & Technology B: Microelectronics and Nanometer Structures Processing, Measurement, and Phenomena, 24(6): 2902-2906, 2006.

[47] Gorelick Sergey, Korneev Denis, Handley Ava, Gervinskas Gediminas, Oorschot Viola, Pocock Roger, et al. Oxygen plasma focused ion beam scanning electron microscopy for biological samples. *BioRxiv*, page 457820, 2018.

[48] K H Bai, S J You, Hong-Young Chang, and H S Uhm. Plasma parameters analysis of various mixed gas inductively coupled plasmas. *Physics of Plasmas*, 9(6): 2831-2838, 2002.

[49] Osamu Fukumasa, R Italani, and S Saeki. Numerical simulation of hydrogen ion species in the steady-state plasma of a low-pressure ion source. *Journal of Physics D: Applied Physics*, 18(12): 2433, 1985.

[50] Katsushige Tsuno, Nobuo Handa, and Sunao Matsumoto. Immersion lenses for low-voltage SEM and LEEM. In *Electron-Beam Sources and Charged-Particle Optics*, volume 2522, pages 243-252. International Society for Optics and Photonics, 1995.

[51] B L Thiel, M Toth, R P M Schroemges, J J Scholtz, G Van Veen, and W R Knowles. Two-stage gas amplifier for ultrahigh resolution low vacuum scanning electron microscopy. *Review of scientific instruments*, 77(3): 033705, 2006.

[52] Thierry Czerwiec, F Greer, and D B Graves. Nitrogen dissociation in a low pressure cylindrical ICP discharge studied by actinometry and mass spectrometry. *Journal of Physics D: Applied Physics*, 38(24): 4278, 2005.

[53] Mark W Kiehlbauch and David B Graves. Inductively coupled plasmas in oxygen: Modeling and experiment. *Journal of Vacuum Science & Technology A: Vacuum, Surfaces, and Films*, 21(3): 660-670, 2003.

[54] Denis Pick, Matthias Leiterer, and Jürgen W Einax. Reduction of polyatomic interferences in biological material using dynamic reaction cell ICP-MS. *Microchemical Journal*, 95(2): 315-319, 2010.

[55] H M Sullivan. Vacuum pumping equipment and systems. *Review of Scientific Instruments*, 19(1): 1-15, 1948.

[56] Tom Wirtz, Olivier De Castro, Jean-Nicolas Audinot, and Patrick Philipp. Imaging and analytics on the helium ion microscope. *Annual Review of Analytical Chemistry*, 12: 523-543, 2019.

[57] Werner Brandt and Roman Laubert. Pauli excitation of atoms in collision. *Physical Review Letters*, 24(19): 1037, 1970.

[58] F W Saris, W F Van der Weg, H Tawara, and Roman Laubert. Radiative transitions between quasimolecular levels during energetic atom-atom collisions. *Physical Review Letters*, 28(12): 717, 1972.

[59] James R Macdonald and Matt D Brown. Noncharacteristic X-Ray Bands Produced in Targets of C, Al, Si, and Solid Ar by Argon Ions at keV Energies. *Physical Review Letters*, 29(1): 4, 1972.

[60] Michael H Loretto. *Electron beam analysis of materials*. Springer Science & Business Media, 2012.

[61] Xavier Llovet, Cedric J Powell, Francesc Salvat, and Aleksander Jablonski. Cross sections for inner-shell ionization by electron impact. *Journal of Physical and Chemical Reference Data*, 43(1): 013102, 2014.

[62] David D Cohen. K and L shell X-ray cross sections for use in PIXE analysis systems. *Nuclear Instruments and Methods in Physics Research Section B: Beam Interactions with Materials and Atoms*, 49(1-4): 1-9, 1990.

[63] Usama M El Ghawi, Beni M Bahal, and Salem K Al Arbi. Possibility of using a low-energy proton beam for particle-induced X-ray emission microanalysis. *Radiation research*, 131(3): 243-248, 1992.

[64] Jean-Louis Pouchou. Standardless x-ray analysis of bulk specimens. *Microchimica Acta*, 114(1): 33-52, 1994.

[65] David A Armbruster and Terry Pry. Limit of blank, limit of detection and limit of quantitation. *The clinical biochemist reviews*, 29(Suppl 1): S49, 2008.

[66] W J Teesdale, J A Maxwell, A Perujo, J L Campbell, L Van der Zwan, and T E Jackman. Limits of detection and quantitation in PIXE analysis of thick targets. *Nuclear Instruments and Methods in Physics Research Section B: Beam Interactions with Materials and Atoms*, 35(1): 57-66, 1988.

[67] M Khaliquzzaman, S T Lam, D M Sheppard, and L G Stephens Newsham. Dependence of X-ray yields on different parameters for light element matrices in thick target PIXE and use of standards for calibration in such analysis. *Nuclear Instruments and Methods in Physics Research*, 216(3): 481-488, 1983.

[68] J L Campbell, J A Maxwell, W J Teesdale, J-X Wang, and L I Cabri. MicroPIXE as a complement to electron probe microanalysis in mineralogy. *Nuclear Instruments and Methods in Physics Research Section B: Beam Interactions with Materials and Atoms*, 44(3): 347-356, 1990.

[69] C G Ryan, D R Cousens, S H Sie, W L Griffin, G F Suter, and E Clayton. Quantitative pixe microanalysis of geological material using the CSIRO proton microprobe. *Nuclear Instruments and Methods in Physics Research Section B: Beam Interactions with Materials and Atoms*, 47(1): 55-71, 1990.

[70] Alessandro Borghi, Roberto Cossio, and C Mazzoli. A mineralogical application of micro-PIXE technique: Yttrium zoning in garnet from metamorphic rocks and its petrologic meaning. *Nuclear Instruments and Methods in Physics Research Section B: Beam Interactions with Materials and Atoms*, 189(1-4): 412-417, 2002.

[71] B Nsouli, M Roumié, K Zahraman, J P Thomas, and M Nasreddine. On the phosphorus characterization in thin SiO2 (P, B) CVD layer deposited onto a silicon substrate by PIXE. *Nuclear Instruments and Methods in Physics Research Section B: Beam Interactions with Materials and Atoms*, 192(3): 311-317, 2002.

[72] K Zahraman, B Nsouli, M Roumié, J P Thomas, and S Danel. On the optimization of the PIXE technique for thickness uniformity control of ultra-thin chromium layers deposited onto large surface quartz substrate. *Nuclear Instruments and Methods in Physics Research Section B: Beam Interactions with Materials and Atoms*, 249(1-2): 447-450, 2006.

[73] D Zudhistira, V Viswanathan, V Narang, J M Chin, S Sharang, K Novotny, and J Vincen Obona. Precision Xe plasma FIB delayering for physical failure analysis of sub-20 nm microprocessor devices. In *ISTFA 2017*, pages 574-579. ASM International, 2017.

[74] Roger Alvis, Trevan Landin, Chad Rue, Peter Carleson, Oleg Sidorov, Andrew Erickson, Sean Zumwalt, Sinjin Dixon Warren, Wan-Yi Liu, ShihHsin Chang, et al. Plasma FIB DualBeam Delayering for Atomic Force NanoProbing of 14 nm FinFET Devices in an SRAM Array. In *ISTFA 2015*, pages 388-400. ASM International, 2015.

[75] David Halliday, Robert Resnick, and Jearl Walker. *Fundamentals of physics*. John Wiley & Sons, 2013.

[76] C E Sosolik, A C Lavery, E B Dahl, and B H Cooper. A technique for accurate measurements of ion beam current density using a Faraday cup. *Review of Scientific Instruments*, 71(9): 3326-3330, 2000.

What is claimed is:

1. An analytical method comprising:
    directing ions comprising a mixture of protons and non-hydrogen ions onto a sample, wherein the kinetic energy of ions of the mixture is not greater than 50 kilo-electron-Volts (keV); and
    detecting and measuring X-rays that are emitted from the sample in response to the impingement of the protons and non-hydrogen ions onto the sample.

2. An analytical method as recited in claim 1, wherein the directing of the ions includes directing separate proton and non-hydrogen ion beams onto the sample, wherein the separate proton and non-hydrogen ion beams overlap.

3. An analytical method as recited in claim 1, wherein the directing of the beam of ions is performed by a focused-ion-beam column of a stand-alone focused ion beam microscope.

4. An analytical method as recited in claim 1, wherein the mixture of protons and non-hydrogen ions is generated by passing a mixture of hydrogen gas and a second gas through a plasma ion source.

5. An analytical method as recited in claim 1, wherein the plasma ion source is an inductively coupled plasma ion source.

6. An analytical method as recited in claim 4, wherein the hydrogen gas is provided from a source of purified hydrogen gas, the second gas is provided from a source of purified second gas, and the hydrogen and second gas are mixed in a manifold that is fluidically coupled to the inductively coupled plasma ion source.

7. An analytical method as recited in claim 1, further comprising:
    measuring proportions of ion species comprising the beam of ions.

8. An analytical method as recited in claim 7, where the measuring of the proportions of the ion species comprises:
    separating the ion beam into a plurality of individual beamlets, whereby the ion species are separated in accordance with their respective mass-to-charge ratios; and
    measuring an electric current of each respective beamlet.

9. An analytical method as recited in claim 8, wherein the measuring of the electric current of each respective beamlet comprises introducing each beamlet into an isolating Faraday cup comprising:
    a grounded first electrode having an aperture therethrough that, in operation, receives the beamlets, one at a time;
    a second electrode that is spaced apart from the first electrode and that comprises a charge collection cavity;
    one or more electrical insulators between the first and second electrodes; and an electrometer electrically coupled to the second electrode.

10. An analytical method as recited in claim 9, wherein the measuring of the electric current of each respective beamlet comprises scanning said each beamlet across the aperture of the of the grounded first electrode.

11. An analytical method as recited in claim 9, wherein the measuring of the electric current of each respective beamlet comprises moving the isolating Faraday cup so that each beamlet passes, in turn, through the aperture of the grounded first electrode and to the second electrode.

12. An analytical method as recited in claim 1, wherein the directing and focusing of the beam of ions is performed by a focused-ion-beam column of a dual-beam apparatus that also comprises a scanning electron microscope (SEM) column.

13. An analytical method as recited in claim 12, further comprising:
generating an image of a sample area surrounding a position on the sample at which the protons and non-hydrogen ions impinge onto the sample, the image generated by performing a raster scan of a beam of electrons across the area while detecting either secondary electrons emitted by the sample or electrons backscattered by the sample.

14. An analytical method as recited in claim 12, further comprising:
detecting and measuring X-rays that are emitted from the sample in response to the impingement of electrons from the SEM column onto the sample area; and
generating an enhanced compositional analysis of the sample area by combining information derived from the detecting and measuring of X-rays emitted from the sample in response to the impingement of the protons and non-hydrogen ions onto the sample with information derived from the detecting and measuring of X-rays emitted from the sample in response to the impingement of electrons from the SEM column onto the sample area.

15. An analytical method as recited in claim 12, further comprising measuring proportions of ion species comprising the beam of ions by:
causing the beam of ions to pass through a magnetic immersion field generated by a magnetic immersion lens of the SEM column, whereby the ion beam is separated into a plurality of individual beamlets, the ion species being separated into the beamlets in accordance with their respective mass-to-charge ratios; and
measuring an electric current of each respective beamlet.

16. An analytical method as recited in claim 15, wherein the measuring of the electric current of each respective beamlet comprises introducing each beamlet into an isolating Faraday cup comprising:
a grounded first electrode having an aperture therethrough that, in operation, receives the beamlets, one at a time;
a second electrode that is spaced apart from the first electrode and that comprises a charge collection cavity;
one or more electrical insulators between the first and second electrodes; and
an electrometer electrically coupled to the second electrode.

17. An analytical method as recited in claim 1, wherein the kinetic energy of ions of the mixture is not greater than 30 keV.

18. An analytical method as recited in claim 1, wherein the kinetic energy of ions of the mixture is not greater than 24 keV.

19. An analytical method as recited in claim 1, wherein the directing of the ions comprising the mixture of protons and non-hydrogen ions onto the sample comprises focusing a beam comprising the mixture of protons and non-hydrogen ions onto the sample.

20. An analytical method as recited in claim 1, wherein the non-hydrogen ions comprise $Ar^+$ ions, $Xe^+$ ions or $Kr^+$ ions.

21. A method of milling an area of a sample surface comprising:
directing ions comprising a mixture of protons and non-hydrogen ions onto the area, wherein the kinetic energy of ions of the mixture is not greater than 50 kiloelectron-Volts (keV), wherein the beam of ions is raster scanned across the area and wherein the impingement of the non-hydrogen ions causes sputtering of the sample surface within the area; and
detecting and measuring X-rays that are emitted from the sample in response to the impingement of the protons and non-hydrogen ions onto the sample.

22. A method of milling an area of a sample surface as recited in claim 21, wherein the directing of the ions onto the area includes directing separate proton and non-hydrogen ion beams onto the area, wherein the separate proton and non-hydrogen ion beams overlap.

23. A method of milling an area of a sample surface as recited in claim 21, wherein the directing of the ions onto the area includes focusing the ions onto the area.

24. A method of milling an area of a sample surface as recited in claim 21, further comprising:
ceasing the directing of the ions onto the area upon detecting a change in the emitted X-rays.

25. A method of milling an area of a sample surface as recited in claim 21, wherein the non-hydrogen ions comprise either $Ar^+$ ions, $Xe^+$ or $Kr^+$ ions.

26. A method of milling an area of a sample surface as recited in claim 21, wherein the directing of the ions is performed by a focused-ion-beam column of a dual-beam apparatus that also comprises a scanning electron microscope (SEM) column.

27. A method of milling an area of a sample surface as recited in claim 21, further comprising generating an image of the area, the image generated by performing a raster scan of a beam of electrons across the area while detecting either secondary electrons emitted by the sample or electrons backscattered by the sample.

28. A method of milling an area of a sample surface as recited in claim 21, wherein the kinetic energy of ions of the mixture is not greater than 30 keV.

* * * * *

UNITED STATES PATENT AND TRADEMARK OFFICE
CERTIFICATE OF CORRECTION

| | |
|---|---|
| PATENT NO. | : 12,061,159 B2 |
| APPLICATION NO. | : 17/728869 |
| DATED | : August 13, 2024 |
| INVENTOR(S) | : Daniel Totonjian et al. |

It is certified that error appears in the above-identified patent and that said Letters Patent is hereby corrected as shown below:

In the Claims

In Column 43, Claim 10, Line 6, delete "of the of the" and insert -- of the --, therefor.

In Column 43, Claim 12, Line 13, delete "and focusing of the" and insert -- of the --, therefor.

In Column 44, Claim 25, Line 44, delete "$Xe^+$" and insert -- $Xe^+$ ions --, therefor.

Signed and Sealed this
First Day of October, 2024

*Katherine Kelly Vidal*
Katherine Kelly Vidal
*Director of the United States Patent and Trademark Office*